United States Patent
Nonaka et al.

(10) Patent No.: US 9,901,814 B2
(45) Date of Patent: Feb. 27, 2018

(54) GAME SYSTEM AND STORAGE MEDIUM STORING GAME PROGRAM

(75) Inventors: Toyokazu Nonaka, Kyoto (JP); Toshiharu Izuno, Kyoto (JP); Kentaro Nishimura, Kyoto (JP); Kenta Tanaka, Kyoto (JP); Norihito Ito, Kyoto (JP); Masayuki Okada, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 2036 days.

(21) Appl. No.: 11/984,443

(22) Filed: Nov. 16, 2007

(65) Prior Publication Data

US 2008/0119269 A1 May 22, 2008

(30) Foreign Application Priority Data

Nov. 17, 2006 (JP) .................. 2006-312255
Feb. 1, 2007 (JP) .................. 2007-023489

(51) Int. Cl.
*A63F 9/24* (2006.01)
*A63F 13/211* (2014.01)
*A63F 13/24* (2014.01)
*A63F 13/20* (2014.01)

(52) U.S. Cl.
CPC ............ *A63F 13/211* (2014.09); *A63F 13/06* (2013.01); *A63F 13/24* (2014.09); *A63F 2300/105* (2013.01)

(58) Field of Classification Search
CPC .................................................. A63F 13/211
USPC ..................... 345/158; 463/31, 37
See application file for complete search history.

(56) References Cited

U.S. PATENT DOCUMENTS

| | | | | |
|---|---|---|---|---|
| 5,059,958 A | * | 10/1991 | Jacobs et al. ................. | 345/158 |
| 6,597,342 B1 | * | 7/2003 | Haruta ......................... | 345/157 |
| 6,614,420 B1 | * | 9/2003 | Han et al. ..................... | 345/161 |
| 7,145,551 B1 | * | 12/2006 | Bathiche et al. ............ | 345/158 |
| 2001/0045938 A1 | * | 11/2001 | Willner et al. ................ | 345/156 |
| 2004/0048666 A1 | * | 3/2004 | Bagley et al. ................. | 463/39 |
| 2006/0287086 A1 | | 12/2006 | Zalewski et al. | |
| 2006/0287089 A1 | * | 12/2006 | Addington et al. ........... | 463/37 |

(Continued)

FOREIGN PATENT DOCUMENTS

| | | |
|---|---|---|
| JP | A-1-214385 | 8/1989 |
| JP | A-2000-89906 | 3/2000 |
| JP | 2000-308756 | 11/2000 |

OTHER PUBLICATIONS

Office Action dated Feb. 15, 2011 in related copending U.S. Appl. No. 11/984,445.

(Continued)

*Primary Examiner* — Steve Rowland
(74) *Attorney, Agent, or Firm* — Nixon & Vanderhye, P.C.

(57) ABSTRACT

A housing of a game controller is capable of being held with one hand of a player. A direction instruction section is provided in the housing for performing a direction instruction input. Movement detection means is means for detecting movement of the housing. Movement direction control means of a game apparatus is means for determining a movement direction of an object, which appears in a virtual game world, in accordance with an operation of the direction instruction section. Posture control means is means for determining a posture of the object in the virtual game world in accordance with detection by the movement detection means.

42 Claims, 29 Drawing Sheets

(56) References Cited

U.S. PATENT DOCUMENTS

2007/0293318 A1*  12/2007  Tetterington et al. .......... 463/37
2008/0174550 A1*  7/2008   Laurila et al. ................ 345/158

OTHER PUBLICATIONS

Office Action dated Nov. 1, 2012 in Japanese application No. 2007-023489.
English-language machine translation of JP 2000-308756.
Non-final Office Action dated Jan. 22, 2015 in U.S. Appl. No. 11/984,445.

* cited by examiner

F I G. 6
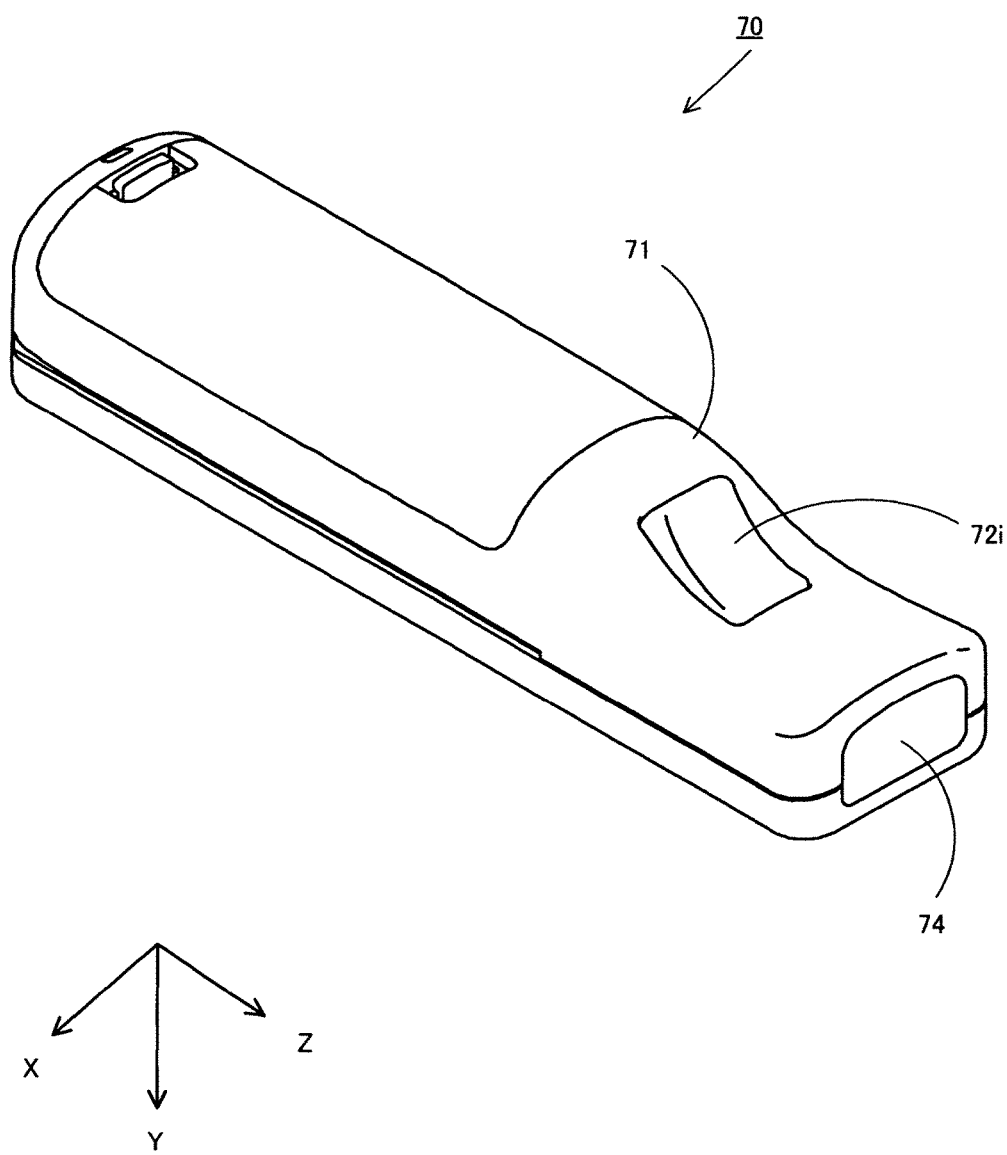

F I G. 1 2
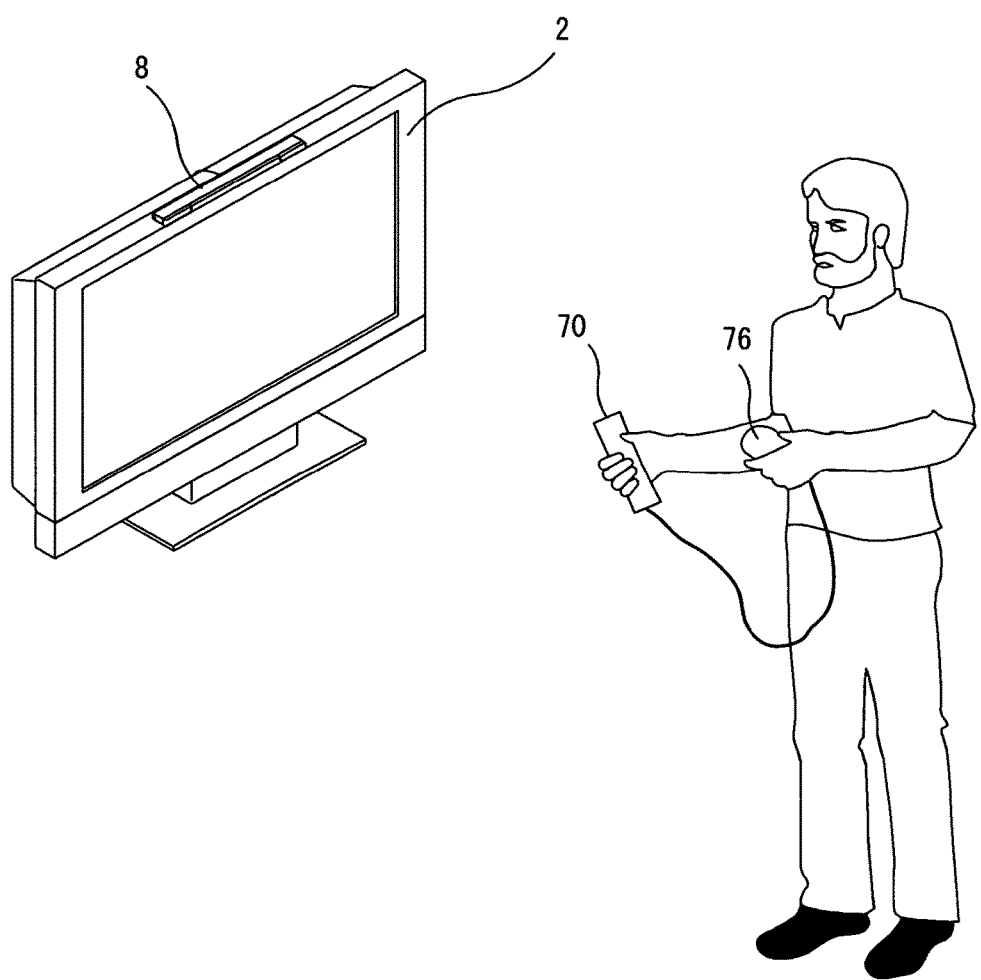

F I G. 1 5
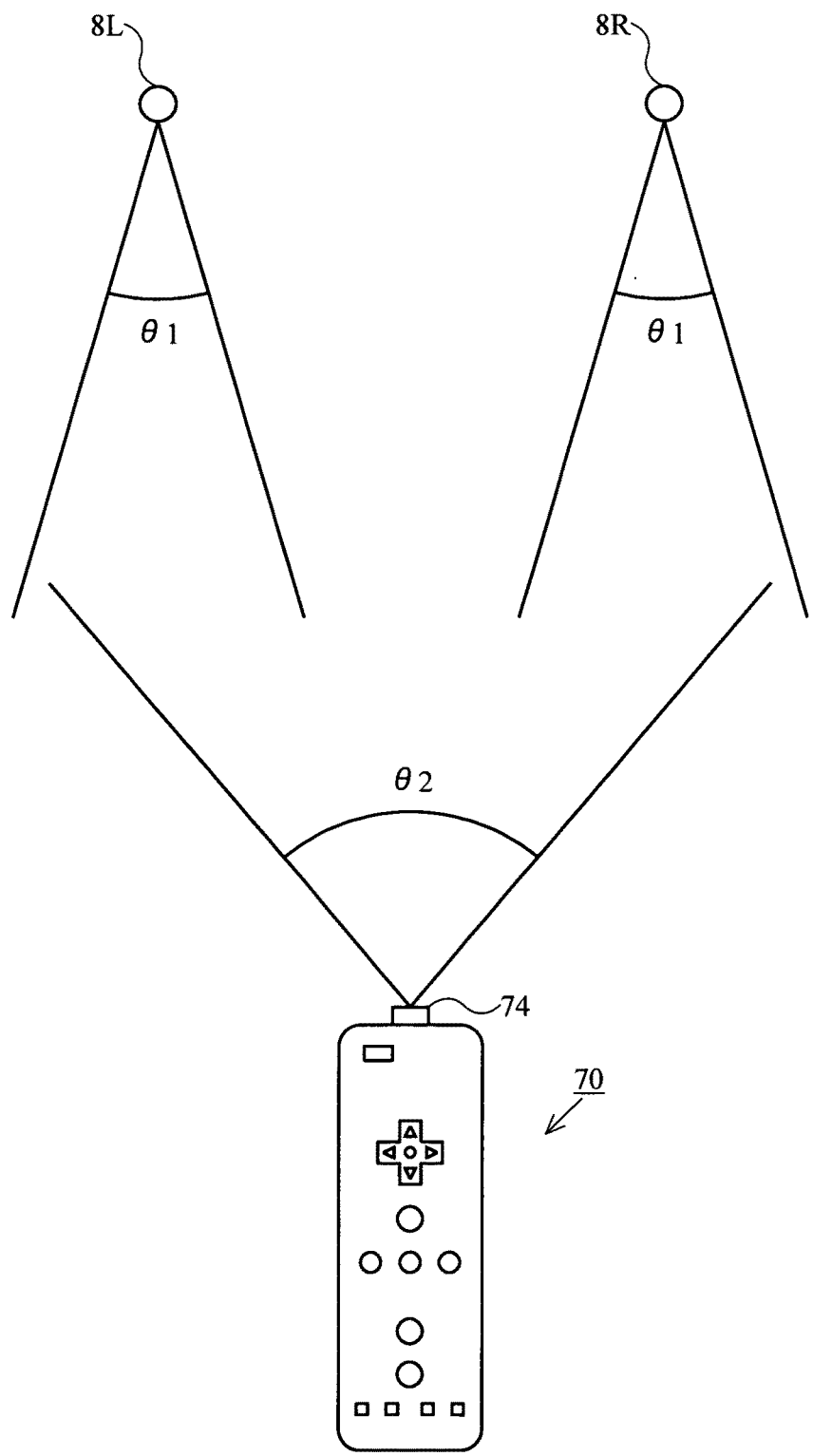

F I G. 2 5
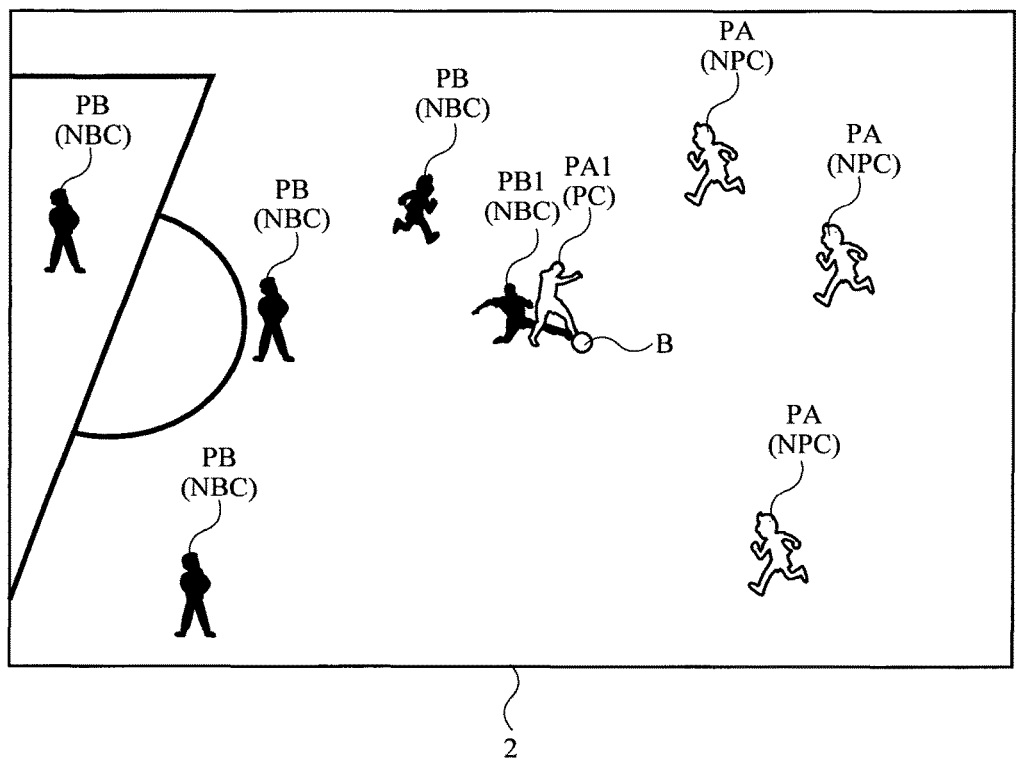

PLAYER CHARACTER COORDINATE SYSTEM

F I G. 2 7
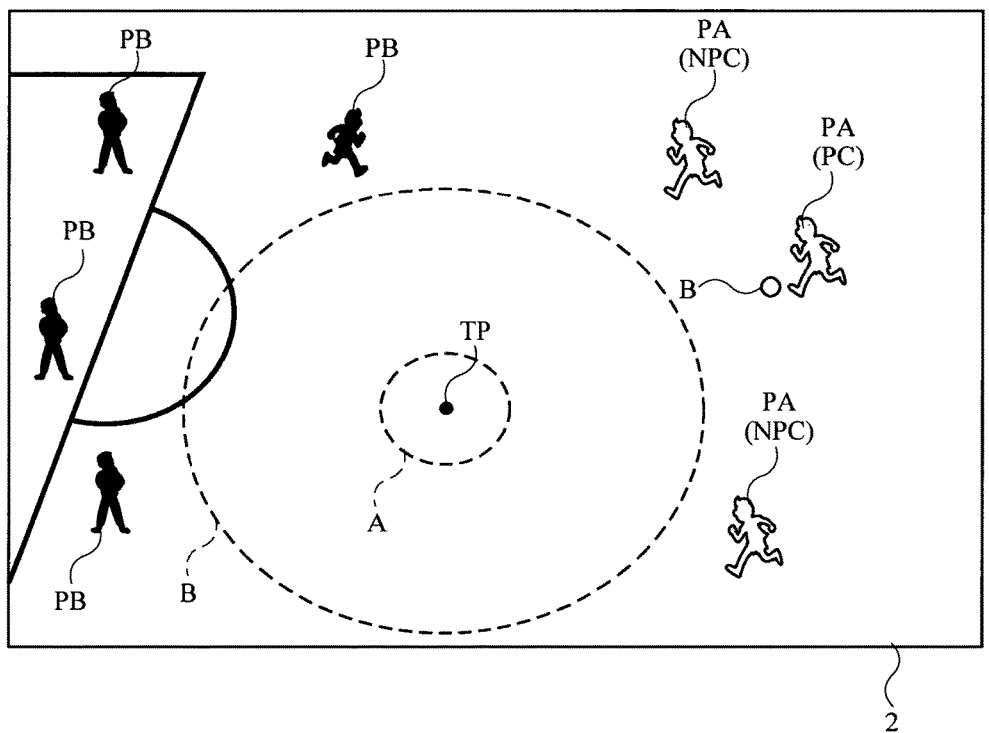

GAME SYSTEM AND STORAGE MEDIUM STORING GAME PROGRAM

CROSS REFERENCE TO RELATED APPLICATION

The disclosure of Japanese Patent Application Nos. 2006-312255, filed on Nov. 17, 2006, and 2007-023489, filed on Feb. 1, 2007, is incorporated herein by reference.

BACKGROUND OF THE INVENTION

Field of the Invention

The present invention relates to a game system and a storage medium storing a game program, and more particularly, to a game system, which is operated by a controller including a sensor which is capable of detecting movement of a housing of the controller, and a storage medium storing a game program.

Description of the Background Art

Conventionally, there have been developed various game apparatuses in which a player plays a game by operating an input device. For example, Japanese Laid-Open Patent Publication No. 1-214385 (hereinafter, referred to as Patent Document 1) discloses an apparatus, which executes game processing by using an output from a sensor for outputting data in accordance with inclination of a main body of an input device as well as an output from direction instruction input means of the input device, which is operated by the player. In the game apparatus disclosed in the Patent Document 1, a realistically-shaped, realistically-sized motorcycle body is used as an input device, a steering angle of a handlebar is used as direction instruction input means, and an inclination sensor for detecting inclination of the motorcycle body is used as a sensor for outputting data in accordance with inclination of the main body of the input device, thereby realizing a motorcycle game which is operated in accordance with outputs from the direction instruction input means and the sensor.

Further, Japanese Laid-Open Patent Publication No. 2000-89906 (hereinafter, referred to as Patent Document 2) discloses an apparatus which executes game processing by using an output from a sensor for outputting data in accordance with inclination of a main body of an input device which is operated by a player. In a direction data output device disclosed in the Patent Document 2, a controller 31 is used as an input device, and outputs from a longitudinal direction sensor 4 and a rotational direction sensor 5, which are provided in the controller 31, are used to perform simulated steering. More specifically, a user holds the controller 31 with both hands, and inclines the controller 31 forward or backward or rotates the controller 31 in a space, thereby performing such an operation that the user steers a simulated airplane.

However, in the game apparatus disclosed in the Patent Document 1, since the input device is the realistically-shaped, realistically-sized motorcycle body, the input device is extremely large in size. Thus, the game apparatus is not suitable as a home-use game apparatus, and cannot be handled depending on a player.

Concerning the direction data output device disclosed in the Patent Document 2, the input device is the large-sized controller which is handled with both hands of the user. Thus, the direction data output device is not suitable to be used as an input device of a game apparatus which is handled and operated with one hand of a player, and lacks versatility.

SUMMARY OF THE INVENTION

Therefore, an object of the present invention is to provide a game system and a storage medium storing a game program, in which a player plays a game while holding a controller.

The present invention has the following features to attain the object mentioned above. It is noted that reference numerals and step numbers in parentheses are merely provided to facilitate the understanding of the present invention in relation to the later-described embodiment, rather than limiting the scope of the present invention in any way.

A first aspect is a game system (3) comprising a game controller (7) including a first housing (77) which is capable of being held with one hand of a player, a game apparatus (5) connected to the game controller, and first movement detection means (761) for detecting movement of the first housing. The game controller includes a direction instruction section (78a) which is provided in the first housing for performing a direction instruction input. The game apparatus included first movement direction control means (S43), and posture control means (S48). The first movement direction control means is means for determining a movement direction of a first object (PC), which appears in a virtual game world, in accordance with an operation of the direction instruction section. The posture control means is means for determining a posture of the first object in the virtual game world in accordance with detection by the first movement detection means. It is noted that the direction instruction section can be, for example, a joystick, or a plurality of button keys (a direction is assigned to each of them).

In a second aspect based on the first aspect, the first housing is formed in such a shape and size that the first housing is held at a side circumference thereof with one hand of the player.

In a third aspect based on the second aspect, the direction instruction section is provided in such a position that when the first housing is held at the side circumference thereof with one hand of the player, the direction instruction section is capable of being operated with a thumb of the one hand. More specifically, a palm of one hand is brought into contact with a side surface (one of a right side surface and a left side surface) of the first housing, and at least one of fingers (an index finger, a middle finger, a ring finger, and a little finger) of the hand (preferably, at least two of them or including at least the middle finger) is brought into contact with the other side surface (the other of the right side surface and the left side surface) of the first housing, whereby the first housing is held. In this held state, the direction instruction section is located within the reach of a thumb.

In a fourth aspect based on the first aspect, the posture control means determines inclination of the first housing in a predetermined direction based on the detection by the first movement detection means, thereby determining inclination of the first object in a predetermined direction in a virtual three-dimensional game space. In this aspect, the first movement detection means detects inclination of the first housing in the predetermined direction (e.g. in a left-right direction (later-described X-axis direction) or a front-rear direction (later-described Y-axis direction) of the first housing. The posture control means controls the first object to be inclined in a predetermined direction in the virtual three-dimensional game space based on the detection. In this case, the posture control means performs processing so as to cause the predetermined direction of the first housing to correspond to the predetermined direction in the virtual three-dimensional game space. For example, at least inclination of the first housing in the left-right direction thereof or in the front-rear direction thereof is detected, and processing is performed so as to incline the first object in X-axis direction or Z-axis direction in a world coordinate system in the virtual three-dimensional game space or in a front-rear direction (Z-axis direction in an object coordinate system or the direction of a movement direction vector of the object) or a left-right direction (X-axis direction in the object coordinate system or a direction perpendicular to the movement direction vector of the object, and in the latter case, the direction may be a direction perpendicular to the movement direction vector and parallel to a virtual horizontal plane or a direction perpendicular to the movement direction vector and Y-axis direction in a local coordinate system of the object) of the first object. Typically, inclination of the first housing in the left-right direction thereof is detected, and processing is performed so as to incline the first object in the left-right direction of the first object. Or, inclination of the first housing in the front-rear direction thereof is detected, and processing is performed so as to incline the first object in the front-rear direction of the first object. It is noted that in this aspect, the first movement detection means outputs detection data (the data may be, for example, acceleration data, image data taken by a camera, or data indicating inclination), based on which inclination of the first housing can be determined. The posture control means determines inclination of the first housing based on the detection data.

In a fifth aspect based on the first aspect, the first movement detection means is capable of detecting at least rotation of the first housing about a predetermined axis. The posture control means determines the rotation of the first housing about the predetermined axis based on the detection by the first movement detection means, and controls the first object to rotate about a predetermined axis in a virtual three-dimensional game space. In this case, the posture control means performs processing so as to cause the predetermined axis of the first housing to correspond to the predetermined axis in the virtual three-dimensional game space. For example, rotation of the first housing about a left-right axis (later described X-axis direction), an up-down axis (later-described Y-axis), or a front-rear axis (later-described Z-axis) thereof is detected, and processing is performed so as to rotate the first object about X-axis, Y-axis, or Z-axis of the world coordinate system in the virtual three-dimensional game space or about a front-rear axis, a left-right axis, or an up-down axis (Y-axis in the object coordinate system) of the first object. Typically, rotation of the first housing about the left-right axis thereof is detected, and processing is performed so as to rotate the first object about the left-right axis of the first object. Or, rotation of the first housing about the front-rear axis thereof is detected, and processing is performed so as to rotate the first object about the front-rear axis of the first object. Or, rotation of the first housing about the up-down axis thereof is detected, and processing is performed so as to rotate the first object about the up-down axis of the first object. It is noted that in this aspect, the first movement detection means outputs detection data (the data may be, for example, data by a gyroscope, velocity data, or image data taken by a camera), based on which rotation of the first housing can be determined. The posture control means determines rotation of the first housing based on the detection data.

In a sixth aspect based on the first aspect, the posture control means determines inclination of the first housing in a predetermined direction and inclination of the first housing in a direction, which is different from the predetermined direction, based on the detection by the first movement detection means, thereby determining inclination of the first object in two directions in a virtual three-dimensional game space in accordance with each detection by the first movement detection means. In other wards, in this aspect, the posture control means performs processing so as to incline the first object in a direction a in the virtual three-dimensional game space in accordance with inclination of the first housing in a direction A, and also performs processing so as to incline the first object in a direction b (a direction different from the direction a) in the virtual three-dimensional game space in accordance with inclination of the first housing in a direction B (a direction different from the direction A). It is noted that preferably, the two directions which the posture control means determines are perpendicular to each other, and the two directions in the virtual game space are perpendicular to each other.

In a seventh aspect based on the first aspect, the posture control means determines rotation of the first housing about a predetermined axis and rotation of the first housing about an axis, which is different from the predetermined axis, based on the detection by the first movement detection means, thereby determining rotation of the first object about two axes in a virtual three-dimensional game space in accordance with each detection by the first movement detection means. In other words, in this aspect, the posture control means performs processing so as to rotate the first object about an axis a in the virtual three-dimensional game space in accordance with rotation of the first housing about an axis A, and also performs processing so as to rotate the first object about an axis b (an axis different from the axis a) in the virtual three-dimensional game space in accordance with rotation of the first housing about an axis B (an axis different from the axis A). It is noted that preferably, the two axes which the posture control means determines are perpendicular to each other, and the two axes in the virtual three-dimensional game space are perpendicular to each other.

In an eighth aspect based on the first aspect, the first movement detection means is capable of detecting acceleration generated in three mutually-perpendicular directions with respect to the first housing. The posture control means determines a three-dimensional posture vector, which indicates the posture of the first object in a virtual three-dimensional game space, in accordance with detection of the acceleration in the three directions by the first movement detection means.

In a ninth aspect based on the first aspect, the first movement detection means is capable of detecting rotation of the first housing about three mutually-perpendicular axes. The posture control means determines a three-dimensional posture vector, which indicates the posture of the first object in a virtual three-dimensional game space, in accordance with detection of the rotation of the first housing about the three axes by the first movement detection means.

In a tenth aspect based on the first aspect, the first movement detection means is capable of detecting values of acceleration generated in three mutually-perpendicular directions with respect to the first housing. The posture control means determines each component value of a three-dimensional posture vector, which indicates the posture of the first object in a virtual three-dimensional game space, in accordance with each of the values detected by the first movement detection means. Typically, the posture control means determines each component value of the posture vector in the local coordinate system of the first object in accordance with each of the values detected by the first movement detection means. Or, the posture control means determines each component value of the posture vector in a coordinate system, which is defined by the movement direction vector of the first object and a vector perpendicular thereto, in accordance with each of the values detected by the first movement detection means. For example, the first movement detection means detects values of acceleration generated in the left-right direction (later-described X-axis direction), the up-down direction (later-described Y-axis direction), and the front-rear direction (later-described Z-axis direction) of the first housing, and the posture control means determines a component value of the posture vector in the left-right direction in the local coordinate system of the first object (typically, an X component value in the local coordinate system) in accordance with the detection of the acceleration value in the left-right direction of the first housing, determines a component value of the posture vector in the front-rear direction in the local coordinate system of the first object (typically, a Z component value in the local coordinate system) in accordance with the detection of the front-rear direction of the first housing, and determines a component value of the posture vector in the up-down direction in the local coordinate system of the first object (typically, a Y component value in the local coordinate system) in accordance with the detection of the up-down direction of the first housing. It is noted that preferably, a positive or negative sign of the acceleration value in the up-down direction of the first housing is inverted, and the component value of the posture vector in the up-down direction in the local coordinate system of the first object is determined. More specifically, it is preferable to satisfy the following equation, the acceleration value in the left-right direction of the first housing: the acceleration value in the up-down direction (positive/negative inversion): the acceleration value in the front-rear direction=the component value of the posture vector in the left-right direction: the component value of the posture vector in the up-down direction: the component value of the posture vector in the front-rear direction.

In an eleventh aspect based on the first aspect, the first movement detection means is capable of detecting values of acceleration generated in mutually-perpendicular two directions with respect to the first housing. The posture control means determines each of two component values of a three-dimensional posture vector, which indicates the posture of the first object in a virtual three-dimensional game space, in accordance with each of the values detected by the first movement detection means. More specifically, the first movement detection means is capable of detecting acceleration generated in the left-right direction of the first housing, and acceleration generated in the front-rear direction of the first housing. The posture control means determines component values of the posture vector in the left-right direction and in the front-rear direction. It is noted that the component value of the posture vector in the up-down direction may be, for example, a constant value. More specifically, it is preferable to satisfy the following equation, the acceleration value in the left-right direction of the first housing: the acceleration value in the front-rear direction=the component value of the posture vector in the left-right direction: the component value of the posture vector in the front-rear direction.

In a twelfth aspect based on the fourth aspect, the first movement direction control means determines, with a first direction in the virtual three-dimensional game space as a reference, a direction in accordance with a direction instructed by the direction instruction section as the movement direction. The posture control means determines the inclination of the first housing in the predetermined direction based on the detection by the first movement detection means, thereby determining inclination of the first object in a direction based on the first direction in the virtual three-dimensional game space. In this aspect, the first movement direction control means can set the first direction to the forward direction of the first object in the virtual three-dimensional game space (a current forward direction when the forward direction is changed in accordance with movement direction control) or a current movement direction of the first object. For example, when a rightward direction is instructed by the direction instruction section, a rightward direction with respect to the first direction is determined to be the current movement direction of the first object. For example, the posture control means is made to be capable of determining at least inclination of the first housing in the forward direction thereof, and performs processing so as to incline the first object in the first direction when determining the inclination of the first housing in the forward direction thereof. In addition to that, the posture control means is made to be capable of determining at least inclination of the first housing in the backward direction thereof, and performs processing so as to incline the first object in a direction opposite to the first direction when determining the inclination of the first housing in the backward direction thereof. Further, in addition to or independently of them, the posture control means is made to be capable of determining at least inclination of the first housing in the leftward or rightward direction thereof, and performs processing so as to incline the first object in a leftward or rightward direction with respect to the first direction when determining the inclination of the first housing in the leftward or rightward direction thereof. It is noted that the direction instruction means may include a stick which is inclinable in the forward direction of the first housing, the first movement direction control means may control the first object to move in the first direction when the stick is inclined in the forward direction of the first housing. The posture control means may be made to be capable of determining inclination of the first housing in the forward direction thereof, and may perform processing so as to incline the first object in the first direction when determining the inclination of the first housing in the forward direction thereof. In addition to that, the direction instruction means may include a stick which is inclinable in the backward direction of the first housing, the first movement direction control means may control the first object to move in the direction opposite to the first direction when the stick is inclined in the backward direction of the first housing. The posture control means may be made to be capable of determining inclination of the first housing in the backward direction thereof, and may perform processing so as to incline the first object in the direction opposite to the first direction when determining the inclination of the first housing in the backward direction thereof. Further, in addition to or independently of them, the direction instruction means may include a stick which is inclinable in the leftward and rightward directions of the first housing, the first movement direction control means may control the first object to move in a leftward or rightward direction with respect to the first direction when the stick is inclined in the leftward or rightward direction of the first housing. The posture control means may be made to be capable of determining inclination of the first housing in the leftward or rightward direction thereof, and may perform processing so as to incline the first object in the leftward or rightward direction with respect to the first direction when determining the inclination of the first housing in the leftward or rightward direction thereof.

In a thirteenth aspect based on the fifth aspect, the first movement direction control means determines, with a first direction in the virtual three-dimensional game space as a reference, a direction in accordance with a direction instructed by the direction instruction section as the movement direction. The posture control means determines the rotation of the first housing about the predetermined axis based on the detection by the first movement detection means, thereby determining rotation of the first object about an axis extending in the first direction in the virtual three-dimensional game space in accordance with detection of the rotation of the first housing about the predetermined axis by the first movement detection means. In this aspect, the first movement direction control means can set the first direction to the forward direction of the first object in the virtual three-dimensional game space (a current forward direction when the forward direction is changed in accordance with movement direction control) or a current movement direction of the first object. For example, when the rightward direction is instructed by the direction instruction section, the rightward direction with respect to the first direction is determined to be the current movement direction of the first object. For example, the posture control means is made to be capable of determining at least rotation of the first housing about the front-rear axis thereof, and performs processing so as to rotate the first object about the first direction axis when determining the rotation of the first housing about the axis extending in the first direction. Further, in addition to or independently of that, the posture control means is made to be capable of determining at least rotation of the first housing about the left-right axis thereof, and performs processing so as to rotate the first object about the axis extending in the first direction when determining the rotation of the first housing about the left-right axis thereof. It is noted that the direction instruction means may include a stick which is inclinable in the forward direction of the first housing, and the first movement direction control means may control the first object to move in the first direction when the stick is inclined in the forward direction of the first housing. The posture control means may be made to be capable of determining rotation of the first housing about the front-rear axis thereof, and may perform processing so as to rotate the first object about the axis extending in the first direction when determining the rotation of the first housing about the front-rear axis thereof. Further, in addition to or independently of them, the direction instruction means may include a stick which is inclinable in the leftward and rightward directions of the first housing, and the first movement direction control means may control the first object to move in a leftward or rightward direction with respect to the first direction when the stick is inclined in the leftward or rightward direction of the first housing. The posture control means may be made to be capable of determining rotation of the first housing about the left-right axis thereof, and may perform processing so as to rotate the first object about a left-right axis with respect to the first direction when determining the rotation of the first housing about the left-right axis thereof.

In a fourteenth aspect based on the twelfth aspect, the direction instruction section includes at least a stick which is inclined in a forward direction of the first housing thereby to perform an instruction input for a forward direction. The first movement direction control means moves the first object in the first direction when the stick is inclined in the forward direction of the first housing. The posture control means determines inclination of the first housing in the forward direction based on the detection by the first movement detection means, and inclines the first object in the first direction when the first movement detection means detects the rotation of the first housing in the forward direction.

In a fifteenth aspect based on the twelfth aspect, the direction instruction section includes at least a stick which is inclined in a leftward or rightward direction of the first housing thereby to perform an instruction input for a leftward or rightward direction. The first movement direction control means moves the first object in a leftward or rightward direction based on the first direction when the stick is inclined in the leftward or rightward direction of the first housing. The posture control means determines inclination of the first housing in the leftward or rightward direction based on the detection by the first movement detection means, and inclines the first object in the leftward or rightward direction based on the first direction.

In a sixteenth aspect based on the twelfth aspect, the direction instruction section is capable of performing a direction instruction for at least a forward, backward, leftward, or rightward direction. The first movement direction control means sets a current movement direction of the first object to be the first direction, and updates and sets, with the first direction as a reference, a direction in accordance with a direction instructed by the direction instruction section as the movement direction. The posture control means determines inclination of the first housing based on the detection by the first movement detection means, thereby determining inclination of the first object in a direction based on the updated and set movement direction.

In a seventeenth aspect based on the first aspect, the game controller further includes a second housing which is provided independently of the first housing and capable of being held with one hand of the player. The game system further comprises second movement detection means for detecting a direction in which the second housing is pointed. The game apparatus further includes second movement direction control means for determining a movement direction of a second object, which is different from the first object, in accordance with detection by the second movement detection means. For example, the first object and the second object are objects among characters which belong to player's team in a sport game or a war game. Alternatively, the first object may be a player character, and the second object may be a ball character. Still alternatively, the first object may be a character, and the second object may be a fired character (a bullet character) which is fired by the character.

In an eighteenth aspect based on the first aspect, the game controller further includes a second housing which is provided independently of the first housing and capable of being held with one hand of the player. The game system further comprises second movement detection means for detecting movement of the second housing. The game apparatus further includes second movement direction control means for determining a movement direction of a second object, which is different from the first object, in accordance with detection by the second movement detection means. The second movement detection means can have the same configuration as that of the first movement detection means.

In a nineteenth aspect based on the seventeenth aspect, the first movement direction control means determines the movement direction of the first object which is selected from a plurality of objects which appear in a virtual game world. The second movement direction control means determines movement directions of at least two of the plurality of objects in accordance with the detection by the second movement detection means. The game apparatus selects the first object from the plurality of objects, and this selection may be made based on user's operation or automatically by a computer. The selection of at least two objects, which are controlled by the second movement direction control means, may be made based on user's operation or automatically by a computer. Of the characters which belong to user's team, the characters other than the first object may be controlled automatically by a computer, or the characters other than the first object and the second object may be controlled automatically by a computer. Preferably, the first object is selected from the user's team based on user's operation.

In a twentieth aspect based on the seventeenth aspect, the first movement detection means is provided in the first housing. The second movement detection means is provided in the second housing. The game controller further includes connection means, and a transmission section. The connection means is means for connecting the first housing and the second housing by a wire or wirelessly, and outputting data generated in one of the first and second housings to the other of the first and second housings. The transmission section is provided in the other of the first and second housings for transmitting input data of the direction instruction section, detection data of the first movement detection means, and detection data of the second movement detection means to the game apparatus. It is noted that in this aspect, identification information storage means for storing identification information data of a game controller or identification information data of a communication link may be provided in the other of the first and second housings, and the transmission section may transmit the input data of the direction instruction section, the detection data of the first movement detection means, and the detection data of the second movement detection means so as to assign the identification information data thereto.

In a twenty-first aspect based on the seventeenth aspect, the game apparatus further includes second object movement control means for controlling the second object to move in the movement direction, which is determined by the second movement direction control means, from a position based on a position of the first object in the virtual game world as a movement start point. For example, the first object is a player character which keeps a ball in a soccer game, and the second object is a ball character. In the case where the twenty-first aspect depends from the seventeenth aspect, for example, the second object moves from the movement start point (e.g. the position of the first object or a predetermined position in the vicinity thereof) toward virtual space coordinates corresponding to pointed coordinates on a game screen, which is detected by the second movement detection means.

In a twenty-second aspect based on the seventeenth aspect, the second object movement direction control means determines the movement direction of the second object in accordance with the detection by the first movement detection means and the detection by the second movement detection means.

In a twenty-third aspect based on the seventeenth aspect, the second movement direction control determines the movement direction of the second object in accordance with the posture of the first object, which is determined by the posture control means, and the detection by the second movement detection means.

In a twenty-fourth aspect based on the first aspect, the first movement detection means is provided in the first housing for detecting the movement of the first housing.

In a twenty-first aspect based on the seventeenth aspect, the second movement detection means is provided in the second housing.

In the present invention, the first movement detection means and the second movement detection means (hereinafter, referred to merely as movement detection means) are means for detecting movement of the housing and a position at which the housing is pointed, and typically, they are sensors which are fixed to the housing. It is noted that in the present invention, the movement of the housing includes a change in orientation (it is synonymous with a change in inclination, and means rotational movement about an axis of the housing). As the sensor, a sensor (an acceleration sensor) for outputting data in accordance with acceleration, a sensor (a magnetic sensor) for outputting data in accordance with orientation, a sensor (a gyro-sensor) for outputting data in accordance with rotational movement, or the like can be used. The acceleration sensor or the gyro-sensor may be a sensor capable of single-axis detection in addition to a sensor capable of multi-axis detection. Alternatively, these sensors may be used in combination for performing further accurate detection. It is noted that a camera fixed to the housing may be used as the sensor. In this case, since an image taken by the camera changes in accordance with a change in the orientation of the housing, the movement of the housing and the change in the orientation (rotation) of the housing can be determined by analyzing the taken image. In addition, the position at which the housing is pointed can be determined.

Depending on a type of the sensor, the movement detection means may be provided independently outside the housing. For example, an image of the housing is taken by a camera as the sensor from outside the housing, and an image of the housing in the taken image is analyzed, thereby determining the movement of the housing. Alternatively, a system, in which a unit fixed to the housing and a unit provided independently outside the housing cooperate with each other, may be used. For example, a light-emitting unit is provided independently outside the housing, and a camera is fixed to the housing for taking an image of light from the light-emitting unit. The image taken by the camera is analyzed to determine the movement of the housing. Another example includes a system, which includes a magnetic field generating apparatus provided independently outside the housing and a magnetic sensor fixed to the housing.

The game apparatus includes processing means, in which the movement of the housing is determined based on an output of the sensor. As described above, the present invention includes the case of determining linear movement of the housing, and the case of determining a change in an orientation (rotation, inclination) of the housing. The latter case will be described in detail below. In the case of determining a change in an orientation of the housing, rotation of the housing about a predetermined axis of the housing (a first type of the correction means) may be determined, or rotation of the housing about a predetermined axis in the real world (a second type of the correction means) may be determined.

(1) The First Type of the Correction Means

The following will describe an example where an acceleration sensor is fixed to the housing. In a simple example, acceleration generated in a predetermined direction of the housing is detected by the acceleration sensor. Using the acceleration detected by the acceleration sensor, a change in a gravitational acceleration component is analyzed, thereby determining rotation of the housing about an axis perpendicular to the direction of the gravitational acceleration. For example, acceleration generated in the up-down direction of the housing is detected, and a change in a component of the gravitational acceleration in the up-down direction is analyzed, thereby determining rotation of the housing about the left-right axis of the housing.

In the case of using the acceleration sensor, when the housing rotates so that inclination of the detection axis of the acceleration sensor is unchanged, for example, when the detection axis of the acceleration sensor corresponds to a rotational axis when the orientation of the housing is changed, a component of the gravitational acceleration in the detection axis is unchanged. This makes it hard to determine rotation of the housing. However, when the detection axis of the acceleration sensor does not correspond to the rotational axis when the orientation of the housing is changed (typically, when the orientation of the housing is changed so that inclination of the detection axis of the acceleration sensor changes along a vertical plane), an output value concerning the detection axis changes because of an effect of the gravitational acceleration, thereby determining rotation of the housing.

In a field of game to which the present invention is applied, it is enough as long as proper game processing is executed when an operation is performed in accordance with an operation manner which is predetermined by the game developer. Even if the proper game processing is not executed when an operation other than the operation in accordance with the operation manner is performed, this does not cause a particular problem. Therefore, if a manner for changing the orientation of the housing (more specifically, about which axis the housing should be rotated) is shown as a proper operation manner in an instruction manual of a game and a game screen, a player performs an operation so as to rotate the housing in accordance with the manner. In other words, it is enough as long as the orientation of the housing is determined based on a rotational operation. It is noted that when the player performs an operation which deviates from the instructed operation, the orientation of the housing cannot be detected accurately. However, if degree of the deviation between the operations is within an accepted range, roughly proper processing result is obtained for the game processing. Further, since a game apparatus usually does not require excellent accuracy, the game apparatus has a practical use even in such a case.

In the case of using the acceleration sensor, the acceleration sensor detects not only the gravitational acceleration applied to the housing but also acceleration applied in accordance with movement of the housing. However, it is possible for one skilled in the art to eliminate the acceleration detected in accordance with the movement. In a simple example, when a value of the acceleration detected by the acceleration sensor is larger (or substantially larger) than that of the gravitational acceleration, the value of the detected acceleration is considered not to indicate the gravitational acceleration, and processing of eliminating the value of the detected acceleration may be executed. Or, only when a change in the value of the acceleration detected by the acceleration sensor is small, the value of the detected acceleration is considered to indicate the gravitational acceleration, and the value of the detected acceleration may be used for processing of orientation analysis. Further, a high-frequency component of the acceleration detected by the acceleration sensor may be eliminated. In the case of a game in which the housing does not need to be moved violently, the processing of eliminating the acceleration applied in accordance with the movement of the housing may not be executed. This is because even when the acceleration in accordance with the movement of the housing is detected, unless the player moves the housing violently, a correct result is obtained to some extent, and thus the game apparatus has a sufficient practical use.

In the case of using the acceleration sensor capable of multi-axis detection and using values of acceleration generated in multi-axis directions, a rotational angle of the housing from a reference orientation is calculated, thereby enabling further detailed determination. For example, predetermined calculation processing is executed by using values of acceleration in two-axis directions which are detected by the acceleration sensor, thereby calculating the rotation angle of the housing. Typically, calculation processing using a trigonometric function, such as assigning the values of the acceleration in the two-axis directions in an inverse trigonometric function, or the like, may be executed for calculating the rotation angle of the housing.

Further, in the case of using the acceleration sensor capable of multi-axis detection, based on the detection axis direction in which acceleration changes, which detection axis the housing rotates about can be determined. In the case of using an acceleration sensor for detecting acceleration in three-axis directions, for example, calculation processing is executed by using values of acceleration in first axis and second axis directions, thereby determining rotation of the housing about a third axis direction. Or, calculation processing is executed by using values of acceleration in the first axis and third axis directions, thereby determining rotation of the housing about the second axis direction.

When the housing is rotated in the real space, a centrifugal force is generated in the housing. The centrifugal force may be detected by the acceleration sensor, and used for determining a change in the orientation of the housing. More specifically, for example, when acceleration generated in a direction of the housing is detected by the acceleration sensor, it can be determined that there is a probability that the housing is rotated about an axis extending in a direction perpendicular to the direction of the housing.

The following will describe the case where a gyro-sensor is fixed to the housing. In this case, when the orientation of the housing is changed (namely, when the housing is rotated about a predetermined axis of a local coordinate system), the gyro-sensor directly detects the rotation, and outputs angular velocity data. Based on the outputted angular velocity data, a change in the orientation of the housing from the reference orientation can be determined. More specifically, a change in a rotation angle of the housing can be determined by using the angular velocity data. Typically, it is possible determine a change in a rotation angle of the housing about the front-rear axis of the housing, a change in a rotation angle of the housing about the left-right axis of the housing, and/or a change in a rotation angle of the housing about the up-down axis of the housing. By setting a rotation angle of the housing in the initial state, it is possible to determine the rotation angle of the housing about the front-rear axis of the housing, the rotation angle of the housing about the left-right axis of the housing, and/or the rotation angle of the housing about the up-down axis of the housing.

(2) The Second Type of the Correction Means

Typically, an acceleration sensor capable of detecting acceleration in three-axis directions is fixed to the housing. The direction of gravity with respect to the housing is determined based on a value of the acceleration in each axis direction, thereby determining a rotation angle of the housing about a horizontal axis. Alternatively, for example, values of acceleration in first-axis and second-axis directions, which are detected by an acceleration sensor capable of detecting acceleration in three-axis directions, are combined to calculate a combined vector. From a two-dimensional vector having the magnitude of the combined vector and a value of acceleration in a third-axis direction, it is possible to determine a rotation angle of the third-axis about the horizontal axis. Alternatively, an orientation sensor is provided in the housing, and thus it is possible to determine a rotation angle about a vertical axis.

In the case of detecting the position, at which the housing is pointed, by using data outputted from the movement detection means, the movement detection means is means capable of detecting a direction in which a predetermined axis of the housing is pointed, such as an element for detecting movement by analyzing an image taken by imaging means provided in the housing (including, for example, a system realized by an imaging information calculation section 74 and a marker 8, which are described later), or the like. Preferably, the movement detection means is an element capable of detecting pointed coordinates on a game screen.

A twenty-sixth aspect is a game system comprising a game controller including a housing which is capable of being held with one hand of a player, a game apparatus connected to the game controller, and movement detection means for detecting movement of the housing. The housing is formed in such a shape and size that the housing is held at a side circumference thereof with one hand of the player. The game controller includes a direction instruction section which is provided in such a position that when the housing is held with one hand of the player, the direction instruction section is capable of being operated with a thumb of the one hand for performing a direction instruction input. The game apparatus includes movement direction control means, posture control means, and display control means. The movement direction control means is means for determining, with, as a reference, a forward direction of an object which appears in a virtual three-dimensional game space, a direction instructed by the direction instruction section as a movement direction of the object, and changing the forward direction of the object to the movement direction. The posture control means is means for determining inclination of the housing based on detection by the movement detection means, and inclining the object in a current forward direction thereof when it is indicated that the housing is inclined in a direction in which the player performs an input operation for a forward or backward direction by using the direction instruction section. The display control means is means for moving the object having the inclination, which is determined by the posture control means, in the movement direction, which is determined by the movement direction control means, in the virtual three-dimensional game space, and for displaying the object on a display device.

A twenty-seventh aspect is a game system comprising a game controller including a housing which is capable of being held with one hand of a player, a game apparatus connected to the game controller, and movement detection means for detecting movement of the housing. The housing is formed in such a shape and size that the housing is held at a side circumference thereof with one hand of the player. The game controller includes a direction instruction section which is provided in such a position that when the housing is held with one hand of the player, the direction instruction section is capable of being operated with a thumb of the one hand for performing a direction instruction input. The game apparatus includes movement direction control means, posture control means, and display control means. The movement direction control means is means for determining, with, as a reference, a forward direction of an object which appears in a virtual three-dimensional game space, a direction instructed by the direction instruction section as a movement direction of the object, and changing the forward direction of the object to the movement direction. The posture control means is means for determining inclination of the housing based on detection by the movement detection means, and inclining the object in a direction perpendicular to a current forward direction of the object when it is indicated that the housing is inclined in a direction in which the player performs an input operation for a leftward or rightward direction by using the direction instruction section. The display control means is means for moving the object having the inclination, which is determined by the posture control means, in the movement direction, which is determined by the movement direction control means, in the virtual three-dimensional game space, and for displaying the object on a display device.

A twenty-eighth aspect is a game system comprising a game controller including a housing which is capable of being held with one hand of a player, a game apparatus connected to the game controller, and movement detection means for detecting movement of the housing. The housing is formed in such a shape and size that the housing is held at a side circumference thereof with one hand of the player. The game controller includes a direction instruction section which is provided in such a position that when the housing is held with one hand of the player, the direction instruction section is capable of being operated with a thumb of the one hand for performing a direction instruction input. The game apparatus includes movement direction control means, posture control means, and display control means. The movement direction control means is means for determining, with, as a reference, a forward direction of an object which appears in a virtual three-dimensional game space, a direction instructed by the direction instruction section as a movement direction of the object, and changing the forward direction of the object to the movement direction. The posture control means is means for determining inclination of the housing based on detection by the movement detection means, inclining the object in a current forward direction thereof when it is indicated that the housing is inclined in a direction in which the player performs an input operation for a forward or backward direction by using the direction instruction section, and inclining the object in a direction perpendicular to the current forward direction of the object when it is indicated that the housing is inclined in a direction in which the player performs an input operation for a leftward or rightward direction by using the direction instruction section. The display control means is means for moving the object having the inclination, which is determined by the posture control means, in the movement direction, which is determined by the movement direction control means, in the virtual three-dimensional game space, and for displaying the object on a display device.

A twenty-ninth aspect is a game system comprising a game controller including a housing which is capable of being held with one hand of a player, a game apparatus connected to the game controller, and movement detection means for detecting movement of the housing. The housing is formed in such a shape and size that the housing is held at a side circumference thereof with one hand of the player. The game controller includes a direction instruction section which is provided in such a position that when the housing is held with one hand of the player, the direction instruction section is capable of being operated with a thumb of the one hand for performing a direction instruction input. The game apparatus includes movement direction control means, posture control means, and display control means. The movement direction control means is means for determining, with, as a reference, a forward direction of an object which appears in a virtual three-dimensional game space, a direction instructed by the direction instruction section as a movement direction of the object. The posture control means is means for determining inclination of the housing based on detection by the movement detection means, and inclining the object in the forward direction thereof when it is indicated that the housing is inclined in a direction in which the player performs an input operation for a forward or backward direction by using the direction instruction section. The display control means is means for moving the object having the inclination, which is determined by the posture control means, in the movement direction, which is determined by the movement direction control means, in the virtual three-dimensional game space, and for displaying the object on a display device.

A thirtieth aspect is a game system comprising a game controller including a housing which is capable of being held with one hand of a player, a game apparatus connected to the game controller, and movement detection means for detecting movement of the housing. The housing is formed in such a shape and size that the housing is held at a side circumference thereof with one hand of the player. The game controller includes a direction instruction section which is provided in such a position that when the housing is held with one hand of the player, the direction instruction section is capable of being operated with a thumb of the one hand for performing a direction instruction input. The game apparatus includes movement direction control means, posture control means, and display control means. The movement direction control means is means for determining, with, as a reference, a forward direction of an object which appears in a virtual three-dimensional game space, a direction instructed by the direction instruction section as a movement direction of the object. The posture control means is means for determining inclination of the housing based on detection by the movement detection means, and inclining the object in a direction perpendicular to the forward direction of the object when it is indicated that the housing is inclined in a direction in which the player performs an input operation for a leftward or rightward direction by using the direction instruction section. The display control means is means for moving the object having the inclination, which is determined by the posture control means, in the movement direction, which is determined by the movement direction control means, in the virtual three-dimensional game space, and for displaying the object on a display device.

A thirty-first aspect is a game system comprising a game controller including a housing which is capable of being held with one hand of a player, a game apparatus connected to the game controller, and movement detection means for detecting movement of the housing. The housing is formed in such a shape and size that the housing is held at a side circumference thereof with one hand of the player. The game controller includes a direction instruction section which is provided in such a position that when the housing is held with one hand of the player, the direction instruction section is capable of being operated with a thumb of the one hand for performing a direction instruction input. The game apparatus includes movement direction control means, posture control means, and display control means. The movement direction control means is means for determining, with, as a reference, a forward direction of an object which appears in a virtual three-dimensional game space, a direction instructed by the direction instruction section as a movement direction of the object. The posture control means is means for determining inclination of the housing based on detection by the movement detection means, inclining the object in the forward direction thereof when it is indicated that the housing is inclined in a direction in which the player performs an input operation for a forward or backward direction by using the direction instruction section, and inclining the object in a direction perpendicular to the forward direction of the object when it is indicated that the housing is inclined in a direction in which the player performs an input operation for a leftward or rightward direction by using the direction instruction section. The display control means is means for moving the object having the inclination, which is determined by the posture control means, in the movement direction, which is determined by the movement direction control means, in the virtual three-dimensional game space, and for displaying the object on a display device.

In a thirty-second aspect based on the twenty-sixth aspect, the movement detection means is provided in the housing for detecting the movement of the housing.

A thirty-third aspect is a game system comprising a game controller operated by a player, and a game apparatus connected to the game controller. The game controller includes a first housing, a direction instruction section, a second housing, and movement detection means. The first housing is capable of being held with one hand of the player. The direction instruction section is provided in the first housing for performing a direction instruction input. The second housing is provided independently of the first housing and capable of being held with one hand of the player. The movement detection means is means for detecting movement of the second housing. The game apparatus includes movement direction control means, and posture control means. The movement direction control means is means for determining a movement direction of an object, which appears in a virtual game world, in accordance with an operation of the direction instruction section. The posture control means is means for determining a posture of the object in the virtual game world in accordance with detection by the movement detection means.

A thirty-fourth aspect is a computer-readable storage medium storing a game program which is executed by a computer of a game apparatus connected to a game controller which includes: a housing capable of being held with one hand of a player; a direction instruction section for performing a direction instruction input; and movement detection means for detecting movement of the housing. The game program causes the computer to function as movement direction control means, and posture control means. The movement direction control means is means for determining a movement direction of an object, which appears in a virtual game world, in accordance with an operation of the direction instruction section. The posture control means is means for determining a posture of the object in the virtual game world in accordance with detection by the movement detection means.

A thirty-fifth aspect is a game system comprising a game controller including a housing which is capable of being held with one hand of a player, a game apparatus connected to the game controller, and movement detection means for detecting movement of the housing. The game controller includes a direction instruction section which is provided in the housing for performing a direction instruction input.

Typically, the movement detection means detects linear movement of the housing or rotation of the housing about an axis. The game apparatus includes movement control means, and motion control means. The movement control means is means for controlling movement of an object, which appears in a virtual game world, in accordance with an operation of the direction instruction section. The motion control means is means for causing the object in the virtual game world to perform a predetermined motion in accordance with detection by the movement detection means.

It is noted that the motion control means controls the object so as to perform the predetermined motion at the position in the virtual game world, which is determined by the movement control means. For example, the predetermined motion may be a jump motion of the object, a feint motion of the object, a motion that the object attacks another object, or the like. Preferably, the motion control by the motion control means is performed so as not to change the position of the object in the virtual game world.

Further, the motion control means causes the object to perform the predetermined motion in accordance with movement of the housing in a predetermined direction (in a predetermined direction of the housing, in a predetermined direction (a horizontal direction or a vertical direction) in a real space, or the like), rotation of the housing in a predetermined direction (rotation of the housing about a predetermined axis of the housing), movement of the housing in a predetermined movement pattern, or the like.

In a thirty-sixth aspect based on the thirty-fifth aspect, the housing is formed in such a shape and size that the housing is held at a side circumference thereof with one hand of the player.

In a thirty-seventh aspect based on the thirty-sixth aspect, the direction instruction section is provided in such a position that when the housing is held at the side circumference thereof with one hand of the player, the direction instruction section is capable of being operated with a thumb of the one hand.

In a thirty-eighth aspect based on the thirty-fifth aspect, the movement detection means is capable of detecting acceleration generated with respect to the housing. The motion control means determines acceleration generated in a predetermined direction of the housing based on the detection by the movement detection means, and causes the object to perform the predetermined motion when the acceleration satisfies a predetermined condition.

In a thirty-ninth aspect based on the thirty-eighth aspect, the motion control means determines a history of the acceleration generated in the predetermined direction of the housing based the detection by the movement detection means, and causes the object to perform the predetermined motion when the history satisfies a predetermined condition.

In a fortieth aspect based on the thirty-fifth aspect, the movement detection means is capable of detecting at least rotation of the housing about a predetermined axis. The motion control means determines the rotation of the housing about the predetermined axis based on the detection by the movement detection means, and causes the object to perform the predetermined motion when the rotation satisfies a predetermined condition.

In a forty-first aspect based on the thirty-fifth aspect, the direction instruction section includes an operation section which is pressed in a predetermined direction of the housing thereby to perform an input. The movement control means moves the object in a predetermined direction in the virtual game world when the input is performed by pressing the operation section in the predetermined direction of the housing. The motion control means causes the object in the virtual game world to perform the predetermined motion in accordance with movement of the housing in the predetermined direction of the housing.

The direction instruction section is, for example, a cross key (or buttons arranged in a square) or a joystick (or a slidable operation section). An input can be performed by pressing the cross key or the joystick in a predetermined direction of the housing (a forward, backward, leftward and/or rightward direction of the housing) (in the case of the stick, an input can be performed by inclining the stick in the forward, backward, leftward, and/or rightward direction of the housing). For example, the movement control means moves the object in the forward direction of the object when an input is performed by pressing the operation section in the forward direction of the housing.

For example, the movement detection means is an acceleration sensor, and the motion control means causes the object to perform the predetermined motion in accordance with predetermined acceleration generated in a predetermined direction of the housing. Concerning the "predetermined motion", motion data is set in advance by a program, and referred to for causing the object to perform a predetermined motion. It is noted that the motion control means may not cause the object to perform the predetermined motion when a velocity or a magnitude of movement of the housing is equal to or lower than a predetermined level. Alternatively, the motion control means may cause the object in the virtual game world to perform a different motion in accordance with a velocity or a magnitude of movement of the housing.

In a forty-second aspect based on the thirty-fifth aspect, the direction instruction section includes an operation section which is pressed in a predetermined direction of the housing thereby to perform an input. The movement control means moves the object in a first direction in the virtual game world when the input is performed by pressing the operation section in the predetermined direction of the housing. The motion control means causes the object in the virtual game world to perform the predetermined motion in accordance with movement of the housing in a direction perpendicular to the predetermined direction of the housing.

In a forty-third aspect based on the forty-first aspect, the direction instruction section includes an operation section which is pressed in a predetermined direction of the housing or in a direction perpendicular to the predetermined direction of the housing thereby to perform an input. The movement control means moves the object in a first direction in the virtual game world when the input is performed by pressing the operation section in the predetermined direction of the housing, and moves the object in a second direction perpendicular to the first direction in the virtual game world when the input is performed by pressing the operation section in the perpendicular direction. The motion control means causes the object in the virtual game world to perform a first motion as the predetermined motion in accordance with movement of the housing in the predetermined direction of the housing, and causes the object in the virtual game world to perform a second motion, which is different from the first motion, as the predetermined motion in accordance with movement of the housing in the perpendicular direction.

The first motion and the second motion are different in type from each other. Typically, motion data for the first motion and motion data for the second motion are set in advance as motion data by a program. The motion control means refers to the motion data for the first motion in accordance with movement of the housing in the predetermined direction, and causes the object to perform the first motion. The motion control means refers to the motion data for the second motion in accordance with movement of the housing in the perpendicular direction, and causes the object to perform the second motion. For example, the object may be caused to perform a feint motion (e.g. a scissors feint) of a type as the first motion, and to perform a feint motion (e.g. a feint that a body is moved right and left) of a different type as the second motion.

In a forty-fourth aspect based on the thirty-fifth aspect, the direction instruction section includes an operation section which is pressed in a predetermined direction of the housing thereby to perform an input. The movement control means moves the object in a forward direction of the object in the virtual game world when the input is performed by pressing the operation section in the predetermined direction of the housing, and changes a movement amount of the object in accordance with an amount of the input by pressing the operation section. The motion control means causes the object in the virtual game world to perform the predetermined motion in accordance with movement of the housing in a direction perpendicular to the predetermined direction of the housing.

The movement control means determines the movement amount of the object, for example, in accordance with an inclination amount of the stick, a slide amount of the operation section, a pressing amount of the key, or a magnitude of force which presses the key (e.g. the movement amount is increased with an increase in the inclination amount, or the like). Since the motion control means determines movement of the housing in the perpendicular direction, the motion control means can cause the object to perform a motion when the housing is moved in the perpendicular direction while the movement of the object in the forward direction thereof is adjusted by using the direction instruction section.

In a forty-fifth aspect based on the thirty-fifth aspect, the direction instruction section includes an operation section which is pressed in a predetermined direction of the housing thereby to perform an input. The movement control means moves the object in a predetermined direction in the virtual game world when the input is performed by pressing the operation section in the predetermined direction of the housing. The motion control means causes the object in the virtual game world to perform the predetermined motion in accordance with movement of the housing in a direction opposite to the predetermined direction of the housing after movement of the housing in the predetermined direction of the housing.

The motion control means may cause the object to perform the predetermined motion in accordance with a repeat of movement of the housing in the predetermined direction and in a direction opposite to the predetermined direction. Alternatively, the motion control means may change a type of the motion in accordance with a number of times of the repeat of movement of the housing in the predetermined direction and in the direction opposite to the predetermined direction.

In a forty-sixth aspect based on the thirty-fifth aspect, the direction instruction section includes an operation section which is pressed in a predetermined direction of the housing thereby to perform an input. The movement control means moves the object in a predetermined direction in the virtual game world when the input is performed by pressing the operation section in the predetermined direction of the housing. The motion control means causes the object in the virtual game world to perform the predetermined motion in accordance with rotation of the housing about an axis perpendicular to the predetermined direction of the housing.

It is noted that the direction instruction section is the same as the direction instruction section of the forty-first aspect. The movement detection means is, for example, an acceleration sensor or a gyro-sensor, and the motion control means causes the object to perform the predetermined motion in accordance with rotation of the housing about the predetermined axis perpendicular to the predetermined direction (typically, about a predetermined axis of the housing or a horizontal axis). Concerning the "predetermined motion", typically, motion data is set in advance by a program, and referred to for causing the object to perform a predetermined motion.

In a forty-seventh aspect based on the thirty-fifth aspect, the direction instruction section includes an operation section which is pressed in a predetermined direction of the housing thereby to perform an input. The movement control means moves the object in a predetermined direction in the virtual game world when the input is performed by pressing the operation section in the predetermined direction of the housing. The motion control means causes the object in the virtual game world to perform the predetermined motion in accordance with rotation of the housing about an axis extending the predetermined direction of the housing.

In a forty-eighth aspect based on the thirty-fifth aspect, the direction instruction section includes an operation section which is pressed in a predetermined direction of the housing or in a direction perpendicular to the predetermined direction of the housing thereby to perform an input. The movement control means moves the object in a first direction in the virtual game world when the input is performed by pressing the operation section in the predetermined direction of the housing, and moves the object in a second direction perpendicular to the first direction in the virtual game world when the input is performed by pressing the operation section in the perpendicular direction. The motion control means causes the object in the virtual game world to perform a first motion as the predetermined motion in accordance with rotation of the housing about an axis perpendicular to the predetermined direction of the housing, and causes the object in the virtual game world to perform a second motion, which is different from the first motion, as the predetermined motion in accordance with rotation of the housing about an axis extending in the predetermined direction of the housing.

The first motion and the second motion are different in type from each other. Typically, motion data for the first motion and motion data for the second motion are set in advance as motion data by a program. The motion control means refers to the motion data for the first motion in accordance with movement of the housing in the predetermined direction, and causes the object to perform the first motion. The motion control means refers to the motion data for the second motion in accordance with movement of the housing in the perpendicular direction, and causes the object to perform the second motion. For example, the object may be caused to perform a feint motion (e.g. a scissors feint) of a type as the first motion, and to perform a feint motion (e.g. a feint that a body is moved right and left) of a different type as the second motion.

In a forty-ninth aspect based on the thirty-fifth aspect, the direction instruction section includes an operation section which is pressed in a predetermined direction of the housing thereby to perform an input. The movement control means moves the object in a forward direction of the object in the virtual game world when the input is performed by pressing the operation section in the predetermined direction of the housing, and changes a movement amount of the object in accordance with an amount of the input by pressing the operation section. The motion control means causes the object in the virtual game world to perform the predetermined motion in accordance with rotation of the housing about an axis extending in the predetermined direction of the housing.

In a fiftieth aspect based on the thirty-fifth aspect, the direction instruction section includes an operation section which is pressed in a predetermined direction of the housing thereby to perform an input. The movement control means moves the object in a predetermined direction in the virtual game world when the input is performed by pressing the operation section in the predetermined direction of the housing. The motion control means causes the object in the virtual game world to perform the predetermined motion in accordance with rotation of the housing in a reverse direction about an axis perpendicular to the predetermined direction of the housing after rotation of the housing about the axis.

It is noted that the motion control means may cause the object in the virtual game world to perform the predetermined motion in accordance with a repeat of rotation of the housing in both directions. Further, the motion control means may change a type of the motion in accordance with a number of times of the repeat.

In a fifty-first aspect based on the thirty-fifth aspect, the direction instruction section includes an operation section which is pressed in a predetermined direction of the housing thereby to perform an input. The movement control means moves the object in a forward direction of the object in the virtual game world when the input is performed by pressing the operation section in the predetermined direction of the housing, and changes a movement mount of the object in accordance with an amount of the input by pressing the operation section. The motion control means causes the object in the virtual game world to perform the predetermined motion in accordance with rotation of the housing about an axis extending in the predetermined direction.

The movement control means determines the movement amount of the object, for example, in accordance with an inclination amount of the stick, a slide amount of the operation section, a pressing amount of the key, or a magnitude of force which presses the key (e.g. the movement amount is increased with an increase in the inclination amount, or the like). Since the motion control means determines rotation of the housing about the perpendicular axis, the motion control means can cause the object to perform a motion when the housing is rotated about the perpendicular axis while the movement of the object in the forward direction thereof is adjusted by using the direction instruction section.

In a fifty-second aspect based on the thirty-fifth aspect, the direction instruction section includes an operation section which is pressed in a predetermined direction of the housing thereby to perform an input. The movement control means moves the object in a forward direction of the object in the virtual game world when the input is performed by pressing the operation section in the predetermined direction of the housing, and changes a movement mount of the object in accordance with an amount of the input by pressing the operation section. The motion control means causes the object in the virtual game world to perform the predetermined motion in accordance with a repeat of rotation of the housing in both directions about an axis perpendicular to the predetermined direction of the housing.

In a fifty-third aspect based on the fifty-second aspect, the motion control means causes the object in the virtual game world to perform a different motion in accordance with a number of times of the repeat.

In a fifty-fourth aspect based on the forty-first aspect, the motion control means causes the object in the virtual game world to perform a different motion in accordance with a velocity of the movement of the housing.

According to the first aspect, since the first housing of the game controller is capable of being held and operated with one hand of the player, an input device is small enough in size to be easy to handle. In addition, the player can efficiently and intuitively input movement direction control and posture control with respect to the first object, such as a player character, or the like, with one hand.

According to the second aspect, the player can hold the first housing so as to wrap one hand therearound, and can play a game while freely moving the hand.

According to the third aspect, the player can hold the first housing so as to wrap one hand therearound, and can perform an input with a thumb of the hand, similarly as in the case of the conventional controller, while freely moving the one hand.

According to the fourth aspect, the player can incline the object in the predetermined direction by moving the main body of the game controller.

According to the sixth aspect, the player can incline the object in two directions by moving the main body of the game controller.

According to the eighth aspect, the player can change the posture of the object in the virtual three-dimensional space by moving the main body of the game controller.

According to the tenth aspect, the player can change the posture of the object in the virtual three-dimensional space by moving the main body of the game controller. In addition, each of the three-axis acceleration components with respect to the main body of the game controller is assigned to each component of the posture vector, which indicates the posture of the object in the virtual three-dimensional space, thereby reducing a burden of processing.

According to the twelfth aspect, the player can incline the object based on the movement direction of the object by moving the main body of the game controller.

According to the fourteenth aspect, the player can incline the object in the forward or backward direction thereof by inclining the main body of the game controller in the forward or backward direction thereof.

According to the fifteenth aspect, the player can incline the object in the forward or backward direction thereof by inclining the main body of the game controller in a forward or backward direction in which the stick is inclined for performing a direction input operation.

According to the sixteenth aspect, the player can incline the object in a forward or backward direction thereof based on a direction, in which the object faces, by inclining the main body of the game controller while changing the direction, in which the object faces.

According to the seventeenth and eighteenth aspects, the player can hold the first housing and the second housing with left and right hands, respectively, and can perform different operations with the left and right hands. This can provide an unprecedented new operation. For example, it is possible to provide a game, in which the player operates the first object with one hand, and the second object with the other hand.

According to the nineteenth aspect, the player can operate a plurality of objects with the other hand while operating the first object with one hand.

According to the twentieth aspect, data generated in a plurality of housings can be transmitted from the transmission section to the game apparatus.

According to the thirty-third aspect, since the first housing of the game controller is capable of being held and operated with one hand of the player, an input device is small enough in size to be easy to handle. In addition, the player can efficiently and intuitively input movement direction control and posture control with respect to the object, such as a player character, or the like, with both hands.

According to the thirty-fifth aspect, since the first housing of the game controller is capable of being held and operated with one hand of the player, an input device is small enough in size to be easy to handle. In addition, for example, the player can cause the object to perform a motion by moving one hand while moving the object, such as a player character, or the like, by moving the direction instruction section with a fingertip.

According to the forty-first aspect, the player makes a direction, in which a finger moves, correspond to a direction, in which a hand moves, and thus both of the operations become easy.

According to the forty-second aspect, the player makes the direction, in which the finger moves, independent from the direction, in which the hand moves, and thus both of the operations do not affect each other.

According to the storage medium storing the game program of the present invention, the same advantageous effects as those of the game system described above can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a perspective view of the core unit 70 in FIG. 5 seen from a bottom front side thereof;

FIG. 12 illustrates a state where a game operation is performed by means of the controller 7 in FIG. 3;

FIG. 15 is a view illustrating viewing angles of LED modules 8L and 8R and an image pickup element 743;

FIG. 25 is an exemplary view illustrating a game image displayed on a monitor 2;

FIG. 27 is a view illustrating a target position TP of a pass and regions A and B;

DESCRIPTION OF THE PREFERRED EMBODIMENTS

Figure 1:
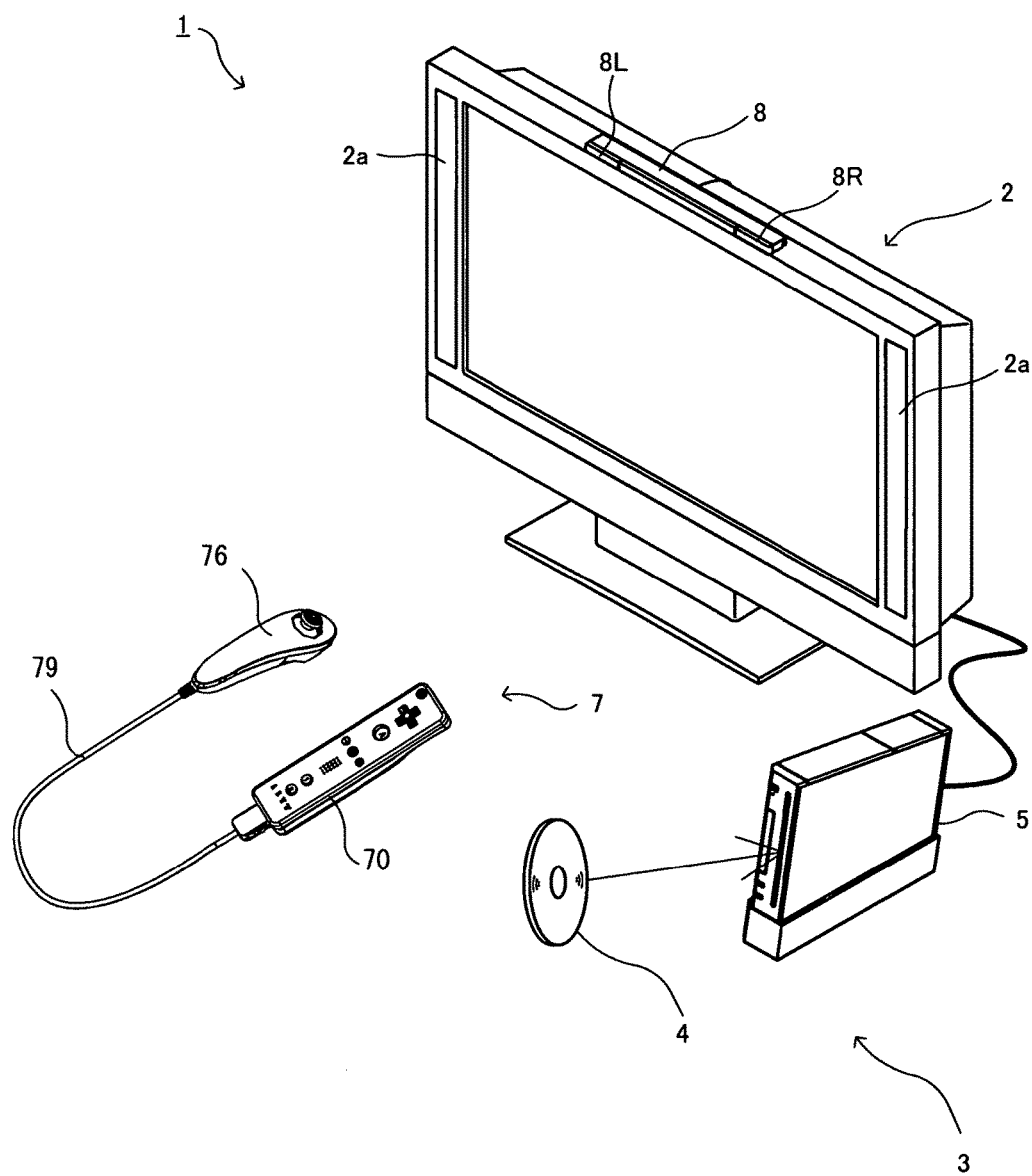
FIG. 1 is an external view illustrating a game system 1 according to an embodiment of the present invention.
Figure 2:
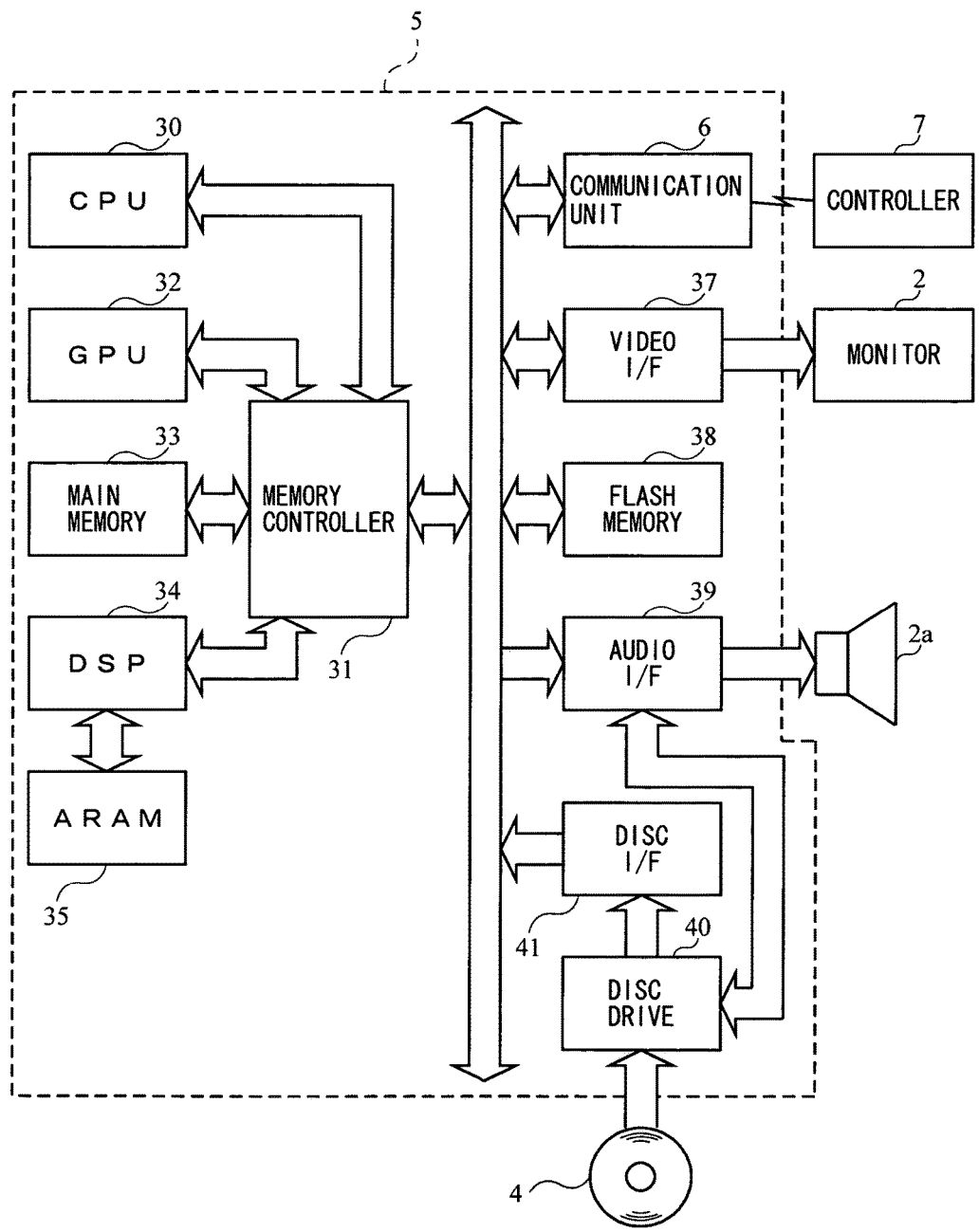
FIG. 2 is a functional block diagram of a game apparatus main body 5 in FIG. 1.

With reference to FIG. 1, the following will describe a game apparatus according to an embodiment of the present invention. Hereinafter, a game system including a stationary game apparatus as an example of the game apparatus will be described in detail. FIG. 1 is an external view illustrating the game system 1 including the stationary game apparatus 3, and FIG. 2 is a block diagram of a game apparatus main body 5. The game system 1 will be described below.

As shown in FIG. 1, the game system 1 includes a home-use television receiver (hereinafter, referred to as a monitor) 2 as an example of display means, and the stationary game apparatus 3 which is connected to the monitor 2 via a connecting cord. The monitor 2 includes a pair of speakers 2a for audio-outputting audio signals outputted from the game apparatus main body 5. The game apparatus 3 includes an optical disc 4 storing a game program of the present invention, the game apparatus main body 5 provided with a computer for executing the game program of the optical disc 4 to display a game image on the monitor 2, and a controller 7 for providing the game apparatus main body 5 with operation information which is required for a game and which operate a character and the like displayed in the game image.

The game apparatus main body 5 includes therein a communication unit 6 (see FIG. 2). The communication unit 6 receives data transmitted wirelessly from the controller 7, and transmits data from the game apparatus main body 5 to the controller 7, so that the game apparatus main body 5 and the controller 7 are connected to each other by radio communication. Further, the optical disc 4 as an example of an exchangeable information storage medium is detachably mounted to the game apparatus main body 5. On a front main surface of the game apparatus main body 5, a power ON/OFF switch for the game apparatus main body 5, a reset switch for game processing, a slot through which the optical disc 4 is mounted or dismounted, an eject switch for ejecting the optical disc 4 through the slot of the game apparatus main body 5, and the like are provided.

The game apparatus main body 5 includes a flash memory 38 functioning as a backup memory to store data such as save data, and the like in a fixed manner. The game apparatus main body 5 executes the game program and the like stored in the optical disc 4, and displays the result as a game image on the monitor 2. Further, the game apparatus main body 5 re-cerates a game state, which has been executed previously, by using the save data stored in the flash memory 17, and displays a game image on the monitor 2. A player of the game apparatus main body 5 operates the controller 7 while watching a game image displayed on the monitor 2, and enjoys game process.

By using the technology of, for example, Bluetooth (registered trademark), the controller 7 wirelessly transmits transmission data such as the operation information and the like to the game apparatus main body 5 including the communication unit 6. The controller 7 includes two control units (a core unit 70 and a subunit 76) which are connected to each other by a flexible connection cable 79, and is operation means for mainly operating a player object which appears in a game space displayed on the monitor 2. The core unit 70 and the subunit 76 are each provided with a operation section such as a plurality of operation buttons, a key, a stick, and the like. As described later in detail, the core unit 70 includes an imaging information calculation section 74 for taking an image viewed from the core unit 70. As an example of targets whose images are to be taken by the imaging information calculation section 74, two LED modules 8L and 8R (hereinafter, referred to as markers 8L and 8R) are provided in the vicinity of the display screen of the monitor 2. The markers 8L and 8R each output an infrared light forward from the monitor 2. Although the core unit 70 and the subunit 76 are connected to each other by the flexible cable in the present embodiment, the subunit 76a may be provided with a wireless unit, thereby dispensing with the connection cable 79. For example, the subunit 76 is provided with a Bluetooth (registered trademark) unit, whereby the subunit 76 can transmit operation data to the core unit 70. The controller 7 (e.g. the core unit 70) also receives at a communication section 75 transmission data transmitted wirelessly from the communication unit 6 of the game apparatus main body 5, and produces sound and vibration in accordance with the transmission data.

As shown in FIG. 2, the game apparatus main body 5 includes, for example, a CPU (central processing unit) 30 for executing various programs. The CPU 30 executes a boot program stored in a boot ROM (not shown) to initialize memories including a main memory 33, and the like, and then executes the game program stored in the optical disc 4 to perform game processing or the like in accordance with the game program. The CPU 30 is connected to a GPU (Graphics Processing Unit) 32, the main memory 33, a DSP (Digital Signal Processor) 34, and an ARAM (audio RAM) 35 via a memory controller 31. The memory controller 31 is connected to the communication unit 6, a video I/F (interface) 37, the flash memory 38, an audio I/F 39, and a disc I/F 41 via a predetermined bus. The video I/F 37, the audio I/F 39 and the disc I/F 41 are connected to the monitor 2, the speakers 2a, and a disc drive 40, respectively.

The GPU 32 performs image processing based on an instruction from the CPU 30. The GPU 32 includes, for example, a semiconductor chip for performing calculation processing which is required for displaying 3D graphics. The GPU 32 performs the image processing by using a memory (not shown) dedicated for image processing and a part of the storage area of the main memory 33. The GPU 32 generates game image data and a movie to be displayed on the monitor 2 by using such memories, and outputs the generated data or movie to the monitor 2 via the memory controller 31 and the video I/F 37 as necessary.

The main memory 33 is a storage area used by the CPU 30, and stores a game program or the like required for processing executed by the CPU 30 as necessary. For example, the main memory 33 stores the game program read from the optical disc 4 by the CPU 30, various data or the like. The game program, the various data or the like stored in the main memory 33 are executed by the CPU 30.

The DSP 34 processes sound data or the like which is generated by the CPU 30 during the execution of the game program. The DSP 34 is connected to the ARAM 35 for storing the sound data or the like. The ARAM 35 is used when the DSP 34 performs predetermined processing (e.g. storage of the game program or sound data already read). The DSP 34 reads the sound data stored in the ARAM 35, and causes the speakers 2a of the monitor 2 to output the sound data via the memory controller 31 and the audio I/F 39.

The memory controller 31 comprehensively controls data transmission, and is connected to the various I/Fs described above. As described above, the communication unit 6 receives the transmission data from the controller 7, and outputs the transmission data to the CPU 30. The communication unit 6 transmits transmission data outputted from the CPU 30 to the communication section 75 of the controller 7. The monitor 2 is connected to the video I/F 37. The speakers 2a built in the monitor 2 are connected to the audio I/F 39 so as to allow the sound data read by the DSP 34 from the ARAM 35 or sound data directly outputted from the disc drive 40 to be outputted from the speakers 2a. The disc I/F 41 is connected to the disc drive 40. The disc drive 40 reads data stored in the optical disc 4 which is located at a predetermined reading position, and outputs the data to a bus of the game apparatus main body 5 and the audio I/F 39.

Figure 3:
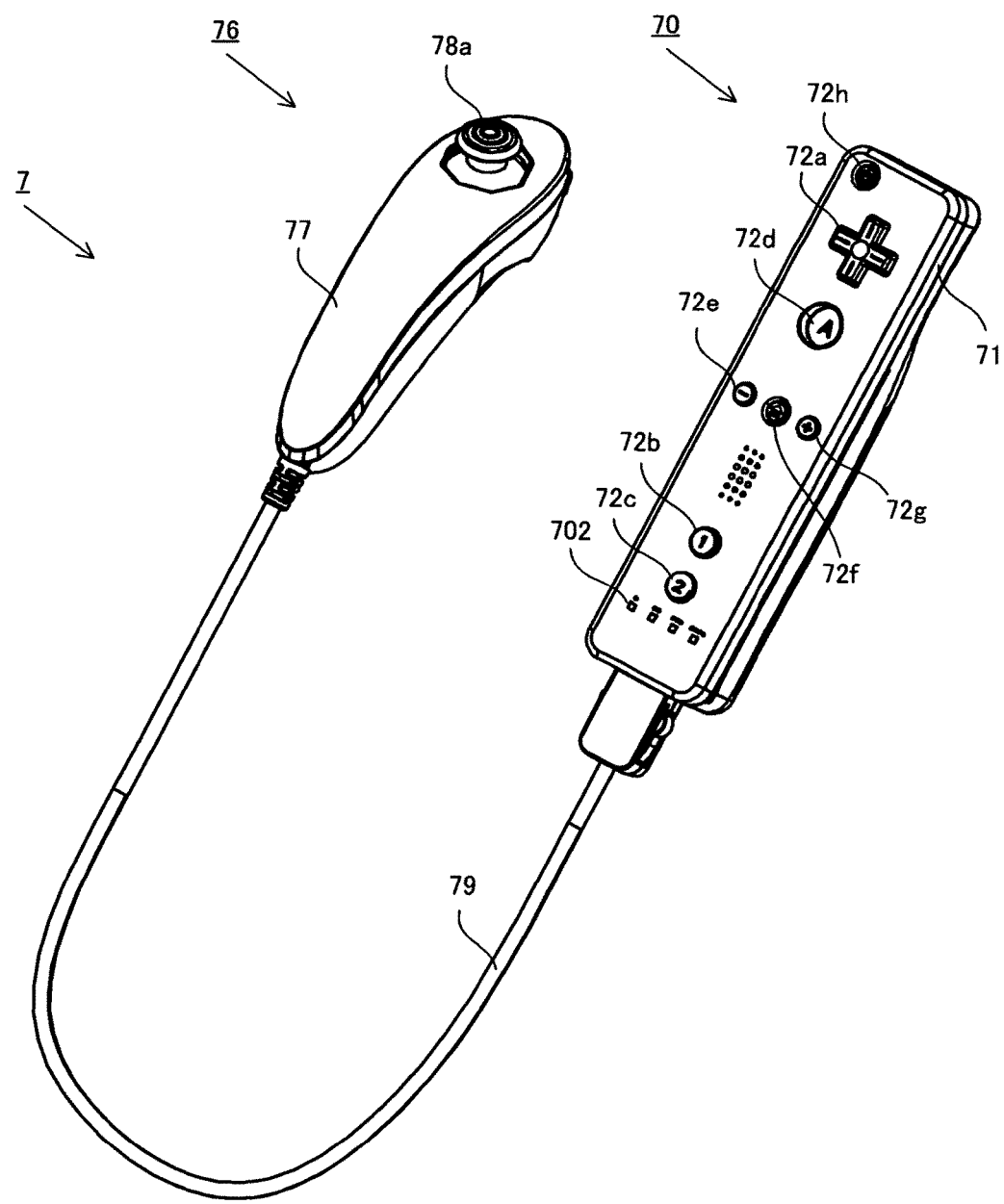
FIG. 3 is a perspective view illustrating an external appearance of a controller 7 in FIG. 1.
Figure 4:
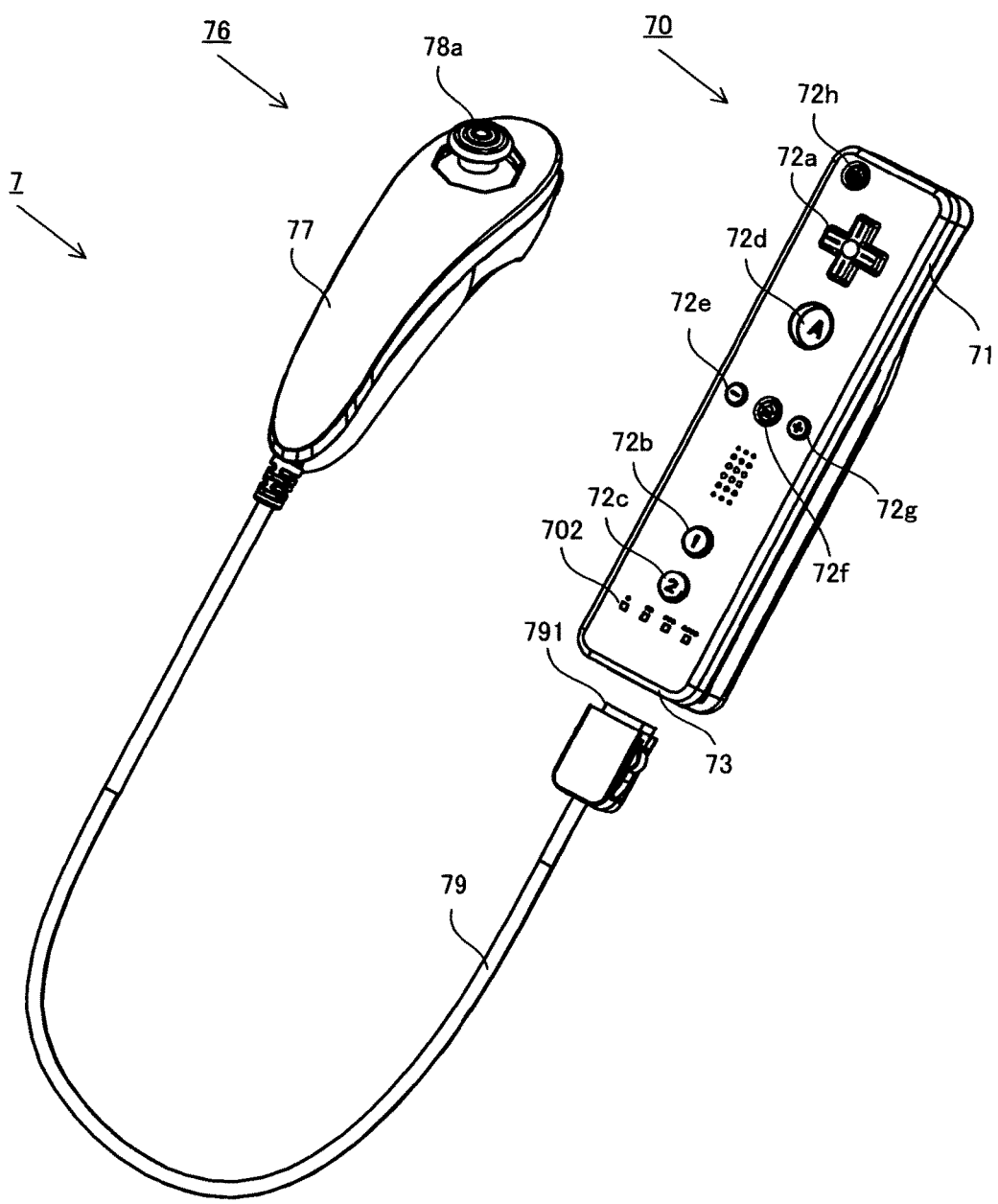
FIG. 4 is a perspective view illustrating a state where a connection cable 79 of the controller 7 in FIG. 3 is disconnected from a core unit 70.

With reference to FIGS. 3 and 4, the following will describe the controller 7. FIG. 3 is a perspective view illustrating an external appearance of the controller 7. FIG. 4 is a perspective view illustrating a state where the connection cable 79 of the controller 7 in FIG. 3 is disconnected from the core unit 70.

As shown in FIG. 3, the controller 7 includes the core unit 70 and the subunit 76 which are connected to each other by the connecting cable 79. The core unit 70 has a housing 71 which is provided with a plurality of operation sections 72. The subunit 76 has a housing 77 which is provided with a plurality of operation sections 78. The core unit 70 and the subunit 76 are connected to each other by the connecting cable 79.

As shown in FIG. 4, the connecting cable 79 has at one end thereof a connector 791 which is detachably connected to a connector 73 of the core unit 70, and is fixedly connected at the other end thereof to the subunit 76. The connector 791 of the connecting cable 79 is engaged with the connector 73 provided at the rear surface of the core unit 70 so as to connect the core unit 70 to the subunit 76 by the connecting cable 79.

Figure 5:
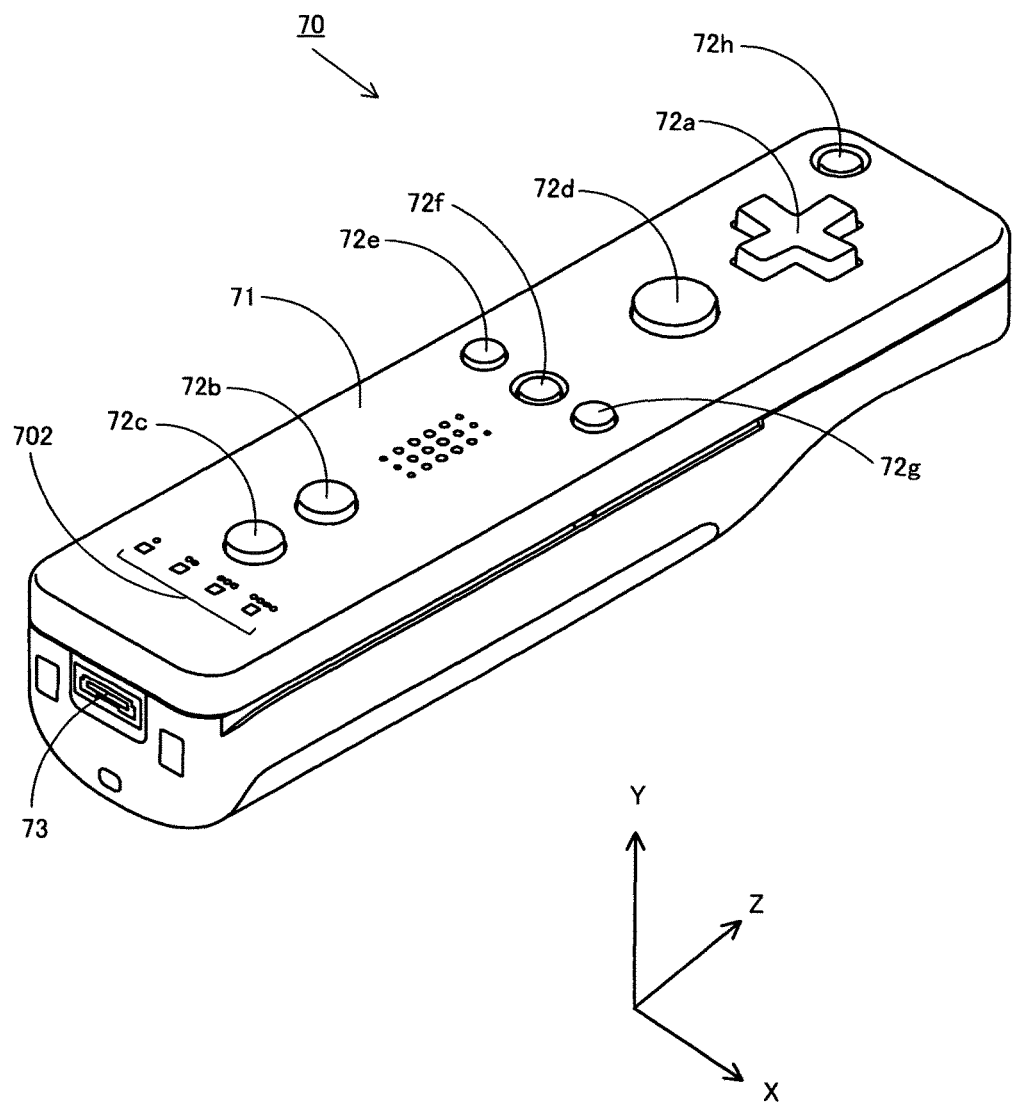
FIG. 5 is a perspective view of the core unit 70 in FIG. 3 seen from a top rear side thereof.

With reference to FIGS. 5 and 6, the following will describe the core unit 70. FIG. 5 is a perspective view of the core unit 70 seen from a top rear side thereof. FIG. 6 is a perspective view of the core unit 70 seen from a bottom front side thereof.

As shown in FIGS. 5 and 6, the core unit 70 includes the housing 71 which is formed, for example, by plastic molding. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions (front, rear, right and left) represented by arrows, which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which a cursor is to move.

The cross key 72a is an operation section for outputting an operation signal in accordance with the above-described direction input operation performed by the player. Such an operation section may be provided in another form. For example, the cross key 72a may be replaced with a composite switch including a push switch including a ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slideable and outputs an operation signal in accordance with the sliding direction of the disc-shaped member. Still alternatively, the cross key 72a may be replaced with a touchpad. Still alternatively, the cross key 72a may be replaced with an operation section which includes switches representing at least four directions (front, rear, right and left) and outputs an operation signal in accordance with the switch pressed by the player.

Behind the cross key 72a on the top surface of the housing 71, a plurality of operation buttons 72b to 72g are provided. The operation buttons 72b to 72g are each an operation section for outputting a respective operation signal assigned to the operation buttons 72b, 72c, 72d, 72e, 72f or 72g when the player presses a head thereof. For example, functions of a number one button, a number two button, and an A button are assigned to the operation buttons 72b to 72d, respectively. Further, functions of a minus button, a home button and a plus button are assigned to the operation buttons 72e to 72g, respectively. Various functions are assigned to the operation buttons 72b to 72g in accordance with the game program executed by the game apparatus 3, but this will be described in detail later. In an exemplary arrangement shown in FIG. 5, the operation buttons 72b to 72d are arranged in a line at the center in the front-rear direction on the top surface of the housing 71. The operation buttons 72e to 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus main body 5 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (a controller identification number) is assigned to the controller 7 so as to be distinguishable from the other controllers 7. For example, the LEDs 702 are used for informing the player of the controller type which is currently assigned to controller 7. Specifically, when the core unit 70 transmits the transmission data to the communication unit 6, one of the plurality of LEDs 702 corresponding to the controller type is lit up.

On the top surface of the housing 71, a plurality of holes is provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed at a position at which an index finger or middle finger of the player is located when the player holds the core unit 70. On a slope surface of the recessed portion, an operation button 72i is provided. The operation button 72i is an operation section acting as, for example, a B button. The operation button 72i is used, for example, as a trigger switch for taking a shot in a soccer game, or for operation to switch a player, and the like.

On a front surface of the housing 71, an image pickup element 743 constituting a part of the imaging information calculation section 74 is provided. The imaging information calculation section 74 is a system for analyzing image data taken by the core unit 70, thereby identifying an area having a high brightness in the image and detecting a position of a center of gravity, a size and the like of the area. The imaging information calculation section 74 has, for example, a maximum sampling period of about 200 frames/sec., and therefore can trace and analyze even a relatively fast motion of the core unit 70. The imaging information calculation section 74 will be described later in detail. On a rear surface of the housing 71, the connector 73 is provided. The connector 73 is, for example, a 32-pin edge connector, and is used for engaging and connecting the core unit 70 with the connector 791 of the connecting cable 79.

For giving a more specific description, a coordinate system set with respect to the core unit 70 will be defined. As shown in FIGS. 5 and 6, mutually perpendicular X-axis, Y-axis, and Z-axis are defined with respect to the core unit 70. More specifically, the longitudinal direction of the housing 71 or the front-rear direction of the core unit 70 corresponds to Z-axis, and the direction toward the front surface of the core unit 70 (the surface in which the imaging information calculation section 74 is provided) is a positive direction of Z-axis. The up-down direction of the core unit 70 corresponds to Y-axis, and the direction toward the top surface of the housing 71 (the surface on which the operation button 72a is provided) is a positive direction of Y-axis. The left-right direction of the core unit 70 corresponds to X-axis, and the direction toward the right side surface housing 71

(the side surface which is not shown in FIG. 6 but shown in FIG. 5) is a positive direction of X-axis.

Figure 7:
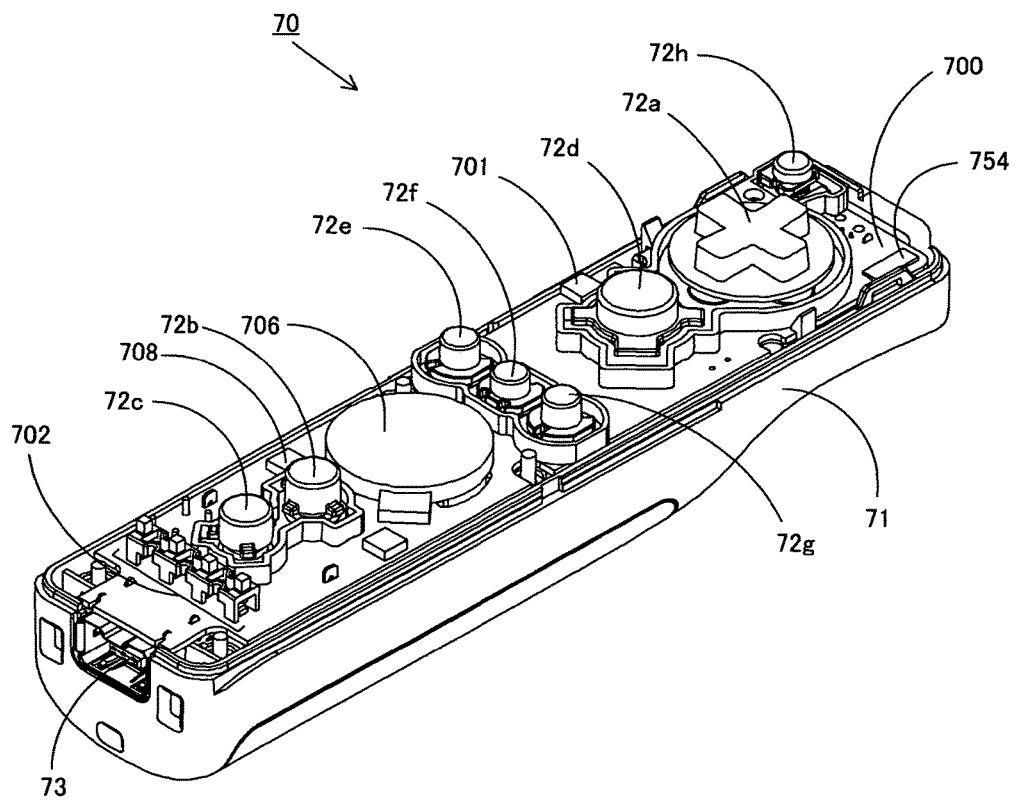
FIG. 7 is a perspective view illustrating a state where an upper housing of the core unit 70 in FIG. 5 is removed.
Figure 8:
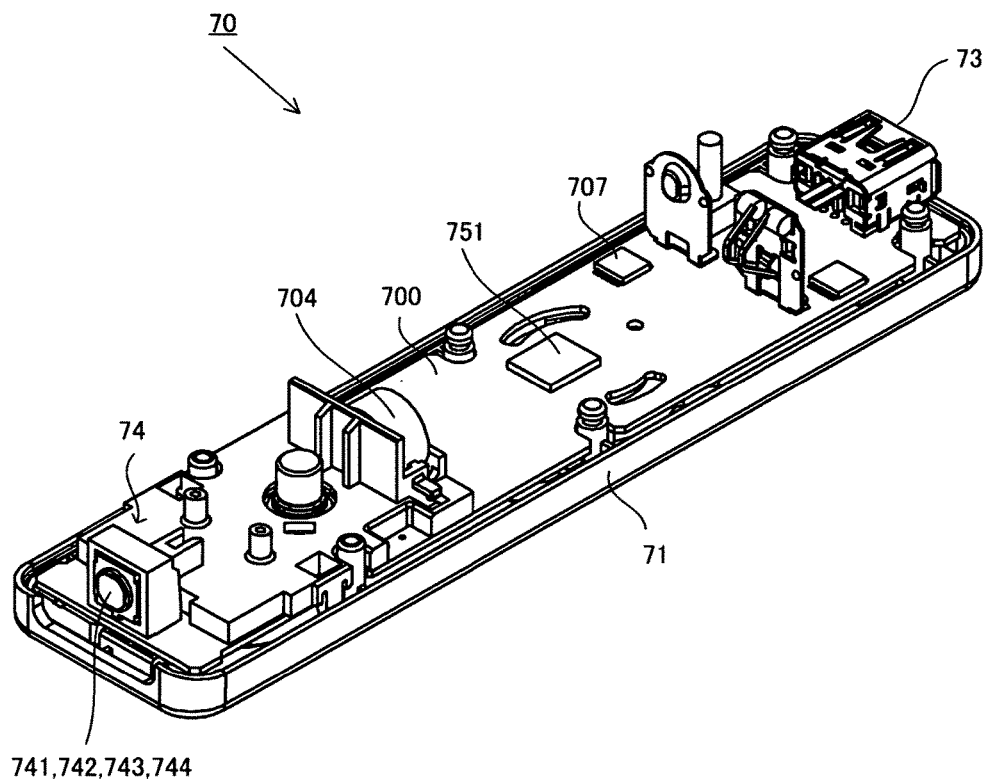
FIG. 8 is a perspective view illustrating a state where a lower housing of the core unit 70 in FIG. 6 is removed.

With reference to FIGS. 7 and 8, the following will describe an internal structure of the core unit 70. FIG. 7 is a perspective view illustrating a state where an upper housing (a part of the housing 71) of the core unit 70 is removed. FIG. 8 is a perspective view illustrating a state where a lower housing (a part of the housing 71) of the core unit 70 is removed. FIG. 8 is a perspective view illustrating a reverse side of a substrate 700 shown in FIG. 7.

As shown in FIG. 7, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751, and the like (see FIGS. 8 and 11) by lines (not shown) formed on the substrate 700 and the like. The core unit 70 functions as a wireless controller by a wireless module 753 (see FIG. 11) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the periphery of the substrate 700, not on the center thereof. The acceleration sensor 701 is capable of detecting acceleration included in a component caused by a centrifugal force in accordance with rotation of the core unit 70 about the longitudinal direction, in addition to change of direction of gravitational acceleration. Thus, the rotation of the core unit 70 can be sensitively determined from data of the detected acceleration by using a predetermined calculation.

As shown in FIG. 8, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the core unit 70. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus main body 5. On the bottom main surface of the substrate 700, a vibrator 704 is attached. The vibrator 704 is, for example, a vibration motor or a solenoid. The core unit 70 is vibrated by an actuation of the vibrator 704, and the vibration is conveyed to the player holding the core unit 70. Thus, a so-called vibration-feedback game is realized. Since the vibrator 704 is located in the front portion of the housing 71, the housing 71 is vibrated substantially, and hence the player holding the core unit 70 easily feels the vibration.

Figure 9:
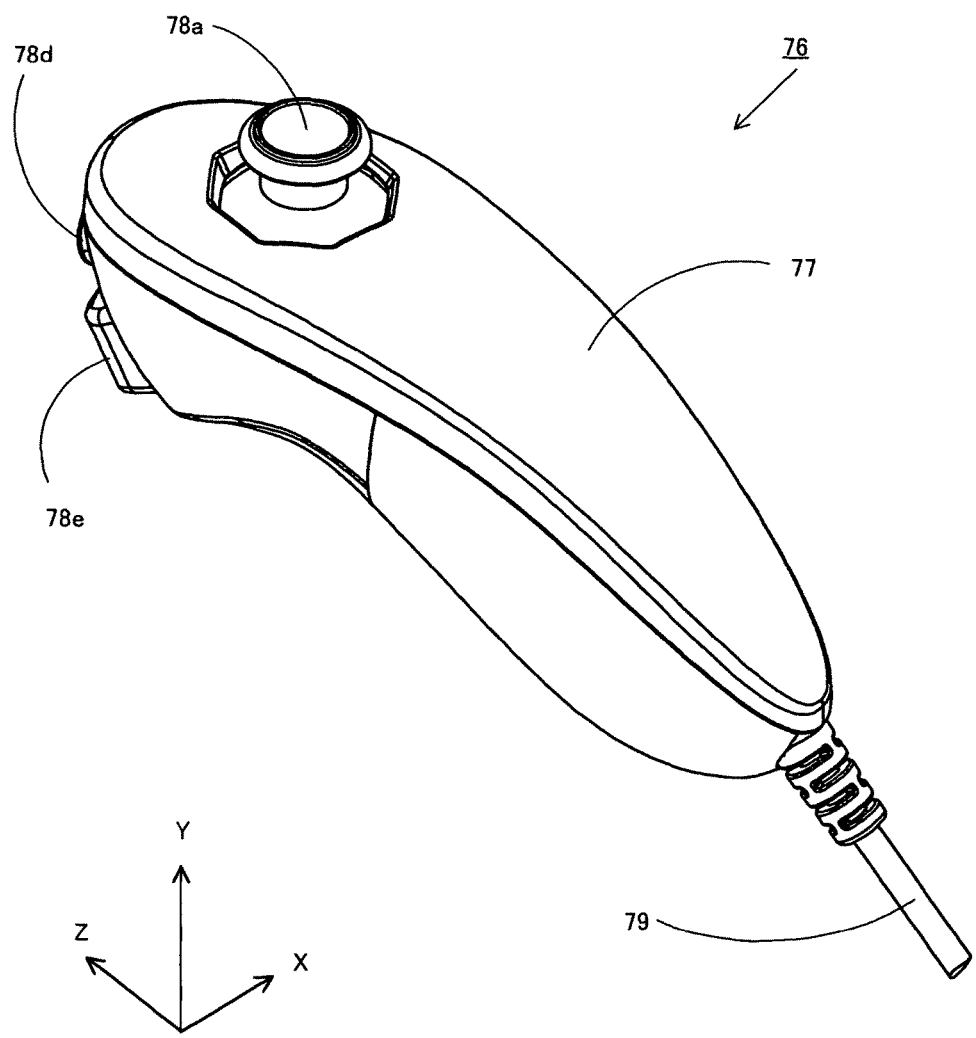
FIG. 9 is a perspective view illustrating an example of a subunit 76.
Figure 10:
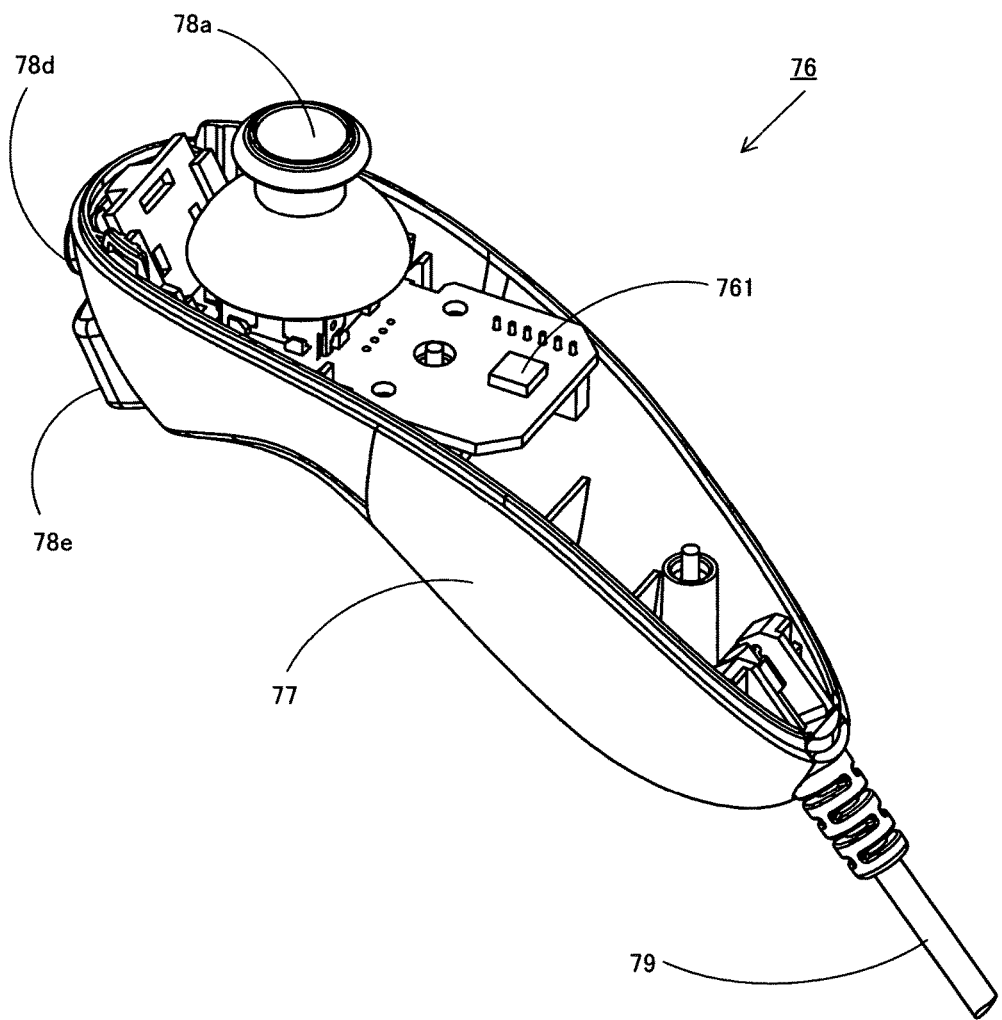
FIG. 10 is a perspective view illustrating a state where an upper housing of the subunit 76 in FIG. 9 is removed.

With reference to FIGS. 9 and 10, the subunit 76 will be described. FIG. 9 is a perspective view illustrating an example of the subunit 76. FIG. 10 is a perspective view illustrating a state where an upper housing (a pat of the housing 77) of the subunit 76 in FIG. 9 is removed.

As shown in FIG. 9, the subunit 76 includes the housing 77 which is formed, for example, by plastic molding. The housing 77 extends in a longitudinal direction from front to rear, and has a streamline solid shape including a head which is a widest portion in the subunit 76. The overall size of the subunit 76 is small enough to be held by one hand of an adult or even a child. Further, the housing 77 of the subunit 76 can be held so that the player wraps a palm and fingers other than a thumb around the housing 77, and its shape is designed so that the player's thumb is positioned on a stick 78a when the player holds the housing 77.

In the vicinity of the widest portion on the top surface of the housing 77, the stick 78a is provided. The stick 78a is an operation section which includes an inclinable stick projecting from the top surface of the housing 77, detects the inclining direction (additionally, an amount of the inclination) of the stick, and outputs an operation signal in accordance with the inclining direction. For example, the player can arbitrarily designate a direction and a position by inclining a stick tip in an Y-direction of 360 degrees, thereby instructing a direction in which the player character or the like appearing in the virtual game world is to move, or instructing a direction in which the cursor is to move. Also, the player can instruct a movement amount of the player character, the cursor, or the like by the amount of the inclination of the stick 78a.

Although the stick 78a is an operation section for outputting an operation signal in accordance with a direction input operation performed by the player, such an operation section may be provided in another form. For example, the stick 78a may be replaced with the above cross key or a composite switch including a push switch including a ring-shaped four-direction operation section and a center switch provided at the center thereof. Alternatively, the stick 78a may be replaced with an operation section which includes a disc-shaped member horizontally slideable and outputs an operation signal in accordance with the sliding direction of the disc-shaped member. Still alternatively, the stick 78a may be replaced with a touch pad. Still alternatively, the stick 78a may be replaced with an operation section which includes switches representing at least four directions (front, rear, right and left) and outputs an operation signal in accordance with the switch pressed by the player.

On the front surface of the housing 77 of the subunit 76, two operation buttons 78d and 78e are provided. The operation buttons 78d and 78e are each an operation section for outputting a respective operation signal assigned to the operation buttons 78d and 78e when the player presses a head thereof. For example, functions of an X button and a Y button are assigned to the operation buttons 78d and 78e, respectively. The operation buttons 78d, and 78e are assigned with the respective functions in accordance with the game program executed by the game apparatus 3, but this will not be described in detail because the functions are not directly relevant to the present invention. In the exemplary arrangement shown in FIG. 9, the operation buttons 78d and 78e are arranged in a line in the up-down direction on the front surface of the housing 77.

As shown in FIG. 10, a substrate is fixed inside the housing 77. On a top main surface of the substrate, the stick 78a, an acceleration sensor 761, and the like are provided. These components are connected to the connection cable 79 by lines (not shown) formed on the substrate and the like. The acceleration sensor 761 is preferably located at the center of the housing 77 in a longitudinal direction thereof and in a lateral direction thereof. When the player holds the housing 77 so as to wrap a palm and fingers other than a thumb around the housing 77, the housing 77 is preferably positioned in a space surrounded by a palm and fingers (more preferably, at the substantially center of the space).

For giving a more specific description, a coordinate system set with respect to the subunit 76 will be defined. As shown in FIG. 9, mutually perpendicular X-axis, Y-axis, and Z-axis are defined with respect to the subunit 76. More specifically, the longitudinal direction of the housing 77 or the front-rear direction of the subunit 76 corresponds to Z-axis, and the direction toward the front surface of the subunit 76 (the surface on which the operation buttons 78d and 78e are provided) is a positive direction of Z-axis. The up-down direction of the subunit 76 corresponds to Y-axis, and the direction toward the top surface of the housing 77 (the direction in which the stick 78a projects) is a positive direction of Y-axis. The left-right direction of the subunit 76 corresponds to X-axis, and the direction toward the right side surface housing 77 (the side surface which is not shown in FIG. 9) is a positive direction of X-axis.

Figure 11:
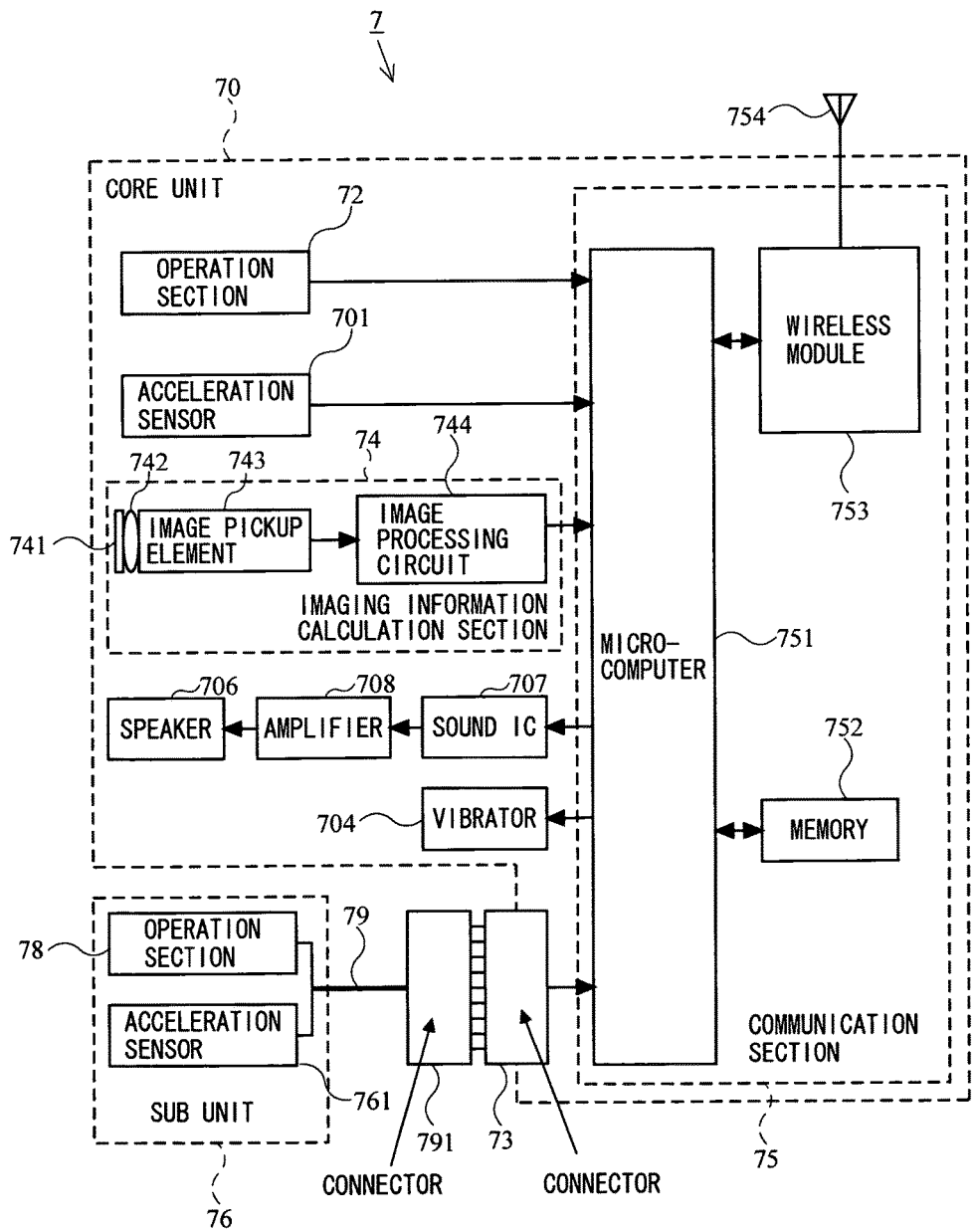
FIG. 11 is a block diagram illustrating a structure of the controller 7 in FIG. 3.

The following will describe an internal structure of the controller 7. FIG. 11 is a block diagram illustrating a structure of the controller 7.

As shown in FIG. 11, the core unit 70 includes therein the communication section 75 in addition to the aforementioned operation section 72, the imaging information calculation section 74, the acceleration sensor 701, the vibrator 704, the speaker 706, the sound IC 707, and the amplifier 708. The subunit 76 includes the aforementioned operation section 78 and the acceleration sensor 761, which are connected to the microcomputer 751 via the connection cable 79 and the connectors 791 and 73.

The imaging information calculation section 74 includes the infrared filter 741, the lens 742, the image pickup element 743, and the image processing circuit 744. The infrared filter 741 allows, among lights incident on the front surface of the core unit 70, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs to the communication section 75 process result data indicating the result of a calculated coordinate position and a square measure of the area. The imaging information calculation section 74 is fixed to the housing 71 of the core unit 70. An imaging direction of the imaging information calculation section 74 can be changed by changing a facing direction of the housing 71.

The core unit 70 preferably includes a three-axis (X-axis, Y-axis, and Z-axis) acceleration sensor 701. The subunit 76 preferably includes a three-axis (X-axis, Y-axis, and Z-axis) acceleration sensor 761. The three-axis acceleration sensors 701 and 761 each detect linear acceleration in three directions, i.e., an up-down direction, a left-right direction, and a front-rear direction (the aforementioned X-axis, Y-axis, and Z-axis directions). In an alternative embodiment, a two-axis accelerometer which detects only linear acceleration along each of the up-down direction and the left-right direction (the other pair of axes), or a one-axis accelerometer which detects only linear acceleration along any one of the axes may be used depending on the type of control signals used in the game processing. As a non-limiting example, the one-axis, two-axis, or three-axis acceleration sensors 701 and 761 may be of the type available from Analog Devices, Inc. or STMicroelectronics N.V. Preferably, the acceleration sensors 701 and 761 may be of electrostatic capacitance or capacitance-coupling type which is based on silicon micro-machined MEMS (microelectromechanical systems) technology. However, any other suitable accelerometer technology (e.g., piezoelectric type or piezoresistance type) now existing or later developed may be used to provide the one-axis, two-axis, or three-axis acceleration sensors 701 and 761.

As one skilled in the art understands, accelerometers, as used in the acceleration sensors 701 and 706, are only capable of detecting acceleration along a straight line (linear acceleration) corresponding to each axis of the acceleration sensor. In other words, the direct outputs of the acceleration sensors 701 and 761 are limited to signals indicative of linear acceleration (static or dynamic) along each of the one, two or three axes thereof. As a result, the acceleration sensors 701 and 761 cannot directly detect movement along a non-linear (e.g. arcuate) path, rotation, rotational movement, angular displacement, inclination, position, attitude or any other physical characteristic.

However, through processing by a computer such as the processor of a game apparatus (e.g. the CPU 30) or the processor of the controller 7 or the subunit 76 (e.g. the microcomputer 751) based on the linear acceleration signals outputted from the acceleration sensors 701 and 761, additional information relating to the core unit 70 and the subunit 76 can be inferred or calculated, as one skilled in the art will readily understand from the description herein.

For example, when the processing is performed by the computer on the assumption that the core unit 70 and the subunit 76 provided with the acceleration sensors 701 and 761, respectively, are in static state (or when the processing is performed while only gravitational acceleration is detected by the acceleration sensors 701 and 761), if the core unit 70 and the subunit 76 are actually in static state, the detected acceleration are used to determine whether or not the core unit 70 and the subunit 76 are inclined relative to the direction of gravity or how many degrees the core unit 70 and the subunit 76 are inclined relative to the direction of gravity. More specifically, when a state where the detection axes of the acceleration sensors 701 and 761 extend in a vertically-down direction is set as a standard state, it is possible to determine whether or not the core unit 70 and the subunit 76 are inclined by determining whether 1 G (gravitational acceleration) is applied in the direction of the detection axes of the acceleration sensors 701 and 761. It is also possible to determine how many degrees the core unit 70 and the subunit 76 are inclined with respect to the vertically-down direction by determining the magnitude of the acceleration applied in the above detection axis directions. In addition, in the case where the acceleration sensors 701 and 761 are capable of detecting multi-axis acceleration, it is possible to determine in detail how many degrees the core unit 70 and the subunit 76 are inclined relative to the direction of gravity through processing of a signal of acceleration detected for each axis. In this case, a processor may perform processing based on the outputs from the acceleration sensors 701 and 761 for calculating inclination angle data of the core unit 70 and the subunit 76. Alternatively, processing may be performed so as to infer rough inclination of the core unit 70 and the subunit 76 based on the outputs from the acceleration sensors 701 and 761 without calculating the inclination angle data. As described above, the acceleration sensors 701 and 761 are used in combination with the processor to determine inclination, attitude or position of the core unit 70 and the subunit 76.

On the other hand, on the assumption that the acceleration sensors 701 and 761 are in dynamic state, the acceleration sensor 701 and 761 detect acceleration corresponding to motion of the acceleration sensors 701 and 761 in addition to a gravitational acceleration component. Thus, it is possible to determine the directions of the motion of the core unit 70 and the subunit 76 by eliminating the gravitational acceleration component through predetermined processing. More specifically, various movements and/or positions of the core unit 70 and the subunit 76 can be calculated or inferred through processing of the acceleration signals generated by the acceleration sensors 701 and 761 when the core unit 70 and the subunit 76 provided with the acceleration sensors 701 and 761, respectively, are subjected to dynamic acceleration by the hand of the player. It is noted that even on the assumption that the acceleration sensors 701 and 761 are in dynamic state, it is possible to determine inclination of the core unit 70 and the subunit 76 relative to the direction of gravity by eliminating acceleration corresponding to motion of the acceleration sensors 701 and 761 through predetermined processing.

In an alternative embodiment, the acceleration sensors 701 and 761 may each include an embedded signal processor or other type of dedicated processor for performing any desired processing of the acceleration signals outputted from accelerometers therein prior to outputting signals to the microcomputer 751. For example, the embedded or dedicated processor could convert the detected acceleration signal into a corresponding inclination angle when the acceleration sensors 701 and 761 are intended to detect static acceleration (e.g. gravitational acceleration). Data indicative of the acceleration detected by each of the acceleration sensors 701 and 761 is outputted to the communication section 75.

When the player holds and shakes the core unit 70 and the subunit 76, the motion speeds up at the beginning of the shake, and speeds down at the end of the shake. In other words, after acceleration is generated in the core unit 70 and the subunit 76 in the same direction as the shaking direction at the beginning of the shake, the magnitude of the acceleration decreases gradually, and acceleration is generated in the core unit 70 and the subunit 76 in a direction opposite to the shaking direction at the end of the shake. On the other hand, generally, acceleration vectors (or a positive or negative sign of acceleration) outputted from the acceleration sensors 701 and 761 have directions opposite to the acceleration directions of the core unit 70 and the subunit 76, respectively.

In an alternative embodiment, at least one of the acceleration sensors 701 and 706 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensors 701 and 761, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application.

Specifically, when a gyro-sensor is used instead of an acceleration sensor to calculate inclination and attitude, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tile previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also very different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus main body 5 via the antenna 754. The sound IC 707 processes the sound data and the like transmitted from the game apparatus main body 5 via the communication section 75. The microcomputer 751 actuates the vibrator 704 in accordance with vibration data (e.g. signals for actuating and unactuating the vibrator 704) transmitted from the game apparatus main body 5 via the communication section 75. Identification number data which is uniquely set for each core unit 70 is stored in the memory 752 or nonvolatile storage means (not shown).

Data from the core unit 70 including an operation signal (core key data) from the operation section 72, acceleration signals (core acceleration data) from the acceleration sensor 701, and the process result data from the imaging information calculation section 74 are outputted to the microcomputer 751. An operation signal (sub key data) from the operation section 78 of the subunit 76 and acceleration signals (sub acceleration data) from the acceleration sensor 761 are outputted to the microcomputer 751 via the connecting cable 79. The microcomputer 751 temporarily stores the input data (the core key data, the sub key data, the core acceleration data, the sub acceleration data, and the process result data) in the memory 752 as the transmission data which is to be transmitted to the communication unit 6. The wireless transmission from the communication section 75 to the communication unit 6 is performed periodically at a predetermined time interval. Since game process is generally performed at a cycle of 1/60 sec., data needs to be collected and transmitted at a cycle of a shorter time period. Specifically, the game process unit is 16.7 ms (1/60 sec.), and the transmission interval of the communication section 75 structured using the Bluetooth (registered trademark) technology is 5 ms. At the transmission timing to the communication unit 6, the microcomputer 751 outputs the transmission data stored in the memory 752 as a series of operation information to the wireless module 753 so as to assign thereto a controller identification number which is unique to the controller 7. The wireless module 753 uses, for example, the Bluetooth (registered trademark) technology to modulate the operation data onto a carrier wave of a predetermined frequency and to radiate the resultant weak radio signal from the antenna 754. Thus, the core key data from the operation section 72 provided in the core unit 70, the sub key data from the operation section 78 provided in the subunit 76, acceleration data from the acceleration sensor 701, the sub key data from the operation section 78 provided in the subunit 76, the core acceleration data from the acceleration sensor 701 provided in the core unit 70, the sub acceleration data from the acceleration sensor 761 provided in the subunit 76, the process result data from the imaging information calculation section 74, and the controller identification number are modulated onto the weak radio signal by the wireless module 753 and radiated from the core unit 70. The communication unit 6 of the game apparatus 3 receives the weak radio wave signal, and the game apparatus 3 demodulates or decodes the weak radio signal to obtain the series of operation information (the core key data, the sub key data, the core acceleration data, the sub acceleration data, and the process result data) and the controller identification number. Based on the obtained operation information and the game program, the CPU 30 of the game apparatus 3 performs the game processing.

Figure 16:
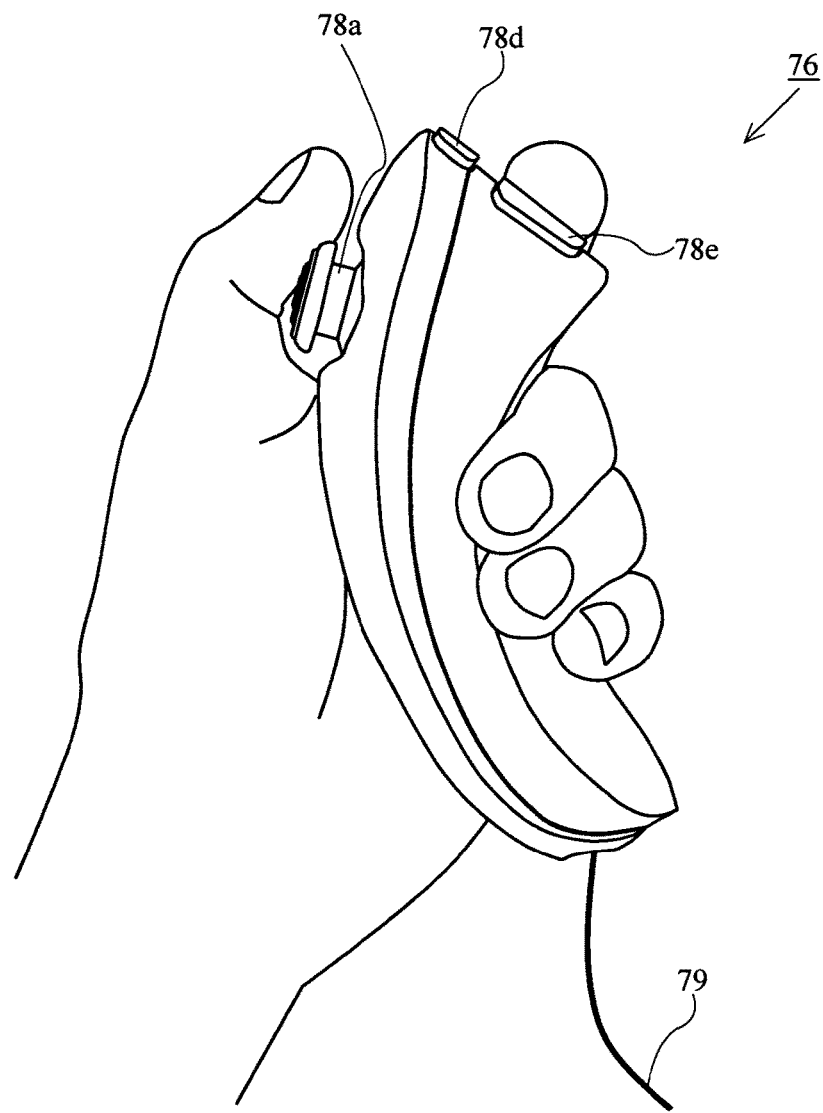
FIG. 16 is an exemplary view illustrating a state where the player holds the subunit 76 with a left hand seen from a right side of the subunit 76.

As shown in FIG. 12, in order to play a game by means of the controller 7 with the game system 1, a player holds the core unit 70 with one hand (e.g. a right hand) (see FIGS. 13 and 14), and holds the subunit 76 with the other hand (e.g. a left hand) (see FIG. 16). The player holds the core unit 70 so as to point the front surface of the core unit 70 (that is, a side having an entrance through which light is incident on the imaging information calculation section 74 taking an image of the light) to the monitor 2. On the other hand, the two LED modules 8L and 8R are provided in the vicinity of the display screen of the monitor 2. The LED modules 8L and 8R each outputs infrared light forward from the monitor 2.

When a player holds the core unit 70 so as to point the front surface thereof to the monitor 2, infrared lights outputted by the two LED modules 8L and 8R are incident on the imaging information calculation section 74. The image pickup element 743 takes images of the infrared lights incident through the infrared filter 741 and the lens 742, and the image processing circuit 744 processes the taken images. The imaging information calculation section 74 detects infrared components outputted by the LED modules 8L and 8R so as to obtain positions and area information of the LED modules 8L and 8R. Specifically, the imaging information calculation section 74 analyzes image data taken by the image pickup element 743, eliminates images which do not represent the infrared lights outputted by the LED modules 8L and 8R from the area information, and identifies points each having a high brightness as positions of the LED modules 8L and 8R. The imaging information calculation section 74 obtains position coordinates, coordinates of the center of gravity, and the like of each of the identified points having the high brightness, and outputs the same as the process result data. When such process result data is transmitted to the game apparatus 3, the game apparatus 3 can obtain, based on the position coordinates and the coordinates of the center of gravity, operation signals relating to the motion, orientation, position and the like of the imaging information calculation section 74, that is, the core unit 70, with respect to the LED modules 8L and 8R. Specifically, the position having a high brightness in the image obtained through the communication section 75 is changed in accordance with the motion of the core unit 70, and therefore a direction input or coordinate input is performed in accordance with the position having the high brightness being changed, thereby enabling a direction input or a coordinate input to be performed along the moving direction of the core unit 70.

Thus, the imaging information calculation section 74 of the core unit 70 takes images of stationary markers (infrared lights from the two LED modules 8L and 8R in the present embodiment), and therefore the game apparatus 3 can use the process result data relating to the motion, orientation, position and the like of the core unit 70 in the game process, whereby an operation input, which is different from an operation input performed by pressing an operation button or by using an operation key, is further intuitively performed. As described above, since the markers are provided in the vicinity of the display screen of the monitor 2, the motion, orientation, position and the like of the core unit 70 with respect to the display screen of the monitor 2 can be easily calculated based on positions from the markers. That is, the process result data used for obtaining the motion, orientation, position and the like of the core unit 70 can be used as operation input immediately applied to the display screen of the monitor 2.

Figure 13:
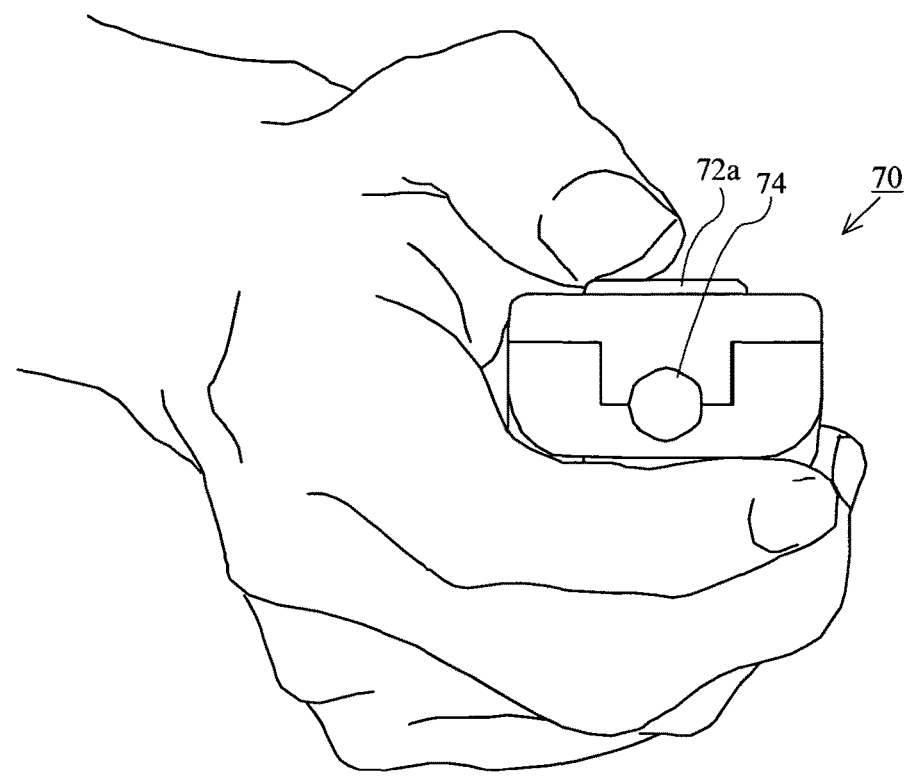
FIG. 13 is an exemplary view illustrating a state where a player holds the core unit 70 with a right hand seen from a front side of the core unit 70.
Figure 14:
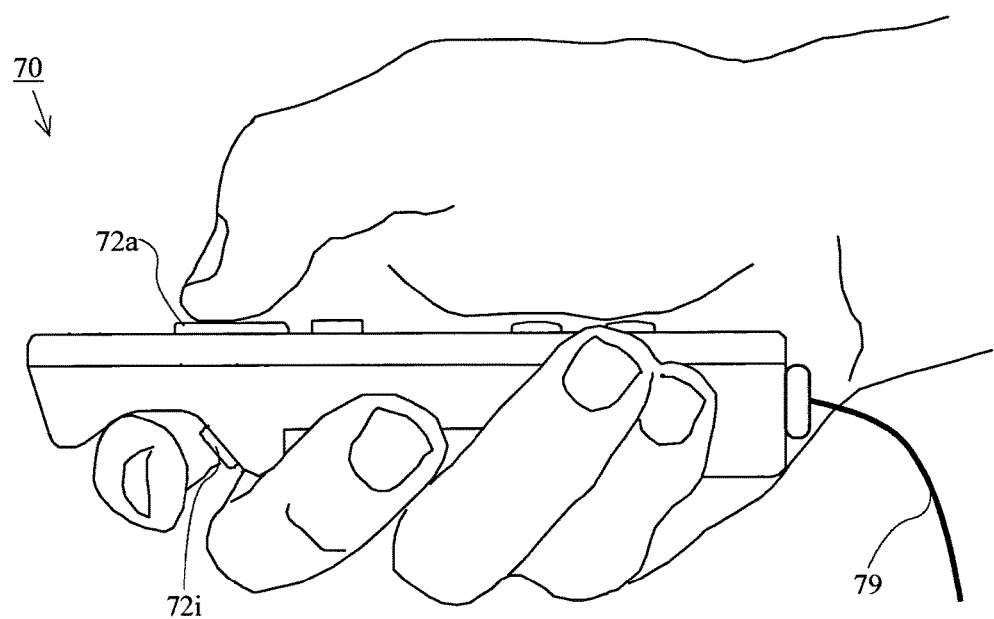
FIG. 14 is an exemplary view illustrating a state where the player holds the core unit 70 with the right hand seen from a left side of the core unit 70.

With reference to FIGS. 13 and 14, a state where the player holds the core unit 70 with one hand will be described. FIG. 13 is an exemplary view illustrating a state where the player holds the core unit 70 with a right hand seen from a front side of the core unit 70. FIG. 14 is an exemplary view illustrating a state where the player holds the core unit 70 with the right hand seen from a left side of the core unit 70.

As shown in FIGS. 13 and 14, the overall size of the core unit 70 is small enough to be held by one hand of an adult or even a child. When the player puts a thumb on the top surface of the core unit 70 (e.g. near the cross key 72a), and puts an index finger in the recessed portion on the bottom surface of the core unit 70 (e.g. near the operation button 72i), the light entrance of the imaging information calculation section 74 on the front surface of the core unit 70 is exposed forward to the player. It should be understood that also when the player holds the core unit 70 with a left hand, the holding state is the same as that described for the right hand.

As shown in FIG. 15, the LED modules 8L and 8R each have a viewing angle $\theta1$. The image pickup element 743 has a viewing angle $\theta2$. For example, the viewing angle $\theta1$ of the LED modules 8L and 8R is 34 degrees (half-value angle), and the viewing angle $\theta2$ of the image pickup element 743 is 41 degrees. When both the LED modules 8L and 8R are in the viewing angle $\theta2$ of the image pickup element 743 and the image pickup element 743 is in the viewing angle $\theta1$ of the LED module, L and the viewing angle $\theta1$ of the LED module 8R, the game apparatus main body 5 determines a position of the core unit 70 by using positional information relating to the point having high brightness of the two LED modules 8L and 8R.

When either the LED module 8L or LED module 8R is in the viewing angle $\theta2$ of the image pickup element 743, or when the image pickup element 743 is in either the viewing angle θ1 of the LED module 8L or the viewing angle θ1 of the LED module 8R, the game apparatus main body 5 determines a position of the core unit 70 using the positional information relating to the point having high brightness of the LED module 8L or the LED module 8R.

As described above, the motion, orientation, and position of the core unit 70 can be determined by using the output (the core acceleration data) from the acceleration sensor 701 provided in the core unit 70. In other words, the core unit 70 functions as operation input means in accordance with the movement of the hand of the player and its direction when the player moves a hand holding the core unit 70 from side to side and up and down.

With reference to FIG. 16, the following will describe a state where the player holds the subunit 76 with one hand. FIG. 16 is an exemplary view illustrating a state where the player holds the subunit 76 with a left hand seen from a right side of the subunit 76.

As shown in FIG. 16, the overall size of the subunit 76 is small enough to be held by one hand of an adult or even a child. For example, the player puts a thumb on the top surface of the subunit 76 (e.g. near the stick 78a), puts an index finger on the front surface of the subunit 76 (e.g. near the operation buttons 78d and 78e), and puts a middle finger, ring finger and little finger on the bottom surface of the subunit 76, thereby holding the subunit 76. It should be understood that also when the player holds the subunit 76 with a right hand, the holding state is the same as that described for the left hand. Thus, the subunit 76 allows the player to easily operate the operation section 78 such as the stick 78a and the operation buttons 78d and 78e while holding the subunit 76 with one hand. The main body (the housing 77) of the subunit 76 has such a shape and a size that the player can hold the subunit 76 at the side circumference thereof with one hand.

As described above, the motion, orientation, and position of the subunit 76 can be determined by using the output (the sub acceleration data) from the acceleration sensor 761 provided in the subunit 76. In other words, the subunit 76 functions as operation input means in accordance with the movement of the hand of the player and its direction when the player moves a hand holding the subunit 76 from side to side and up and down.

Figure 17:
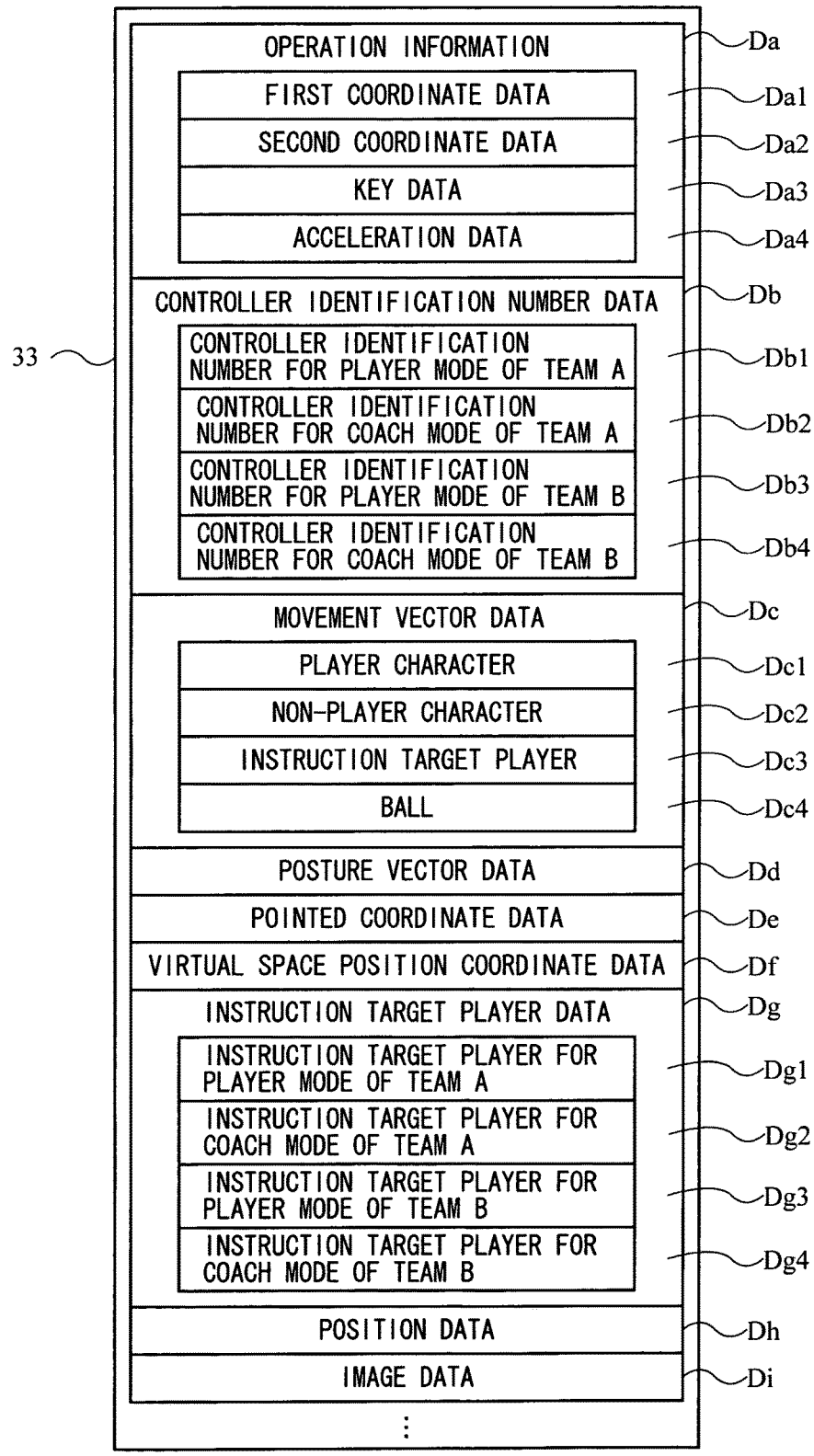
FIG. 17 shows an example of main data stored in a main memory 33 of the game apparatus main body 5.

As an exemplary game realized by application of the present invention, there is a soccer game which is performed in a virtual game space. The following will describe in detail game processing for a soccer game, which is executed by the game system 1. FIG. 17 shows an example of main data stored in the main memory 33 of the game apparatus main body 5.

As shown in FIG. 17, the main memory 33 stores therein operation information Da, controller identification number data Db, movement vector data Dc, posture vector data Dd, pointed coordinate data De, virtual space position coordinate data Df, instruction target player data Dg, position data Dh, image data Di, and the like. As described later in detail, each controller 7 can control movement of a specific player character by a coordinate input of the controller 7 in a coach mode or a temporary coach mode, and the specific player character is referred to as an instruction target player. In addition to the data included in the information in FIG. 17, the main memory 33 stores therein data required for the game processing, such as data concerning an object and the like appearing in the game, data concerning the virtual game space, and the like. These data are generated by the CPU 30 executing the game program which is stored in the optical disc 4.

The operation information Da is a series of operation information which is transmitted as the transmission data from the controller 7, and updated to the latest operation data. The operation information Da includes first coordinate data Da1 and second coordinate data Da2 which correspond to the above process result data. The first coordinate data Da1 is data of coordinates representing a position (a position in a taken image) of an image of one of the markers 8L and 8R with respect to an image taken by the image pickup element 743. The second coordinate data Da2 is data of coordinates representing a position (a position in the taken image) of an image of the other of the markers 8L and 8R. For example, the position of the image of the marker is represented by an XY coordinate system in the taken image.

The operation information Da also includes key data Da3, acceleration data Da4, and the like in addition to the coordinate data obtained from the taken image (the first coordinate data Da1 and the second coordinate data Da2) as an example of the process result data. More specifically, the key data Da3 is the core key data obtained from the operation section 72, and the sub key data obtained from the operation section 78. The acceleration data Da4 is the core acceleration data obtained from the acceleration sensor 701, and the sub acceleration data obtained from the acceleration sensor 761. It is noted that the communication unit 6 provided in the game apparatus 3 receives the operation information Da which is transmitted from the controller 7 at a predetermined interval, for example, every 5 ms, and the operation information Da is stored in a buffer (not shown) provided in the communication unit 6. Then, the operation information is read, for example, for each frame (1/60 sec.) which is a game processing cycle, and its latest information is stored in the main memory 33. In addition to the latest operation information, operation information for a previous predetermined time period is stored as a history in the operation information Da according to need. In the case where the game apparatus main body 5 is operated by a plurality of the controllers 7, operation information transmitted from each controller 7 is stored in the operation information Da so as to be associated with the respective controller identification number.

In the controller identification number data Db, a controller identification number, which is used for identifying operation information for each operation team and each operation mode described later, is described. For example, in the controller identification number data Db, a controller identification number Db1 for a player mode of a team A, a controller identification number Db2 for a coach mode of the team A, a controller identification number Db3 for a player mode of a team B, a controller identification number Db4 for a coach mode of the team B, and the like are described. It is noted that the aforementioned identification number data stored in the core unit 70 is transmitted from the core unit 70 and stored as the controller identification number data Db. All of the items in the controller identification number data Db are not necessarily always set, and information indicating that the item has not been set yet is set to an item which the player does not desire to set. A team mode, to which information indicating that it has not been set yet is set, may be computer-controlled. In a game in which three teams or more exist, a plurality of the controller identification number data Db, a number of which correspond to a number of the teams, is set. In a game which does not have an idea of a team, at least one controller for a player mode may be set. It is noted that identification number data for one controller may be set to a plurality of the controller identification number data Db. In this case, for example, processing for a player mode and processing for a coach mode can be executed by operation of the one controller.

The movement vector data Dc indicates directions in which each player character and a ball object appearing in the virtual game space are to move, and velocities at which each player and the ball object are to move. For example, in the movement vector data Dc, movement vector data Dc1 of a player character PC, movement vector data Dc2 of a non-player character NPC, movement vector data Dc3 of an instruction target player, movement vector data Dc4 of a ball object B, and the like are described. In the present embodiment, the virtual game space is a three-dimensional space. However, it can be easily understood by one skilled in the art that the present embodiment includes an aspect applicable to a game of a two-dimensional space.

The posture vector data Dd indicates a posture of the upper body of the player character PC in the virtual game space. For example, in the posture vector data Dd, vector data (posture vector data Vc), which is directed from the waist of the player character PC toward its head in a player character coordinate system, is described. The posture vector data Vc is a three-dimensional vector.

The pointed coordinate data De indicates pointed coordinates, which are based on a screen coordinate system of the monitor 2 and obtained based on the first coordinate data Da1 and the second coordinate data Da2 and. For example, the pointed coordinates are calculated based on direction data which indicates a direction from the first coordinate data Da1 to the second coordinate data Da2 (e.g. a position of the first coordinate data Da1 is an initial point, and a position of the second coordinate data Da2 is an endpoint), and midpoint coordinate data indicating a midpoint between the first coordinate data Da1 and the second coordinate data Da2. In the case where the images of the two markers (the markers 8L and 8R) are regarded as one target image, the midpoint coordinate data indicates the position of the target image. The virtual space position coordinate data D f indicates a virtual space position in the virtual game space which corresponds to the above pointed coordinates. The virtual space position coordinate data Df is calculated based on the pointed coordinate data De, a parameter of a virtual camera, configuration data of the virtual space (geographic data and object position data). It is noted that in the case where the game apparatus main body 5 is operated by a plurality of the controllers 7, the pointed coordinates calculated based on the first coordinate data Da1 and the second coordinate data Da2 which are transmitted from each controller 7, and the virtual space position are stored in the pointed coordinate data De and the virtual space position coordinate data Df, respectively, so as to be associated with the respective controller identification number.

The instruction target player data Dg indicates an instruction target player for each controller 7. For example, in the instruction target player data Dg, data Dg1 indicating an instruction target player for a controller 7 for the player mode of the team A, data Dg2 indicating an instruction target player for a controller 7 for the coach mode of the team A, data Dg3 indicating an instruction target player for a controller 7 for the player mode of the team B, data Dg4 indicating an instruction target player for a controller 7 for the coach mode of the team B, and the like are described.

The position data Dh is data of coordinates in the virtual game space, which represent each position of the characters and the objects appearing in the virtual game space. The image data Di is image data for generating the characters, the objects, and backgrounds appearing in the virtual game space.

Figure 18:
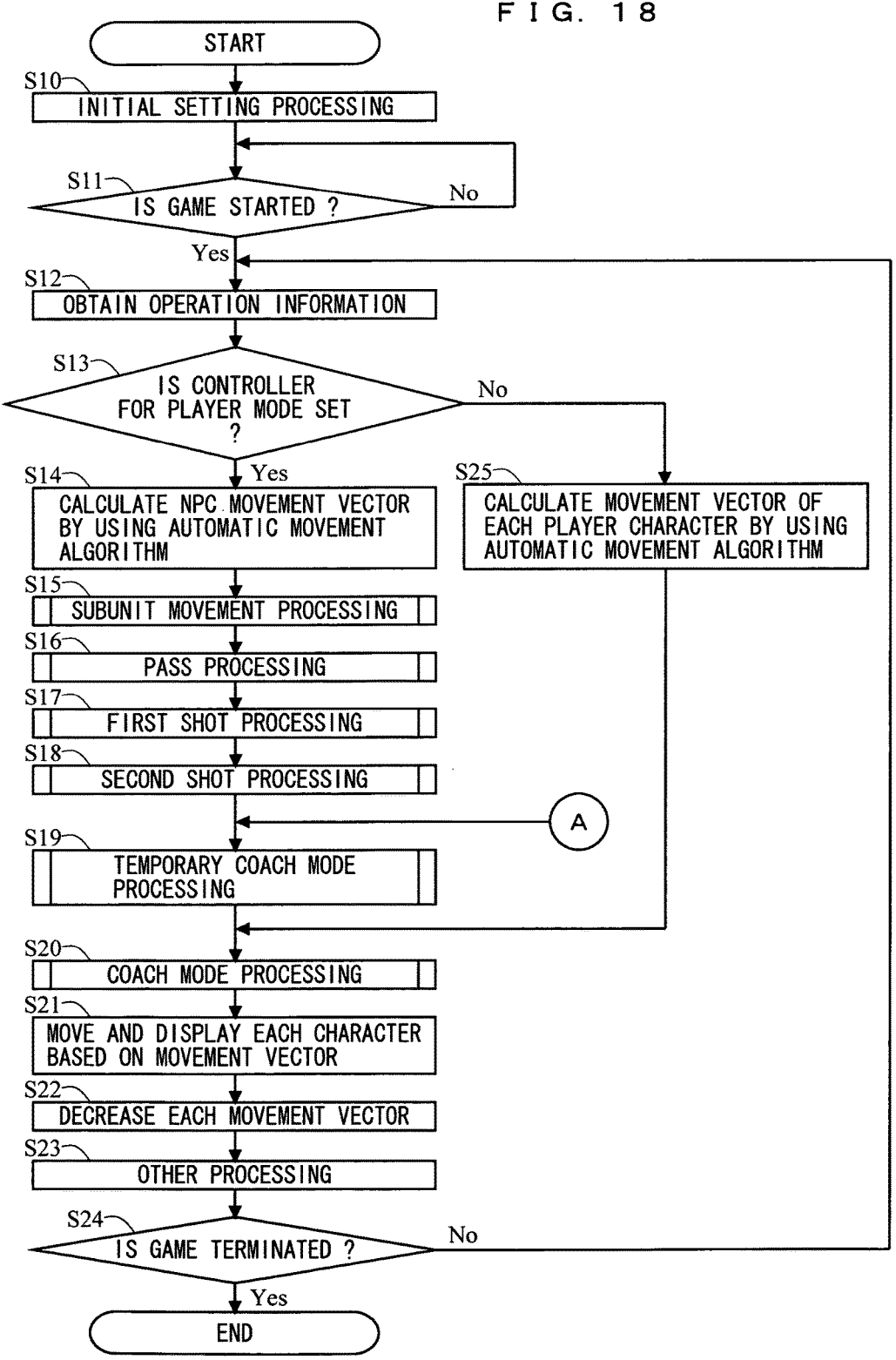
FIG. 18 is a flow chart showing a procedure of game processing executed by the game apparatus main body 5.
Figure 19:
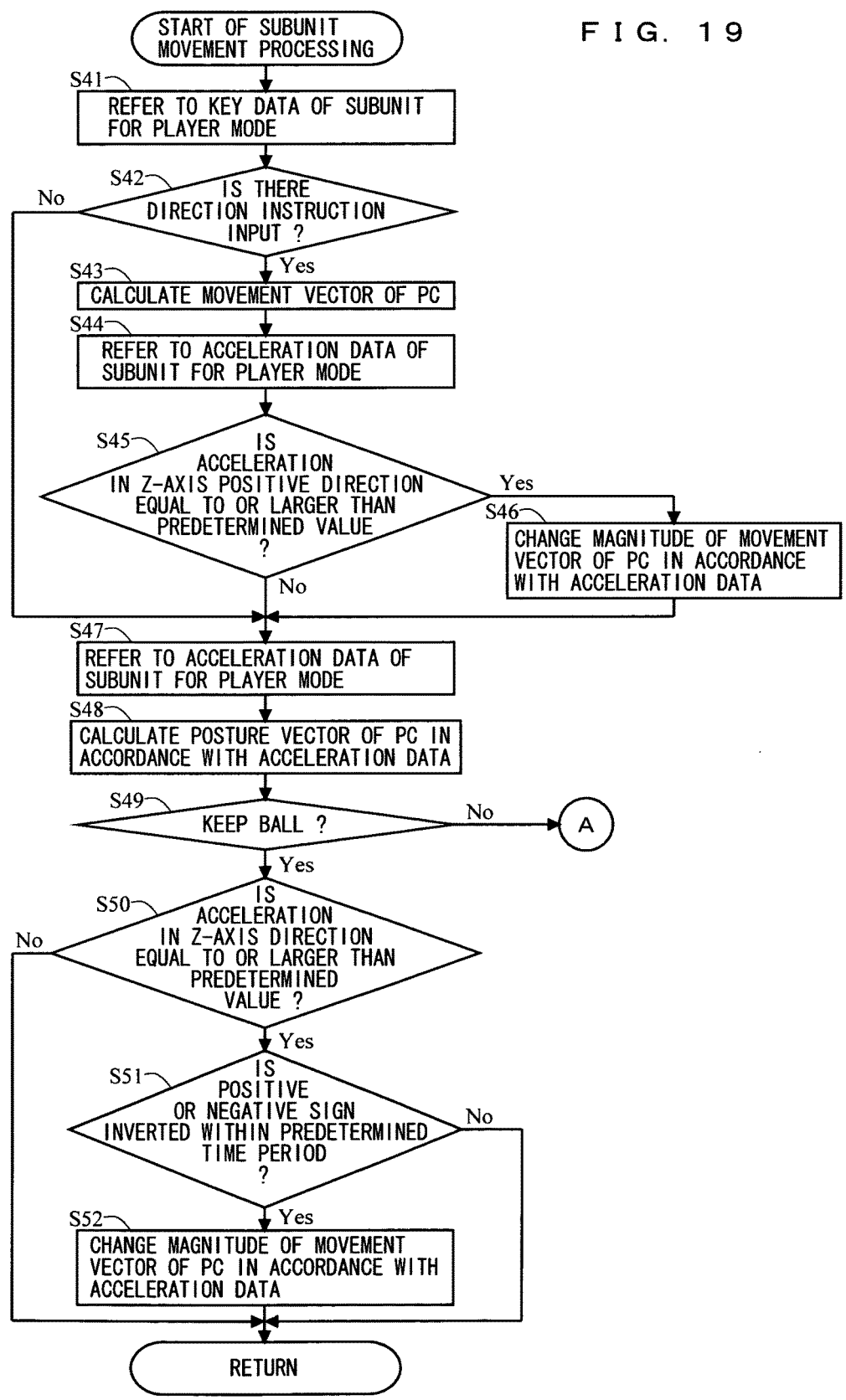
FIG. 19 is a flow chart of a subroutine showing a detailed operation of subunit movement processing at a step 15 in FIG. 18.
Figure 20:
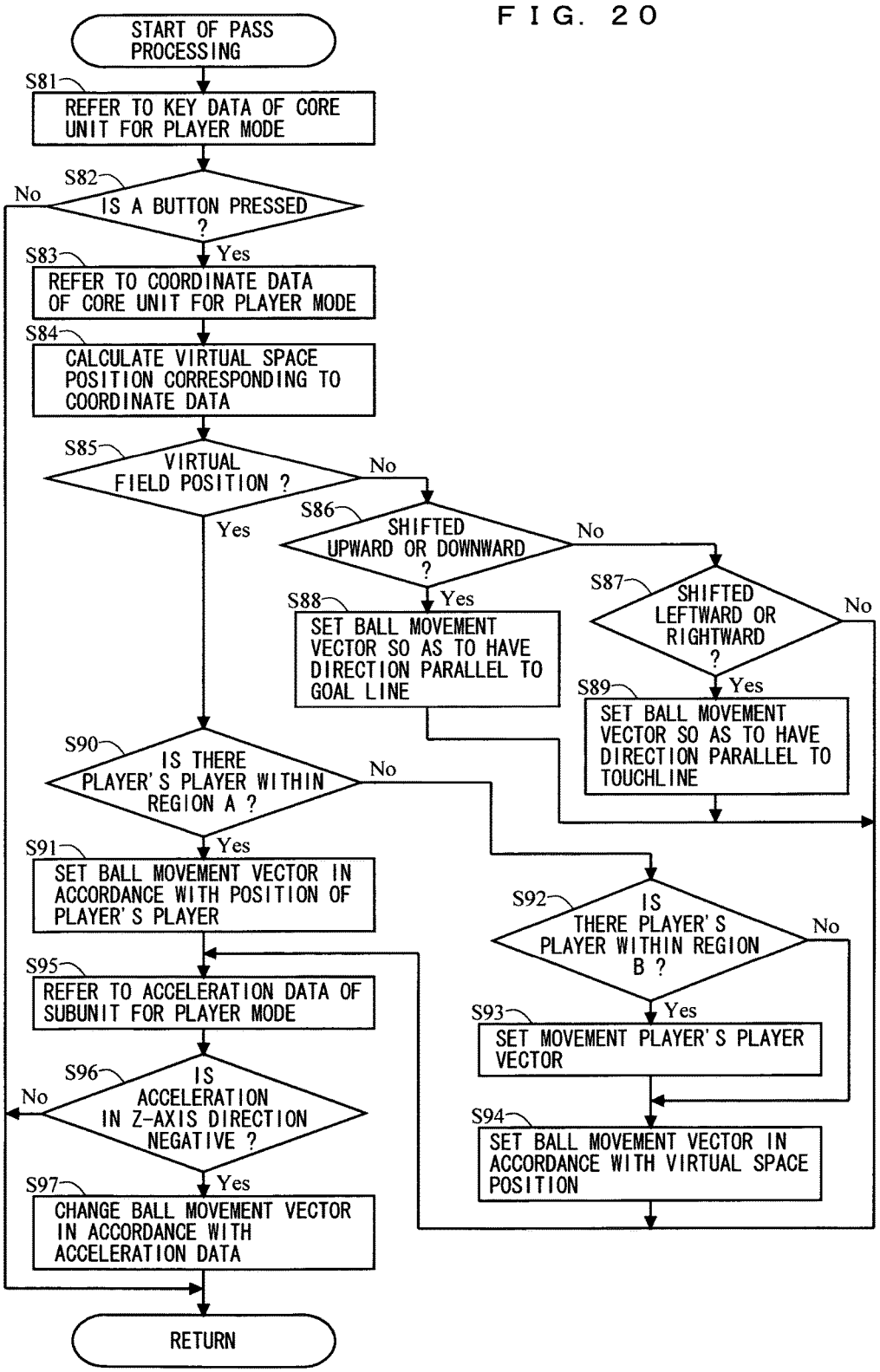
FIG. 20 is a flow chart of a subroutine showing a detailed operation of pass processing at a step 16 in FIG. 18.
Figure 21:
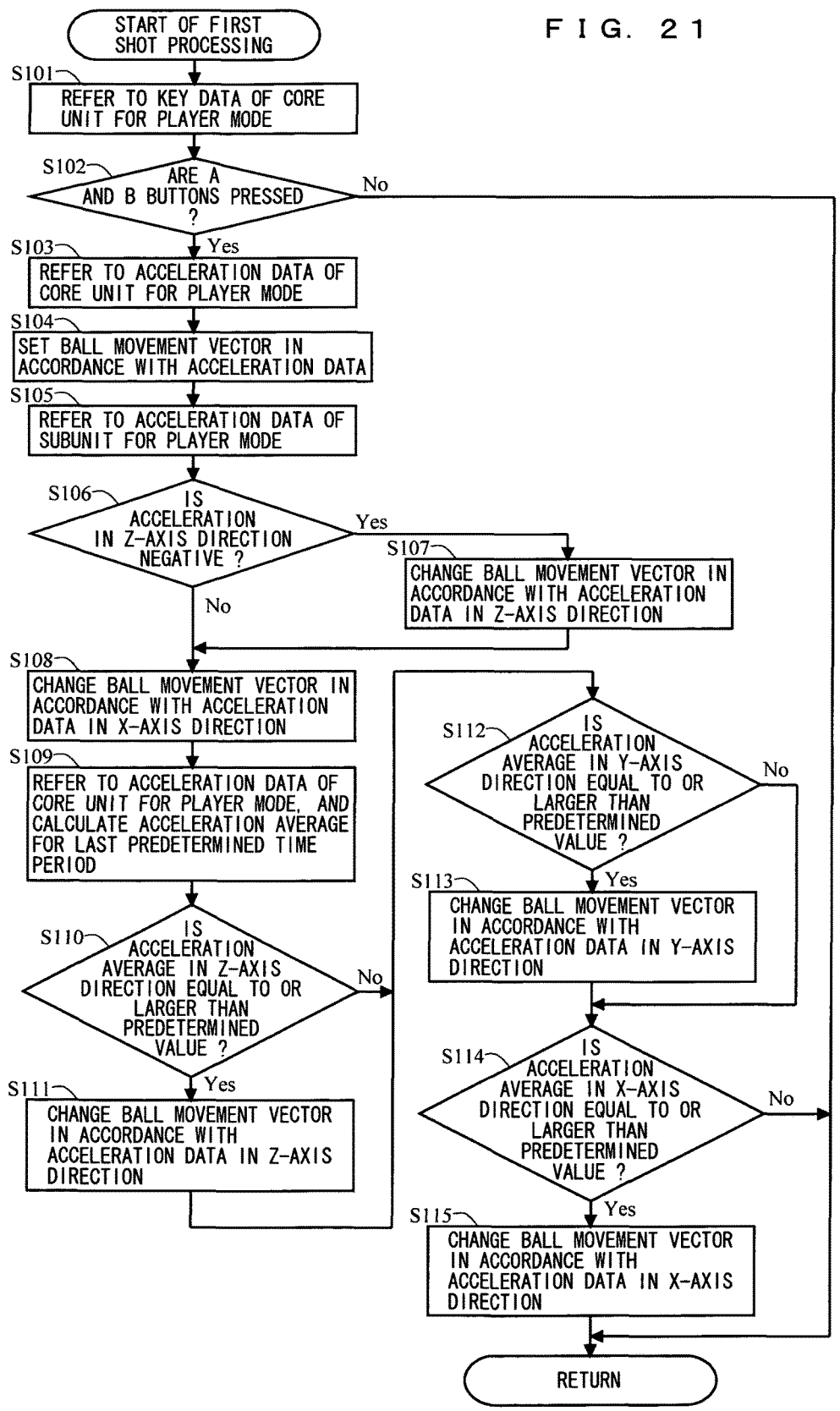
FIG. 21 is a flow chart of a subroutine showing a detailed operation of first shot processing at a step 17 in FIG. 18.
Figure 22:
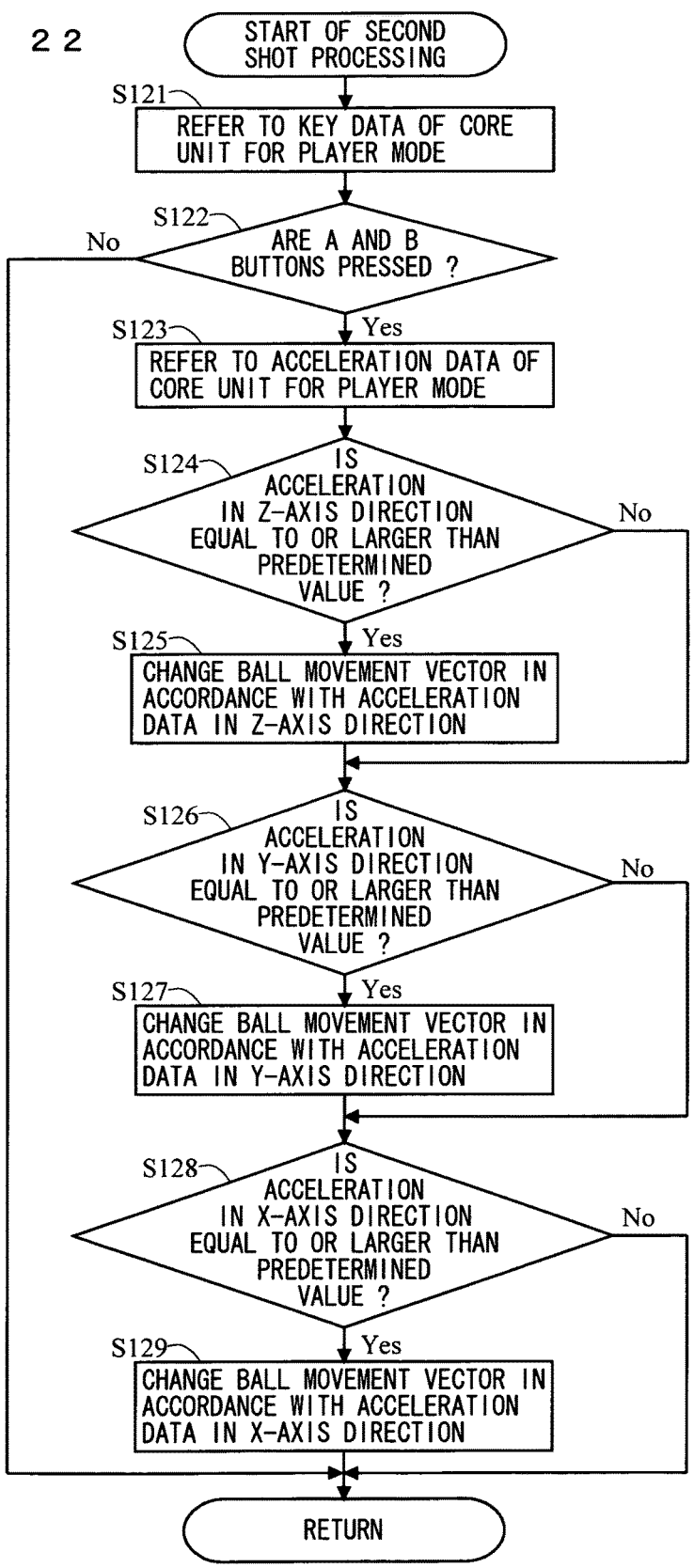
FIG. 22 is a flow chart of a subroutine showing a detailed operation of second shot processing at a step 18 in FIG. 18.
Figure 23:
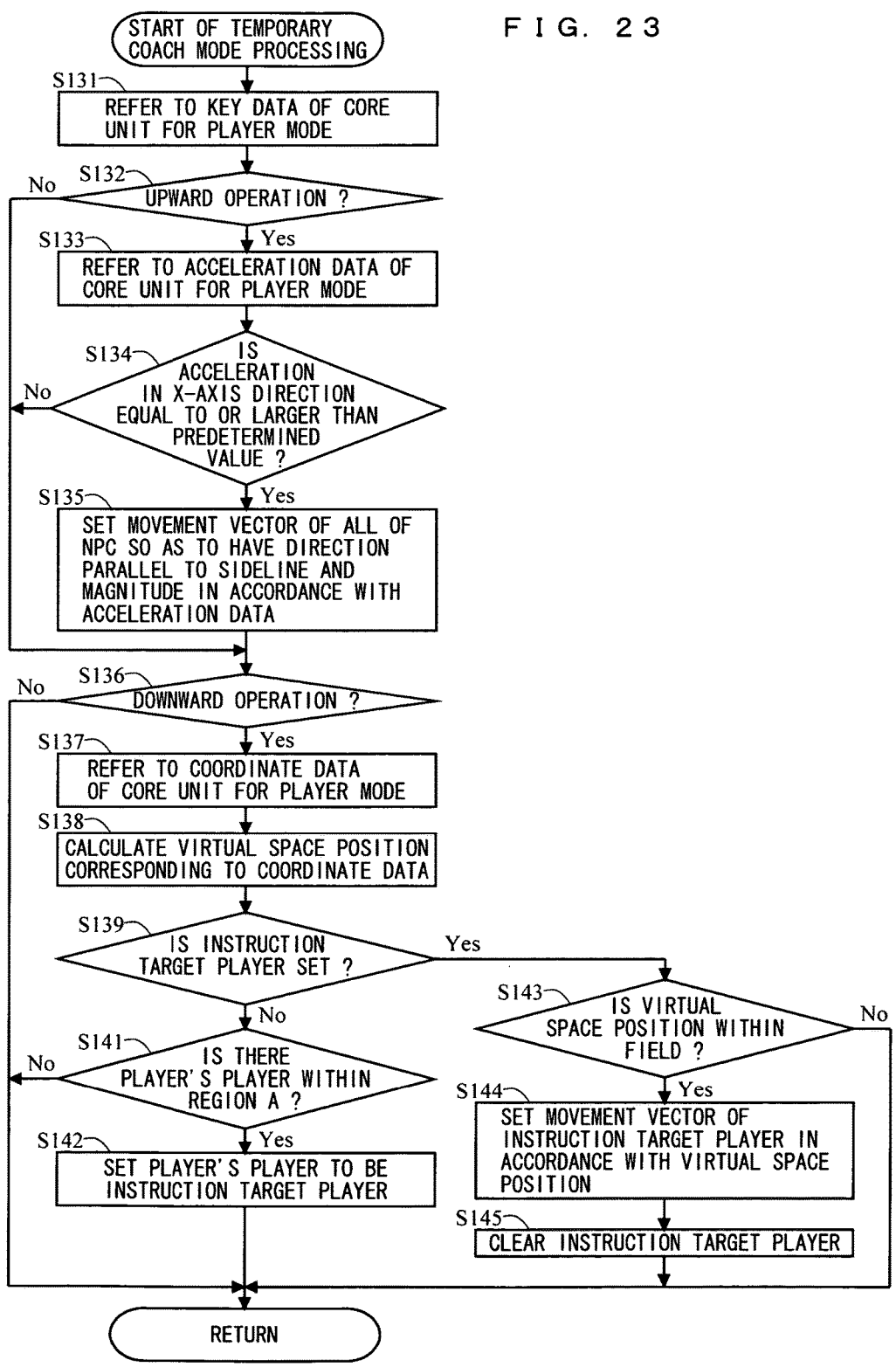
FIG. 23 is a flow chart of a subroutine showing a detailed operation of temporary coach mode processing at a step 19 in FIG. 18.
Figure 24:
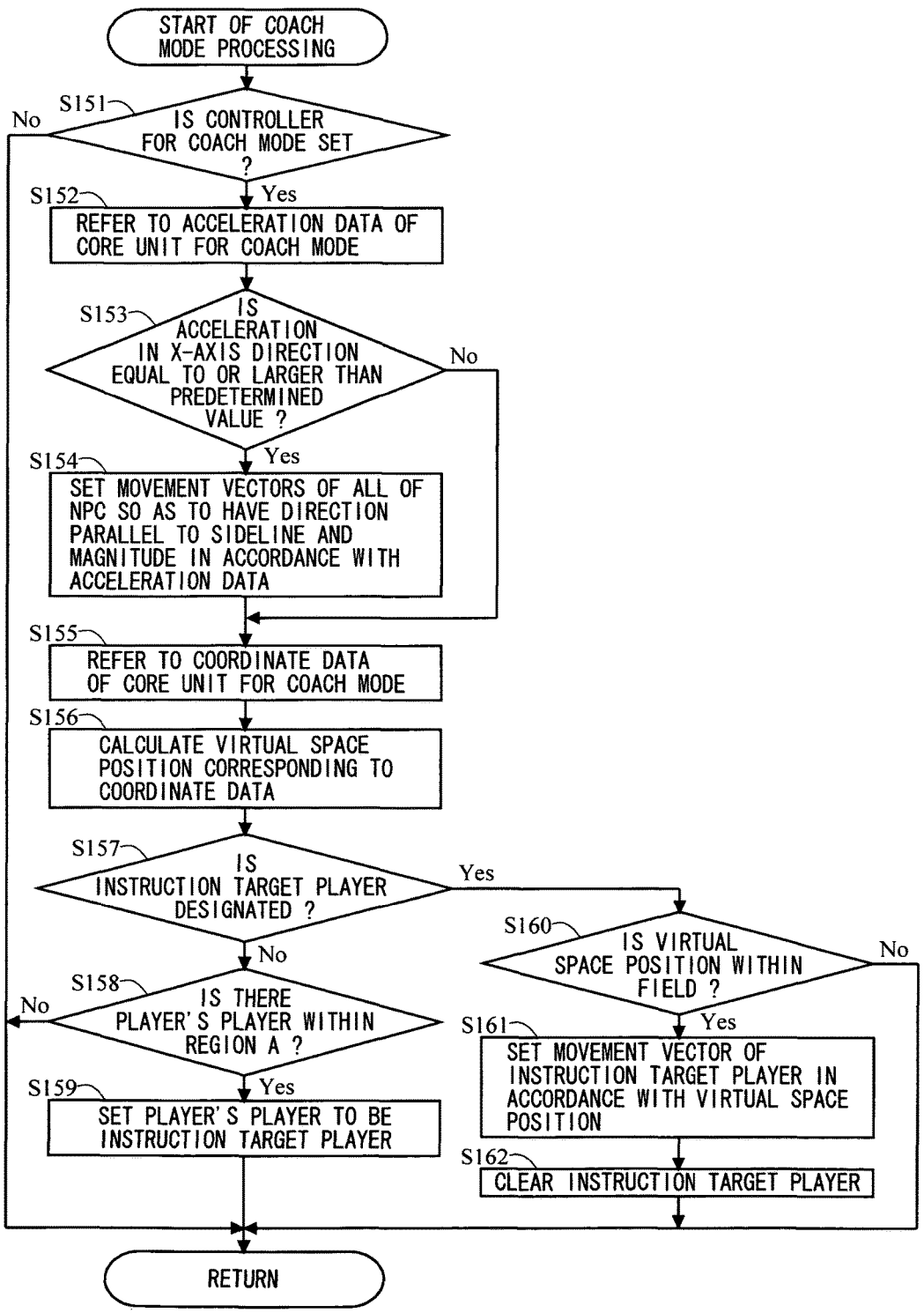
FIG. 24 is a flow chart of a subroutine showing a detailed operation of coach mode processing at a step 20 in FIG. 18.
Figure 26:
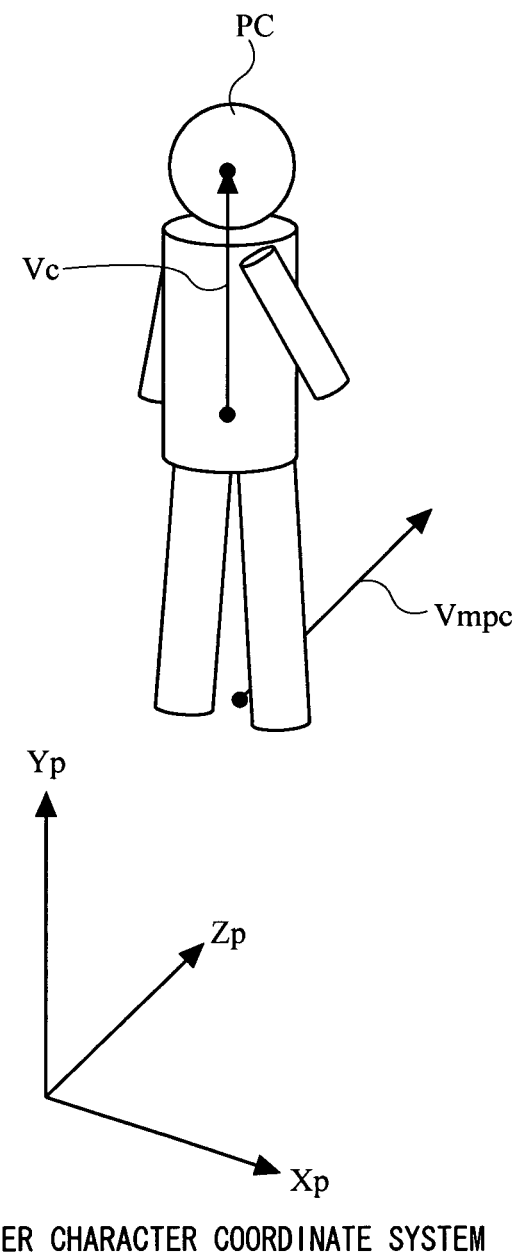
FIG. 26 is a view illustrating a position vector Vc which is set to a player character PC.
Figure 28:
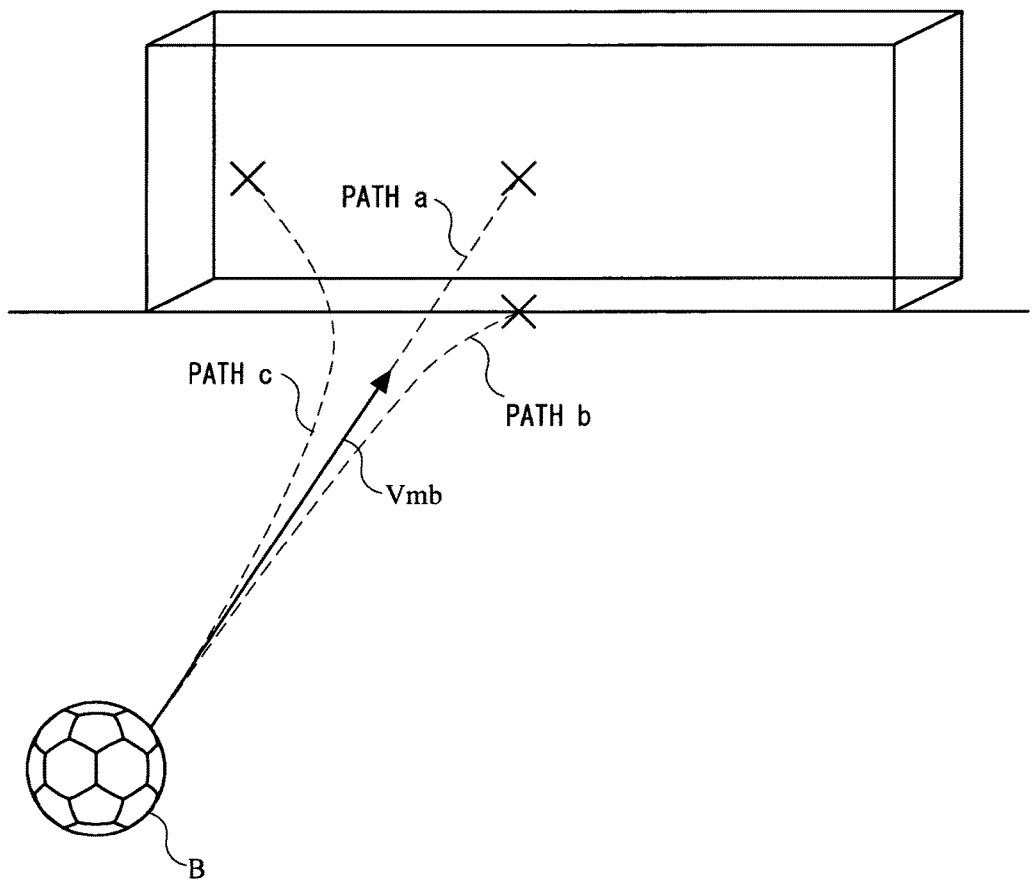
FIG. 28 illustrates an example of paths along which a ball object B is to move.
Figure 29:
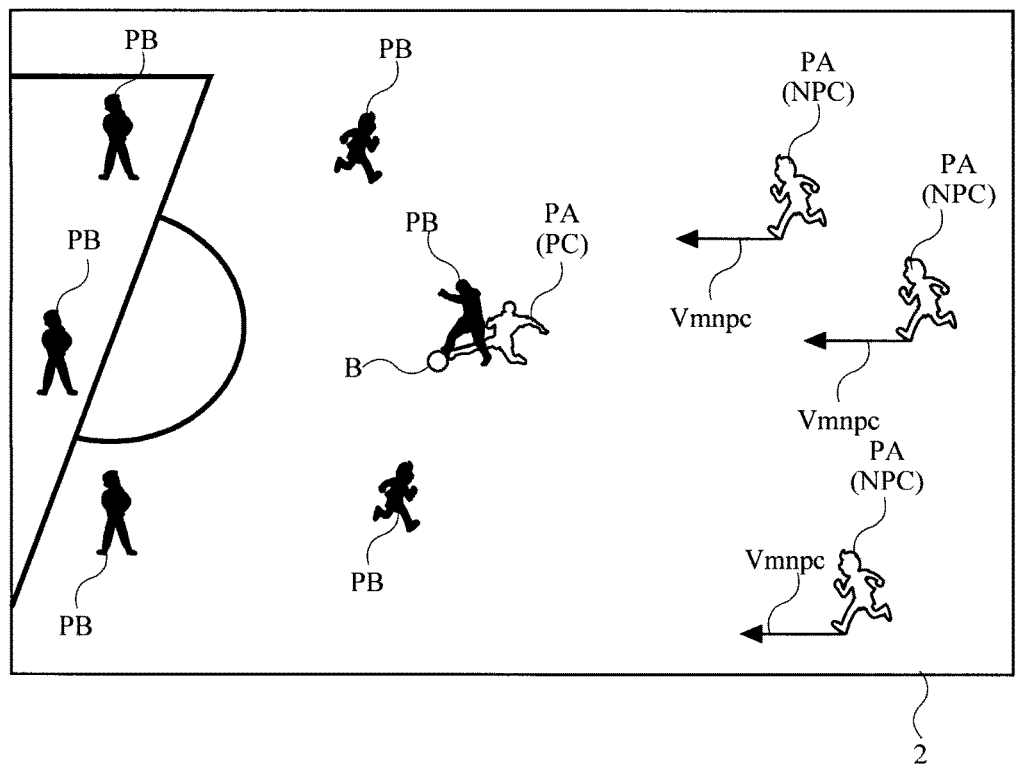
FIG. 29 illustrates an example of movement vectors Vmnpc which are set to non-player characters NPC.

With reference to FIGS. 18 to 29, the following will describe in detail the game processing executed by the game apparatus main body 5. FIG. 18 is a flow chart showing a procedure of the game processing executed by the game apparatus main body 5. FIG. 19 is a flow chart of a subroutine showing a detailed operation of subunit movement processing at a step 15 in FIG. 18. FIG. 20 is a flow chart of a subroutine showing a detailed operation of pass processing at a step 16 in FIG. 18. FIG. 21 is a flow chart of a subroutine showing a detailed operation of first shot processing at a step 17 in FIG. 18. FIG. 22 is a flow chart of a subroutine showing a detailed operation of second shot processing at a step 18 in FIG. 18. FIG. 23 is a flow chart of a subroutine showing a detailed operation of temporary coach mode processing at a step 19 in FIG. 18. FIG. 24 is a flow chart of a subroutine showing a detailed operation of coach mode processing at a step 20 in FIG. 18. FIG. 25 is an exemplary view illustrating a game image displayed on the monitor 2. FIG. 26 is a view illustrating a position vector Vc which is set to the player character PC. FIG. 27 is a view illustrating a target position TP of a pass and regions A and B. FIG. 28 illustrates an example of paths along which the ball object B is to move. FIG. 29 illustrates an example of the movement vectors Vmnpc which are set to the non-player characters NPC. It is noted that among the game processing, processing through which the soccer game is performed in the virtual game space will be mainly described with reference to the flow charts shown in FIGS. 18 to 24, but other processing which are not directly relevant to the present invention will not be described in detail. In FIGS. 18 to 24, each step executed by the CPU 30 is abbreviated to "S". Concerning coordinate axes of the virtual game space which is shown in FIG. 25, the left-right direction (the horizontal direction along which a touchline extends) corresponds to X-direction, the up-down direction (the vertical direction) corresponds to Y-direction, and the depth direction (the horizontal direction along which a goal line extends) corresponds to Z-direction.

When power is applied to the game apparatus main body 5, the CPU 30 of the game apparatus main body 5 executes the boot program stored in the boot ROM (not shown) to initialize each unit such as the main memory 33 and the like. Then, the game program stored in the optical disc 4 is read by the main memory 33, and the CPU 30 starts to execute the game program. The flow charts shown in FIGS. 18 to 24 show game processing which is executed by the CPU 30 executing the game program after the completion of the above processing.

As shown in FIG. 18, the CPU 30 executes initial setting processing in the game processing (a step 10), and advances the processing to the next step. For example, in the soccer game, player characters are divided into the team A and the team B, the game advances, and the player can operate the player characters of one of the teams (referred to as a team X). The player can select from the player mode in which the player directly operates the player characters of the team X, and the coach mode in which the player comprehensively governs the player characters of the team X. It is noted that both of the player mode and the coach mode do not have to be necessarily set, but only the player mode or only the coach mode may be set. Thus, in the above step 10, the CPU 30 sets and describes the controller identification number for the player mode of the team A, the controller identification number for the coach mode of the team A, the controller identification number for the player mode of the team B, and the controller identification number for the coach mode of the team B in the controller identification number data Db for identifying and administering the respective controller 7 operated for each team in each mode.

More specifically, a team (A or B) and a mode (player or coach) are selected in a menu screen displayed on the monitor 2 by operation of the controller 7 being used (each controller 7 in the case of a plurality of the controllers 7), and identification number data stored in the controller 7, by means of which this selection is performed, is set to the corresponding controller identification number Db. For example, when the team A and the player mode are selected by operation of a controller 7, the identification number of the controller 7 is set to the controller identification number Db1 for the player mode of the team A. Also, in the above step 10, the CPU 30 performs initial setting (setting of a game field, initial placement of each player character and the ball object, and the like) prior to the start of the game, and updates each data stored in the main memory 33.

Next, the CPU 30 determines whether or not to start the game (a step 11). A condition for starting the game includes, for example, satisfaction of conditions to make the game started, an operation performed by the player for starting the game, and the like. The CPU 30 repeats the processing of the above step 11 when not starting the game, and advances the processing to the next step 12 when starting the game.

Each processing at the steps 12 to 24 is repeated at the above game processing cycle (e.g. every 1/60 sec.) for each of the teams A and B (the team X). Hereinafter, processing for each of the teams A and B is referred to as processing for the team X.

At the step 12, the CPU 30 receives the operation information from the controller 7 (each controller 7 in the case of a plurality of the controllers 7), and individually stores the operation information in the operation information Da for each controller identification number. Next, the CPU 30 refers to the controller identification number data Db, and determines whether or not a controller identification number Db for the player mode of the team X is set (a step 13). When the controller identification number Db for the player mode of the team X is set, the CPU 30 advances the processing to the next step 14. On the other hand, when the controller identification number Db for the player mode of the team X has not been set, the CPU 30 advances the processing to the next step 25.

At the step 14, the CPU 30 sets a movement vector Vmnpc of each non-player character NPC of the team X by using a predetermined automatic movement algorithm, stores the movement vectors Vmnpc in the movement vector data Dc. Then, the CPU 30 advances the processing to a step 21 through the subunit movement processing (the step 15), the pass processing (the step 16), the first shot processing (the step 17), the second shot processing (the step 18), the temporary coach mode processing (the step 19), and the coach mode processing (the step 20). The detailed processing executed at the steps 15 to 20 will be described later.

For example, as shown in FIG. 25, it is assumed that the player operates player characters A which belong to the team A (shown by outline shapes) in the player mode, and plays the soccer game against the team B to which computer-controlled player characters PB (shown by black-filled shapes) belong. In this case, the player directly operates any one of the player characters PA (a player character PA1 in FIG. 25) as a player character PC, the other player characters PA become non-player characters NPC. All of the player characters PB become non-player characters NPC. The team, the player character of which keeps the ball object B, is an offensive team (in FIG. 25, the team A is an offensive team since the player character PA1 keeps the ball object B), and the other team is a defensive team (the team B in FIG. 25). When the team X is a defensive team (when the team X is the team B) at the above step 14, the CPU 30 sets, in accordance with a later-described posture vector of the upper body of the player character (the player character PA1) keeping the ball object B, the movement vector of a player character (a player character PB1 in FIG. 25) of the team X (the team B) which is located in a predetermined area which is set based on position data of the player character keeping the ball object B. More specifically, in the present embodiment, the CPU 30 sets the movement vector of the player character located in the above predetermined area so as to have a direction based on "a vector A which is obtained by projecting the posture vector of the player character (PA1) keeping the ball object B on a virtual horizontal plane (a vector having an X component equal to an X component of the posture vector, a Y component which is zero, and a Z component equal to a Z component of the posture vector)". It is noted that the movement vector of the player character, which is set by the above automatic movement algorithm, may be corrected (typically added) by the vector A.

On the other hand, in the case of No at the step 13 (namely, when a controller 7 for the player mode of the team X has not been set), at the step 25, the CPU 30 sets the movement vectors Vmnpc of all of the player characters of the team X by using a predetermined automatic movement algorithm, stores the movement vectors Vmnpc in the movement vector data Dc (namely, since the controller 7 for the player mode of the team X has not been set, all of the player characters of the team X become non-player characters NPC). It is noted that at the above step 25, similarly as at the above step 14, setting and correction of the movement vector of the player character located in the predetermined area are performed in accordance with the posture vector. Then, the CPU 30 advances the processing to a step 21 through the coach mode processing (the step 20).

At the step 21, the CPU 30 moves each character and object in the virtual game space based on each movement vector data described in the movement vector data Dc, and displays a game image on the monitor 2. Next, the CPU 30 decreases each movement vector described in the movement vector data Dc by a predetermined amount, and updates the movement vector data Dc (a step 22). Then, the CPU 30 executes other processing executed in the soccer game, such as goal processing, foul processing, switching processing of the player character PC, and the like (a step 23), and advances the processing to the next step.

Next, the CPU 30 determines whether or not to terminate the game (a step 24). A condition for terminating the game processing include, for example, satisfaction of conditions to make the game over, an operation performed by the player for terminating the game, and the like. The CPU 30 returns to and repeats the above step 12 when not terminating the game, and terminates the processing of the flow chart when terminating the game.

With reference to FIG. 19, the following will describe the detailed operation of the subunit movement processing at the step 15.

As shown in FIG. 19, the CPU 30 refers to the latest sub key data, which is included in operation information transmitted from the subunit for the player mode of the team X, from the operation information Da (a step 41), and advances the processing to the next step. Here, at the above step 12, the operation information transmitted from each controller 7 is individually stored in the operation information Da for the respective controller identification number, and the controller identification number for the player mode of the team X is described in the controller ID data Db. Thus, the CPU 30 can extract the operation information, which is transmitted from the subunit for the player mode, from the operation information Da based on the controller identification number for the player mode of the team X described in the controller ID data Db.

Next, the CPU 30 determines whether or not there is a direction instruction input from the player based on the sub key data of the subunit for the player mode, which is referred to at the step 41 (a step 42). As described above, the subunit 76 is provided with the stick 78*a*, and a direction instruction input can be performed by the player inclining the inclinable stick 78*a*. When there is a direction instruction input from the player, the CPU 30 advances the processing to the next step 43. On the other hand, when there is no direction instruction input from the player, the CPU 30 advances the processing to the next step 47.

At the step 43, the CPU 30 calculates a movement vector Vmpc of the player character PC of the team X based on the direction instruction input from the subunit 76 for the player mode of the team X, updates the movement vector data Dc, and advances the processing to the next step. For example, as shown in FIG. 26, the movement vector Vmpc is set as data indicating a movement direction and a movement velocity of the player character PC in the virtual game space. At the step 43, based on the current movement vector Vmpc of the player character PC stored in the movement vector data Dc, the CPU 30 calculates a new movement vector Vmpc having a direction in the virtual game space, which is determined in accordance with the inclination direction of the stick 78*a*, and a magnitude in accordance with the inclination angle of the stick 78*a*. Through this processing, the movement direction and the movement velocity of the player character PC of the team X, which is operated by the player, in the virtual game space are controlled by operating the stick 78*a* of the subunit 76 held by the player.

Next, the CPU 30 refers to the latest sub acceleration data, which is included in the operation information transmitted from the subunit for the player mode of the team X, from the operation information Da (a step 44). The CPU 30 determines whether or not a magnitude of acceleration in the Z-axis positive direction (see FIG. 9) which is indicated by the sub acceleration data is equal to or larger than a predetermined value (a step 45). When the magnitude of the acceleration in the Z-axis positive direction is equal to or larger than the predetermined value, the CPU 30 increases the magnitude of the movement vector Vmpc of the player character PC of the team X, which is determined at the step 43 as described above, by using a predetermined algorithm (e.g. increases the magnitude in accordance with the magnitude of the acceleration in the Z-axis positive direction or by a predetermined value, or multiplies the magnitude by n (n is a numeric value larger than one)), updates the movement vector data Dc of the player character PC (a step 46), and advances the processing to the next step 47. Through the processing at the step 46, the movement velocity of the player character PC, which is operated by the player, in the virtual game space is accelerated by the player inclining the subunit 76 forward (namely, inclining the subunit 76 so that the Z-axis positive direction is directed to a lower position than a Z-axis negative direction). On the other hand, when the magnitude of the acceleration in the Z-axis positive direction is smaller than the predetermined value, the CPU 30 advances the processing to the step 47. It is noted that it may be determined at the step 45 whether or not a magnitude of acceleration in the Z-axis negative direction is smaller than a predetermined value (a minus value). When the determination is Yes, the magnitude of the movement vector Vmpc of the player character PC of the team X is decreased by a predetermined algorithm (e.g. decreased in accordance with the magnitude of the acceleration in the Z-axis negative direction or by a predetermined value, or multiplied by m (m is a numeric value smaller than one)), and the movement vector data Dc of the player character PC is updated.

At the step 47, the CPU 30 refers to the latest sub acceleration data, which is included in the operation information transmitted from the subunit for the player mode of the team X, from the operation information Da. Then, the CPU 30 calculates a posture vector Vc of the player character PC of the team X based on the sub acceleration data, updates the posture vector data Dd, and advances the processing to the next step.

For example, as shown in FIG. 26, the posture vector Vc is set as data indicating a posture of the player character PC in the virtual game space. The posture vector Vc is set based on the player character coordinate system. In the player character coordinate system, the front-rear direction of the player character PC in the virtual game space is a Zp-axis direction (typically, the direction of the movement vector Vmpc of the player character PC is the Zp-axis direction, or in the case where a movement direction vector of the player character PC and a facing direction vector (a forward vector) of the player character PC are controlled independently, the direction of the facing direction vector of the player character PC may correspond to the Zp-axis direction), and the forward direction of the player character PC is a Zp-axis positive direction. Also, the left-right direction of the player character PC in the virtual game space is an Xp-axis direction, and the rightward direction seen from the player character PC is an Xp-axis positive direction. Further, the vertical direction of the player character PC in the virtual game space is a Yp-axis direction, and the upward direction is a Yp-axis positive direction. The posture vector Vc is set as vector data which is directed from the waist of the player character PC toward its head. The posture vector Vc is typically vector data in the player character coordinate system.

At a step 48, the CPU 30 calculates the posture vector Vc so as to cause acceleration in the X-axis direction (see FIG. 9) which is indicated by the sub acceleration data to correspond to the Xp-axis direction in the player character coordinate system, so as to cause acceleration in the Y-axis direction which is indicated by the sub acceleration data to correspond to the Yp-axis direction in the player character coordinate system, and so as to cause acceleration in the Z-axis direction which is indicated by the sub acceleration data to correspond to the Zp-axis direction in the player character coordinate system.

For example, at the step 48, as an example, the posture of the player character PC is controlled in accordance with the inclination of the subunit 76. In this case, more specifically, a value of the posture vector data in the Xp-axis direction in the player character coordinate system is determined in accordance with (typically, so as to be proportional to) a value of the acceleration in the X-axis direction which is indicated by the sub acceleration data, a value of the posture vector data in the Yp-axis direction in the player character coordinate system is determined in accordance with (typically, so as to be proportional to) a value obtained by inverting a positive or negative sign of a value of the acceleration in the Y-axis direction which is indicated by the sub acceleration data, and a value of the posture vector data in the Zp-axis direction in the player character coordinate system is determined in accordance with (typically, so as to be proportional to) a value of the acceleration in the Z-axis direction which is indicated by the sub acceleration data (a common proportionality constant is typically used for each axis direction but it is not limited thereto). More specifically, for example, the posture vector data is determined so as to satisfy the following equation, the value of the acceleration in the X-axis direction which is indicated by the sub acceleration data: the value of the acceleration in the Y-axis direction which is indicated by the sub acceleration data: the value of the acceleration in the Z-axis direction which is indicated by the sub acceleration data=the value of the posture vector data in the Xp-axis direction in the player character coordinate system: the value of the posture vector data in the Yp-axis direction in the player character coordinate system: the value of the posture vector data in the Zp-axis direction in the player character coordinate system. Or, the value of the posture vector data in the Xp-axis direction in the player character coordinate system may be determined in accordance with the value of the acceleration in the X-axis direction which is indicated by the sub acceleration data, the value of the posture vector data in the Zp-axis direction in the player character coordinate system may be determined in accordance with the value of the acceleration in the Z-axis direction which is indicated by the sub acceleration data, and the value of the posture vector data in the Yp-axis direction in the player character coordinate system may be constant.

For example, at the step 48, as an example, the posture of the player character PC is controlled in accordance with movement (parallel movement) of the subunit 76. For example, when the player moves the subunit 76 rightward, acceleration is generated in the subunit 76 in the X-axis positive direction (when the player moves the subunit 76 rightward, acceleration in the X-axis positive direction outputted at the beginning of the movement may be detected, or acceleration in the X-axis negative direction outputted at the end of the movement may be detected). The acceleration sensor 761 provided in the subunit 76 detects the acceleration in the X-axis positive direction, and the subunit 76 transmits sub acceleration data indicating the acceleration to the game apparatus main body 5. Then, in accordance with the acceleration in the X-axis positive direction which is indicated by the received sub acceleration data, the CPU 30 adds to the posture vector Vc a vector having the Xp-axis positive direction and the same magnitude as the acceleration, and calculates a new posture vector Vc. The upper body of the player character PC is inclined in the Xp-axis positive direction in accordance with the newly calculated posture vector Vc. When the player moves the subunit 76 forward, acceleration in the Z-axis positive direction is generated in the subunit 76. The acceleration sensor 761 provided in the subunit 76 detects the acceleration in the Z-axis positive direction, and the subunit 76 transmits sub acceleration data indicating the acceleration to the game apparatus main body 5. Then, in accordance with the acceleration in the Z-axis positive direction which is indicated by the received sub acceleration data, the CPU 30 adds to the posture vector Vc a vector having the Zp-axis positive direction and the same magnitude as the acceleration, and calculates a new posture vector Vc. The upper body of the player character PC is inclined in the Zp-axis positive direction in accordance with the newly calculated posture vector Vc. Through this processing at the step 48, the posture of the player character PC, which is operated by the player, in the virtual game space changes in accordance with the movement of the subunit 76 which is made by the player.

At the steps 14 and 25, the movement vector of the player character (e.g. the player character PB1 shown in FIG. 25) of the opponent team which is located in the predetermined area of the player character PC keeping the ball object B is corrected in accordance with the posture vector Vc of the player character PC. More specifically, since correction is made by adding to the movement vector of the player character of the opponent team a vector which is obtained by projecting the posture vector Vc on the virtual horizontal plane, a direction in which the player character is to move is changed to the direction in which the posture vector Vc is inclined with respect to the vertical direction in the virtual game space. In other words, the player character of the opponent team moves in accordance with the posture of the player character PC which is changed by the movement of the subunit 76 made by the player, namely, a movement of the opponent player which is caused by the influence of a feint during a dribble is expressed.

Referring back to FIG. 19, after the processing at the step 48, the CPU 30 determines whether or not any of the player characters which belong to the team X keeps the ball object B (a step 49). When any of the player characters which belong to the team X keeps the ball object B (namely, when the team X is the offensive team), the CPU 30 advances the processing to the next step 50. On the other hand, when none of the player characters which belong to the team X keeps the ball object B, the CPU 30 advances the processing to the next step 19.

At the step 50, the CPU 30 determines whether or not the magnitude (the absolute value) of the acceleration in the X-axis direction, which is indicated by the latest sub acceleration data which is referred to at the step 47, is equal to or larger than a predetermined acceleration A1 (e.g. the predetermined acceleration A1 may be 0.5 G or greater but may be any value). When the magnitude of the acceleration in the X-axis direction is equal to or larger than the predetermined acceleration A1, the CPU 30 advances the processing to the next step 51. On the other hand, when the magnitude of the acceleration in the X-axis direction is smaller than the predetermined acceleration A1, the CPU 30 terminates the processing of this subroutine, and advances the processing to the step 16.

At the step 51, the CPU 30 refers to a history of the sub acceleration data, which is included in the operation information transmitted from the subunit for the player mode of the team X, from the operation information Da, and determines whether or not the direction of the acceleration in the X-axis direction, which is indicated by the history of the sub acceleration data, is inverted n times (n is an integer number equal to or greater than one) within a last predetermined time period by a magnitude equal to or larger than the predetermined acceleration A1. For example, referring to the history of the sub acceleration data, whether or not "within the last predetermined time period, there is data which has acceleration with a positive or negative sign opposite of that of the acceleration indicated by the latest sub acceleration data (data having the acceleration which is determined to be equal to or larger than the acceleration A1 at the step 50) and with an absolute value equal to or larger than the acceleration A1" is determined (in the case of n=1). Or, whether or not "within the last predetermined time period, there is data which has acceleration with a positive or negative sign opposite of that of the acceleration indicated by the latest sub acceleration data and with an absolute value equal to or larger than the acceleration A1, and before this data, there is data which has acceleration with a positive or negative sign opposite of that of the acceleration of this data and with an absolute value equal to or larger than the acceleration A1" is determined (in the case of n=2). Alternatively, whether or not the direction of the acceleration in the X-axis direction which is indicated by the history of the sub acceleration data is inverted n times by a magnitude equal to or larger than the predetermined acceleration A1 and each interval of the inversion is equal to or shorter than a predetermined time period may be determined.

When the direction of the acceleration in the X-axis direction is inverted within the predetermined time period, the CPU 30 adds to the movement vector Vmpc of the player character PC of the team X a vector having the Xp-axis direction and a predetermined magnitude (The magnitude of the vector may be fixed or proportional to the magnitude of the acceleration in the X-axis direction which is indicated by the sub acceleration data. The direction of the vector is the Xp-axis positive direction when the acceleration in the X-axis direction is positive, and the Xp-axis negative direction when the acceleration in the X-axis direction is negative.) to produce a new movement vector Vmpc (a step 52). The CPU 30 terminates the processing of this subroutine, and advances the processing to the step 16. Through the processing at the steps 50 to 52, the movement of the player character PC, which is operated by the player, in the virtual game space is controlled so that the player character zigzags by the player shaking the subunit 76 in the left-right direction (namely, in the X-axis direction). On the other hand, when the direction of the acceleration in the X-axis direction is not inverted within the predetermined time period, the CPU 30 terminates the processing of this subroutine, and advances the processing to the step 16.

It is noted that the aforementioned processing may be executed as follows. In an example, motion data of the player character PC is stored in the optical disc 4, and read out in advance by the main memory 33. When it is determined at the step 51 that the direction of the acceleration in the X-axis direction is inverted within the predetermined time period, the player character PC is caused to perform a motion based on the motion data instead of the aforementioned processing at the step 52. It is noted that the motion data may be motion data for causing the player character PC to perform a feint motion.

In another example, a plurality of motion data are stored in the optical disc 4, and read out in advance by the main memory 33. The history of the sub acceleration data, which is included in the operation information transmitted from the subunit for the player mode of the team X, is referred to from the operation information Da, and one motion data may be selected in use in accordance with a pattern indicated by the history of the sub acceleration data. For example, motion data A for causing the player character PC to perform a motion of a scissors feint, and motion data B for causing the player character PC to perform a motion of moving its body right and left are prepared in advance. When it is determined that the direction of the acceleration in the X-axis direction is inverted within the predetermined time period, the motion data A may be read out to cause the player character PC to perform the motion of the scissors feint. When it is determined that the direction of the acceleration in the Y-axis direction (or the Z-axis direction) is inverted within the predetermined time period, the motion data B may be read out to cause the player character PC to perform the motion of moving its body right and left. Alternatively, instead of using prestored motion data, motion data for each part of the player character may be generated by physical calculation.

The above subunit movement processing is executed as exemplified below. In a first example, when the magnitude of the acceleration (the absolute value) in the X-axis direction which is indicated by the latest sub acceleration data is equal to or smaller than a predetermined value (e.g. gravitational acceleration (1.0 G)), at the step 48, the posture vector is controlled by using the acceleration in the X-axis direction which is indicated by the latest sub acceleration data. In a second example, when the magnitude of the acceleration (the absolute value) in the X-axis direction which is indicated by the latest sub acceleration data is equal to or smaller than the predetermined value, at the step 48, movement control is performed so that the player character PC substantially moves or shakes its upper body or its whole body (so as to express a feint).

In addition, the first example of the subunit movement processing may be performed as exemplified below. In a third example, when the magnitude (the absolute value) of the acceleration in the X-axis direction which is indicated by the latest sub acceleration data is equal to or smaller than the predetermined value and the direction of the acceleration in the X-axis direction which is indicated by the history of the sub acceleration data is inverted n times (n is an integer number equal to or greater than one) within the last predetermined time period by a magnitude equal to or larger than the acceleration A1, a vector having the Xp-axis direction and a predetermined magnitude is added to the movement vector Vmpc of the player character PC to produce a new movement vector Vmpc. In a fourth example, when the magnitude (the absolute value) of the acceleration in the X-axis direction which is indicated by the latest sub acceleration data is equal to or smaller than a predetermined value A2 and it is a case other than the third example, at the step 48, the posture vector is controlled by using the acceleration in the X-axis direction which is indicated by the latest sub acceleration data. In the case of the first or fourth example, the movement control may not be performed so that "the player character of the opponent team which is located in the predetermined area of the player character PC" is influenced by a feint of the player character PC as described at the steps 14 and 25.

As described above, in the subunit movement processing at the step 15, the posture of the player character PC is controlled in accordance with the acceleration data which is outputted from the acceleration sensor 761 provided in the subunit 76 while the movement direction of the player character PC (additionally, the movement velocity) is controlled by means of a direction instruction section (the stick 78a) provided in the subunit 76. In other words, the player can input movement direction control and posture control of the player character PC with one hand efficiently and intuitively.

Further, in the subunit movement processing, the movement direction of the player character PC is corrected in accordance with the acceleration data which is outputted from the acceleration sensor 761 provided in the subunit 76 while (additionally, the movement velocity) being controlled by means of the direction instruction section (the stick 78a) provided in the subunit 76. In other words, the player can input the movement direction control of the player character PC and its correction with one hand efficiently and intuitively. More specifically, this processing is performed as follows. The direction of the movement vector of the player character PC is determined in accordance with the inclination direction of the stick 78a. In other words, for example, when the direction instruction means is inclined upward, the player character PC moves in a Z-axis positive direction in a local coordinate system of the player character PC (the forward direction of the player character PC, or the direction of an advance direction vector of the player character PC). When the direction instruction means is inclined downward, the player character PC moves in a Z-axis negative direction in the local coordinate system of the player character PC. When the direction instruction means is inclined rightward, the player character PC moves in an X-axis positive direction in the local coordinate system. When the direction instruction means is inclined leftward, the player character PC moves in an X-axis negative direction in the local coordinate system. The magnitude of the movement vector may be a fixed value or may be determined in accordance with the inclination amount of the stick 78a. The movement direction of the player character PC can be corrected in accordance with the output of the acceleration sensor 761 as exemplified below.

In a first example of correcting the movement direction of the player character PC, an output vector of the acceleration sensor 761, in which X-axis, Y-axis, and Z-axis of the acceleration sensor 761 correspond to X-axis, Y-axis, and Z-axis of a predetermined coordinate system (an advance direction and two directions perpendicular to the advance direction), respectively, is converted into a direction vector in the virtual game space. The direction vector is added as a correction vector to the movement vector which is obtained in accordance with the inclination of the stick 78a. The magnitude of the correction vector may be a fixed value or may be determined in accordance with the magnitude of the output vector.

In a second example of correcting the movement direction of the player character PC, when an output value of the acceleration sensor 761 in a predetermined direction (e.g. the X-axis direction) is equal to or larger than a predetermined value, a correction vector having the corresponding direction (e.g. the X-axis direction) in a predetermined coordinate system is added to the movement vector which is obtained in accordance with the inclination of the stick 78a.

In a third example of correcting the movement direction of the player character PC, a correction vector having the corresponding direction (e.g. the X-axis direction) in a predetermined coordinate system and a magnitude in accordance with the output value in a predetermined direction (e.g. the X-axis direction) of the acceleration sensor 761 is added to the movement vector which is obtained in accordance with the inclination of the stick 78a.

It is noted that the second and third examples of correcting the movement direction of the player character PC are performed for a plurality of directions. In other words, for example, in the third example, a correction vector having the X-axis direction in the predetermined coordinate system and a magnitude in accordance with the output value in the X-axis direction of the acceleration sensor 761 may be added to the movement vector which is obtained in accordance with the inclination of the stick 78a, and further a correction vector having the Y-axis direction in the predetermined coordinate system and a magnitude in accordance with the output value of the acceleration sensor 761 in the Y-axis direction may be added thereto.

The predetermined coordinate system may be the local coordinate system of the player character PC, the coordinate system of the virtual game space (in this case, the direction vector is typically a virtual vertical direction or a virtual horizontal direction), a camera coordinate system, a coordinate system which is obtained by projecting the camera coordinate system on the virtual horizontal plane, or a coordinate system based on a movement direction which is determined by the direction instruction section (e.g. a direction in which the correction vector is perpendicular to the movement direction).

Further, in the subunit movement processing, the movement velocity of the player character PC is controlled while the movement direction of the player character PC is controlled by means of the direction instruction section provided in the subunit 76. In other words, the player can input the movement direction control and the movement velocity control of the player character PC with one hand efficiently and intuitively. In this case, this processing is performed as follows. The movement direction of the player character PC is determined in accordance with the inclination direction of the stick 78a. The movement velocity (the absolute value) of the player character PC can be determined in accordance with the output of the acceleration sensor 761 as exemplified below.

In a first example of determining the movement velocity of the player character PC, when the absolute value of the output vector of the acceleration sensor 761 is equal to or larger than a predetermined value, the movement velocity is caused to become a predetermined velocity. When the absolute value of the output vector of the acceleration sensor 761 is smaller than the predetermined value, the movement velocity is caused to become zero.

In a second example of determining the movement velocity of the player character PC, the movement velocity is caused to become a velocity in accordance with the absolute value of the output vector of the acceleration sensor 761 (the movement velocity is increased as the absolute value increases). At this time, when a predetermined component (e.g. a Z-axis direction component) of the output vector is positive, the player character PC may move in a movement direction in accordance with the inclination direction of the stick 78a. When the predetermined component of the output vector is negative, the player character PC may move in a direction opposite to the movement direction in accordance with the inclination direction of the stick 78a. Alternatively, only when the output component in the predetermined direction is positive, the movement velocity may be determined as described in the second example.

In a third example of determining the movement velocity of the player character PC, an output component of the acceleration sensor 761 in a predetermined direction (e.g. an output value in the Z-axis direction) is equal to or larger than a predetermined value, the movement velocity is caused to become a predetermined velocity. When the output component is smaller than the predetermined value, the movement velocity is caused to become zero.

In a fourth example of determining the movement velocity of the player character PC, the movement velocity is caused to become a velocity in accordance with the absolute value of an output component of the acceleration sensor 761 in a predetermined direction (e.g. an output value in the Z-axis direction).

It is noted that in the third and fourth examples of determining the movement velocity of the player character PC, the player character PC may move in a movement direction in accordance with the inclination angle of the stick 78a when the output component in the predetermined direction is positive, and the player character PC may move in a direction opposite to the movement direction when the output component in the predetermined direction is negative. Alternatively, only when the output component in the predetermined direction is positive, the movement velocity may be determined as described in the third and fourth examples.

In a fifth example of determining the movement velocity of the player character PC, when an output component of the acceleration sensor 761 in a direction which corresponds to the inclination direction of the stick 78a (an output value in the Z-axis direction when the inclination direction of the stick 78a is the upward direction) is equal to or larger than a predetermined value, the movement velocity is caused to become a predetermined velocity. When the output component is smaller than the predetermined value, the movement velocity is caused to become zero.

In a sixth example of determining the movement velocity of the player character PC, the movement velocity is caused to become a velocity in accordance with the absolute value of an output component of the acceleration sensor 761 in a direction which corresponds to the inclination direction of the stick 78a (an output value in the Z-axis direction when the inclination direction of the stick 78a is the upward direction, an output value in the X-axis direction when the inclination direction of the stick 78a is the rightward direction, or the like).

It is noted that in the fifth and sixth examples of determining the movement velocity of the player character PC, the player character PC may move in a movement direction in accordance with the inclination direction of the stick 78a when the output component in the corresponding direction is positive, and the player character PC may move in a direction opposite to the movement direction when the output component in the corresponding direction is negative.

Further, in the subunit movement processing, the correction of the movement velocity is controlled while the movement direction and the movement velocity of the player character PC are controlled by means of the direction instruction section (the stick 78a) provided in the subunit 76. In other words, the player can input the movement direction control of the player character PC and the correction control of the movement velocity with one hand efficiently and intuitively. In this case, the processing is performed as follows. The movement direction of the player character PC is determined in accordance with the inclination direction of the stick 78a, and the movement velocity of the player character PC is determined in accordance with the inclination amount of the stick 78a. The movement velocity of the player character PC can be corrected in accordance with the output of the acceleration sensor 761 as exemplified below.

In a first example of correcting the movement velocity of the player character PC, when the absolute value of the output vector of the acceleration sensor 761 is equal to or larger than a predetermined value, a movement velocity in accordance with the inclination amount of the stick 78a is used as the movement velocity of the player character PC. When the absolute value of the output vector of the acceleration sensor 761 is smaller than the predetermined value, the movement velocity of the player character PC is corrected to zero.

In a second example of correcting the movement velocity of the player character PC, when the absolute value of the output vector of the acceleration sensor 761 is equal to or smaller than a predetermined value, a movement velocity in accordance with the inclination amount of the stick 78a is used as the movement velocity of the player character PC. When the absolute value of the output vector of the acceleration sensor 761 is larger than the predetermined value, the movement velocity of the player character PC is increased (a predetermined value is added thereto, it is multiplied by n (n>1), or the like).

In a third example of correcting the movement velocity of the player character PC, in accordance with the absolute value of the output vector of the acceleration sensor 761, a movement velocity in accordance with the inclination amount of the stick 78a is added to the movement velocity of the player character PC (so that the increase amount increases with an increase in the absolute value).

It is noted that in the second and third examples of correcting the movement velocity of the player character PC, the player character PC may move in a movement direction in accordance with the inclination direction of the stick 78a when the predetermined component of the output vector (e.g. a Z-axis direction component) is positive, and the player character PC may move in a direction opposite to the movement direction in accordance with the inclination angle of the stick 78a when the predetermined component of the output vector is negative. Alternatively, only when the output component in the predetermined direction is positive, the movement velocity may be corrected as described in the second and third examples.

In a fourth example of correcting the movement velocity of the player character PC, when an output component of the acceleration sensor 761 in a predetermined direction (e.g. an output value in the Z-axis direction) is equal to or larger than a predetermined value, a movement velocity in accordance with the inclination angle of the stick 78a is used as the movement velocity of the player character PC. When the output component in the predetermined direction is smaller than the predetermined value, the movement velocity of the player character PC is corrected to zero.

In a fifth example of correcting the movement velocity of the player character PC, an output component of the acceleration sensor 761 in a predetermined direction (e.g. an output value in the Z-axis direction) is equal to or smaller than a predetermined value, a movement velocity in accordance with the inclination angle of stick 78a is used as the movement velocity of the player character PC. When the output component in the predetermined direction is larger than the predetermined value, the movement velocity of the player character PC is increased. It is noted that only when the output component in the predetermined direction is positive, the movement velocity may be corrected as described in the fifth example. When the output component in the predetermined direction is negative, the movement velocity of the player character PC may be decreased by using a movement velocity in accordance with the inclination amount of the stick 78a.

In a sixth example of correcting the movement velocity of the player character PC, in accordance with the magnitude of an output component of the acceleration sensor 761 in a predetermined direction (e.g. an output value in the Z-axis direction), the movement velocity of the player character PC is increased by using a movement velocity in accordance with the inclination amount of the stick 78a (so that the increase amount increases with an increase in the absolute value). It is noted that only when the output component in the predetermined direction is positive, the movement velocity may be corrected as described in the sixth example. When the output component in the predetermined direction is negative, the movement velocity of the player character PC may be decreased by using a movement velocity in accordance with the inclination amount of the stick 78a.

In a seventh example of correcting the movement velocity of the player character PC, when an output component of the acceleration sensor 761 in a direction which corresponds to the inclination direction of the stick 78a (e.g. an output value in the Z-axis positive direction when the inclination direction of the stick 78a is the upward direction, an output value in the X-axis positive direction when the inclination direction of the stick 78a is the rightward direction, or the like) is equal to or larger than a predetermined value, a movement velocity in accordance with the inclination amount of the stick 78a is used as the movement velocity of the player character PC. When the output component is smaller than the predetermined value, the movement velocity of the player character PC is corrected to zero.

In an eighth example of correcting the movement velocity of the player character PC, when an output component of the acceleration sensor 761 in a direction which corresponds to the inclination direction of the stick 78a is equal to or smaller than a predetermined value, a movement velocity in accordance with the inclination amount of the stick 78a is used as the movement velocity of the player character PC. When the output component is larger than the predetermined value, the movement velocity of the player character PC is increased.

In a ninth example of correcting the movement velocity of the player character PC, in accordance with the magnitude of an output component of the acceleration sensor 761 in a direction which corresponds to the inclination direction of the stick 78a, the movement velocity of the player character PC is increased by using a movement velocity in accordance with the inclination amount of the stick 78a (so that the increase amount increases with an increase in the absolute value).

It is noted that in the eighth and ninth examples of correcting the movement velocity of the player character PC, only when the output component in the predetermined direction is positive, the movement velocity may be corrected as described in the eighth and ninth examples. Alternatively, the player character PC may move in a movement direction in accordance with the inclination direction of the stick 78a when the output value in the corresponding direction is positive, and the player character PC may move in a direction opposite to the movement direction when the output value in the corresponding direction is negative (when there is an output in a direction opposite to the corresponding direction).

Further, in the subunit movement processing, a motion of the player character PC is controlled (e.g. the above feint motion) while the movement direction of the player character PC (additionally, the movement velocity) is controlled by means of the direction instruction section (the stick 78a) provided in the subunit 76. In other words, the player can input the movement direction control and the motion control of the player character PC with one hand efficiently and intuitively. This is achieved by controlling the player character PC so as to perform a predetermined motion when the output of the acceleration sensor 761 satisfies a predetermined condition. Further, in the case of performing concurrently at least one of the above examples of the subunit movement processing and processing for controlling the player character PC so as to perform a predetermined motion when the output of the acceleration sensor 761 satisfies a predetermined condition, at least the one of the above examples of the subunit movement processing may be performed when an output value of the acceleration sensor 761 is equal to or smaller than a predetermined value, and the processing for controlling the player character PC so as to perform the predetermined motion may be performed when the output value of the acceleration sensor 761 is larger than the predetermined value.

With reference to FIG. 20, the following will describe in detail the operation of the pass processing at the step 16.

As shown in FIG. 20, the CPU 30 refers to the latest core key data, which is included in the operation information transmitted from the core unit for the player mode of the team X, from the operation information Da (a step 81). Next, based on the core key data which is referred to at the step 81, the CPU 30 determines whether or not the player presses only the operation section 72d (the A button) of the core unit 70 (a step 82). When the player presses only the A button, the CPU 30 advances the processing to the next step 83. On the other hand, when the player does not press the A button or concurrently presses the A button and another button (e.g. the B button), the CPU 30 terminates the processing of this subroutine, and advances the processing to the step 17.

At the step 83, the CPU 30 refers to the latest first coordinate data Da1 and second coordinate data Da2, which are included in the operation information transmitted from the core unit for the player mode of the team X, from the operation information Da (the step 83). Next, the CPU 30 calculates pointed coordinates which correspond to the first coordinate data Da1 and the second coordinate data Da2 which are referred to at the step 83, and a position which corresponds to the pointed coordinates, and updates the pointed coordinate data De and the virtual space position coordinate data Df which correspond to the core unit for the player mode of the team X (a step 84). The CPU 30 advances the processing to the next step. The following will describe an example of calculating the pointed coordinates and the virtual space position by using the coordinate data.

The CPU 30 calculates direction data from the first coordinate data Da1 to the second coordinate data Da2. More specifically, the CPU 30 refers to the first coordinate data Da1 and the second coordinate data Da2, and calculates a vector having a starting point which is the position of the first coordinate data Da1, and an end point which is the position of the second coordinate data Da2. The CPU 30 stores data of the calculated vector as the direction data in the main memory 33. By using a difference between the direction data and a predetermined reference direction, rotation of the core unit 70 about a direction perpendicular to the imaging area of the core unit 70 can be calculated.

The CPU 30 calculates midpoint data indicating the midpoint between the first coordinate data Da1 and the second coordinate data Da2. More specifically, the CPU 30 refers to the first coordinate data Da1 and the second coordinate data Da2, and calculates coordinates of the midpoint. The CPU 30 stores data of the calculated coordinates of the midpoint in the main memory 33. The midpoint data indicates the position of the target image (the markers 8L and 8R) in the taken image. By using a difference between the midpoint data and a predetermined reference position, a change in the image position caused by a change in the position of the core unit 70 can be calculated.

Here, a positional relation between the markers 8L and 8R, the display screen of the monitor 2, and the core unit 70 will be considered. For example, it is assumed that the two markers 8L and 8R are provided on the top surface of the monitor 2 (see FIG. 1), and the player points the core unit 70 at the center of the display screen of the monitor 2 with the top surface thereof facing in the upward direction (an image of the center of the display screen is taken at the center of an taken image of the imaging information calculation section 74). At this time, in the taken image of the imaging information calculation section 74, the midpoint of the target image (the midpoint between the markers 8L and 8R) does not coincide with to the pointed position (the center of the display screen). More specifically, the position of the target image in the taken image is located above the center of the taken image. A reference position is set so that when the target image is located in such a position, the center of the display screen is assumed to be pointed at. Meanwhile, the position of the target image in the taken image moves in accordance with the movement of the core unit 70 (their movement directions are opposite to each other). Thus, by performing processing of moving the pointed position on the display screen in accordance with the movement of the position of the target image in the taken image, the display screen reference position of the at which the core unit 70 is pointed (position coordinates in the screen coordinate system) can be calculated. Here, concerning the setting of the reference position, the player may in advance point at a predetermined position on the display screen, and the position of the target image at this time is stored so as to be associated with the predetermined position. When the positional relation between the target image and the display screen is fixed, the reference position may be set in advance. When the markers 8L and 8R are provided independently of the monitor 2 and disposed near the monitor 2 (above or below the monitor 2, or the like), the player may be caused to input the position of the markers 8L and 8R with respect to the monitor prior to the start of the game (e.g. the player may be caused to select from choices such as disposing the markers 8L and 8R above or below the monitor 2, and the like). Or, reference position data for the case where the markers 8L and 8R are disposed above the monitor 2 and reference position data for the case where the markers 8L and 8R are disposed below the monitor 2 may be stored in the optical disc 4, a built-in involatile memory of the game apparatus 3, or the like, and may be selected in use. Such position coordinates in the screen coordinate system are calculated by linear transformation using a function of calculating the display screen reference coordinates (pointed coordinates) of the monitor 2 from the midpoint data. This function converts the values of the midpoint coordinates which are calculated from a taken image into coordinates indicating a position on the display screen (position coordinates in the screen coordinate system), at which the core unit 70 is pointed when the image is taken. By using this function, pointed coordinates where the display screen is a reference can be calculated from the midpoint coordinates.

However, when the player points the core unit 70 at the center of the display screen of the monitor 2 with the top surface thereof facing in a direction (e.g. a rightward direction) other than the upward direction, the position of the target image in the taken image is shifted from the center of the taken image in a direction (e.g. a leftward direction) other than the upward direction. In other words, due to the inclination of the core unit 70, the movement direction of the core unit 70 does not correspond to the movement direction of the pointed display screen reference position. Here, the midpoint data is corrected based on the direction data. Specifically, the midpoint data is corrected to midpoint coordinates when it is assumed that the top surface of the core unit 70 faces in the upward direction. More specifically, when the reference position is set, a reference for the direction data is also set. The midpoint data is corrected so that coordinates indicated by the midpoint data are rotated and shifted about the center of the taken image by an amount corresponding to an angle difference between the direction data and the reference direction. Then, the corrected midpoint data is used to calculate the pointed coordinates as described above.

When the calculated pointed coordinates in the screen coordinate system are converted into virtual space coordinates indicating a position in the virtual game space (a virtual space position), the position indicated by the pointed coordinates may be further converted into a position in the virtual game space which corresponds to the position in the screen coordinate system. The position in the virtual game space which corresponds to the position in the screen coordinate system is a position in the virtual game space which is displayed on the display screen of the monitor 2 (e.g. a position at which perspective projection is performed), a position indicated by three-dimensional coordinate values in the virtual game space which are designated directly from position coordinates in the screen coordinate system, or the like.

An essential principle for processing of calculating the pointed coordinates is to calculate a displacement amount of pointed two-dimensional coordinates from a predetermined reference position based on a change in the position of the target image by a movement of the core unit 70, and to set coordinates. Thus, the position coordinates in the screen coordinate system can be widely used for an input of other two-dimensional coordinates. For example, the position coordinates in the screen coordinate system can be used directly as values of an x-coordinate and a y-coordinate in a world coordinate system. In this case, independently of the display screen of the monitor 2, calculation processing may be performed so as to cause movement of the target image to correspond to movement of the x-coordinate and the y-coordinate in the world coordinate system from the reference position. In the case where a two-dimensional game image is displayed on the monitor 2, the position coordinates in the screen coordinate system can be used directly as values of an x-coordinate and a y-coordinate in a two-dimensional game coordinate system.

After the processing at the step 84, the CPU 30 determines whether or not the virtual space position in the virtual game space which corresponds to the calculated pointed coordinates is on a virtual field (a step 85). For example, the virtual field is a virtual plane indicating a ground in a game space, which includes a virtual soccer field. When the virtual space position is on the virtual field, the CPU 30 advances the processing to the next step 90. On the other hand, when the virtual space position is not on the virtual field, the CPU 30 determines whether or not the pointed coordinates in the screen coordinate system are shifted upward or downward from the display area of the monitor 2 (a step 86) and whether or not the pointed coordinates in the screen coordinate system is shifted leftward or rightward from the display area of the monitor 2 (a step 87). When the pointed coordinates are shifted upward or downward from the display area of the monitor 2 (Yes at the step 86), the CPU 30 advances the processing to the next step 88. When the pointed coordinates are shifted leftward or rightward from the display area of the monitor 2 (Yes at the step 87), the CPU 30 advances the processing to the next step 89. On the other hand, when the pointed coordinates are shifted in a direction other than upward, downward, leftward and rightward from the display area of the monitor 2, or when the pointed coordinates are invalid (e.g. cannot be calculated) (No at the steps 86 and 87), the CPU 30 advances the processing to the next step 95.

At the step 88, the CPU 30 sets a ball movement vector, which indicates a movement direction and a movement velocity of the ball object B, so as to have a predetermined magnitude and a direction parallel to the goal line of the soccer field which is set in the virtual game space, updates the movement vector data Dc, and advances the processing to the next step 95. It is noted that the direction of the ball movement vector which is set at the step 88 may be set to be a direction in which a view line direction vector of the virtual camera is projected on the virtual horizontal plane of the virtual game space.

At the step 89, the CPU 30 sets the ball movement vector, which indicates the movement direction and the movement velocity of the ball object B, so as to have a predetermined magnitude and a direction parallel to the touchline of the soccer field which is set in the virtual game space, updates the movement vector data Dc, and advances the processing to the next step 95. It is noted that the direction of the ball movement vector which is set at the step 89 may be set to be a horizontal direction perpendicular to the direction in which the view line direction vector of the virtual camera is projected on the virtual horizontal plane of the virtual game space.

At the step 90, the CPU 30 determines whether or not a player character of the team X is located within a region A having a center at the virtual space position which is calculated at the step 84 (typically, the region is a circular region having a center at the virtual space position with a predetermined radius R1 but may not be circular). When the determination is Yes, the CPU 30 selects the player character (selects the player character nearest to the virtual space position when there are a plurality of the player characters within the region A). When no player character of the team X is located within the region A, the CPU 30 determines whether or not a player character of the team X is located within a region B having a center at the virtual space position which is calculated at the step 84 (typically, the region is a circular region having a center at the virtual space position with a predetermined radius R2 (>R1) but may not be circular). When the determination is Yes, the CPU 30 selects the player character (a step 92) (selects the player character nearest to the virtual space position or all or some of the player characters when there are a plurality of the player characters within the region B). When the player character of the team X is located within the region A (Yes at the step 90), the CPU 30 advances the processing to the next step 91. When the player character of the team X is located within the region B (Yes at the step 92), the CPU 30 advances the processing to the next step 93. Further, when no player character of the team X is located within either the region A or the region B (No at the steps 90 and 92), the CPU 30 advances the processing to the next step 94. For example, as shown in FIG. 27, the region A and the region B are each formed of a circular region having a center at a virtual space position TP, and the region B is larger in size than the region A. The CPU 30 refers to the latest position data Dh, and determines the player character located within the region A and the region B based on the position of each player character in the virtual game space.

At the step 91, the CPU 30 sets the ball movement vector in accordance with the player character which is selected at the step 90, and updates the movement vector data Dc. For example, the CPU 30 sets the direction of the ball movement vector to be a direction which is directed from the current position of the ball object B to the position of the player character. In addition, the CPU 30 may set the magnitude of the ball movement vector to be a magnitude in accordance with a virtual distance from the current position of the ball object B to the position of the player character. Then, the CPU 30 advances the processing to the next step 95.

At the step 93, the CPU 30 sets, in accordance with the virtual space position TP, the movement vector of the player character which is selected at the step 92, and updates the movement vector data Dc. For example, the CPU 30 sets the direction of the movement vector of the player character to be a direction which is directed from the current position of the player character, which is selected at the step 92, to the virtual space position TP. In addition, the CPU 30 may set the magnitude of the movement vector of the player character to be a magnitude in accordance with a virtual distance from the current position of the selected player character to the virtual space position TP. Then, the CPU 30 advances the processing to the next step 94.

At the step 94, the CPU 30 sets the ball movement vector in accordance with the virtual space position TP, and updates the movement vector data Dc. For example, the CPU 30 sets the direction of the ball movement vector to be a direction which is directed from the current position of the ball object B to the virtual space position TP. In addition, the CPU 30 may set the magnitude of the ball movement vector to be a magnitude in accordance with a virtual distance from the current position of the ball object B to the virtual space position TP. Then, the CPU 30 advances the processing to the next step 95.

Through the processing at the steps 90 to 94 which are performed when the player presses the A button as described above, the movement direction of the ball object B (additionally, the movement velocity) is determined, thereby setting a direction in which the ball is to be passed. As being clear from the above description, when there is no player character of the player's team near the virtual space position TP at which the core unit 70 is pointed, a target point to which the ball object B is to be passed becomes the virtual space position TP. When there is a player character of the player's team within the region A or near the virtual space position TP at which the core unit 70 is pointed, the target point to which the ball object B is to be passed becomes the player character of the player's team within the region A. Further, when there is a player character of the player's team within the region B or at a little distance from the virtual space position TP at which the core unit 70 is pointed, the target point to which the ball object B is to be passed becomes the virtual space position TP, and the player character of the player's team within the region B moves to the virtual space position TP.

At the step 95, the CPU 30 refers to the latest sub acceleration data, which is included in the operation information transmitted from the subunit for the player mode of the team X, from the operation information Da. The CPU 30 determines whether or not the acceleration in the Z-axis direction which is indicated by the sub acceleration data is negative (namely, detects the acceleration in the Z-axis negative direction) (a step 96). When the acceleration in the Z-axis direction is negative, the CPU 30 adds a vector having the vertically upward direction to the ball movement vector (a step 97). It is noted that the added vector may have a magnitude in accordance with the magnitude (the absolute value) of the acceleration in the Z-axis direction. Then, the CPU 30 terminates the processing of this subroutine, and advances the processing to the step 17. Through the processing at the step 97, a path along which the ball object B is to be passed by the player character PC becomes a path along which the ball object B is kicked high so as to move by the player operating the subunit 76 so that the front thereof rises (namely, acceleration is generated in the Z-axis negative direction). On the other hand, when the acceleration in the Z-axis direction is not negative, the CPU 30 terminates the processing of this subroutine, and advances the processing to the step 17.

As described above, in the pass processing at the step 16, an operation for moving the ball object B from the position of the player character PC keeping the ball object B is performed by the player pressing only the A button. The movement direction of the ball object B (additionally, the movement velocity) is controlled by the coordinate data (the first coordinate data Da1 and the second coordinate data Da2) obtained from the core unit 70 while the movement direction of the player character PC (additionally, the movement velocity) is controlled by means of the direction instruction section (the stick 78a) provided in the subunit 76. Therefore, the player can operate different characters (objects) by operating the two units. In other words, the player can efficiently, intuitively, and individually input movement direction control of a first character (the player character PC) and movement direction control of a second character (the ball object B) which moves from the position of the first character (to be exact, the position of the second character which is determined with the determination of the position of the first character). Since an operation for moving the player character PC and an operation for determining a pass direction are independent from each other (further, the housing 77 for performing the operation for moving and the housing 71 for performing the operation for determining the pass direction are independent from each other), a realistic soccer game can be realized with a high degree of freedom.

Concerning the movement control of the second character (the ball object B), a second direction vector which is determined in accordance with the output of the acceleration sensor 761 of the subunit 76 is added to a first direction vector which is determined by the pointed coordinates by the core unit 70, thereby calculating a movement direction vector of the second character. More specifically, the movement direction vector of the second character can be calculated as exemplified below.

In a first example of calculating the movement direction vector of the second character, an output vector of the acceleration sensor 761, in which X-axis, Y-axis, and Z-axis of the acceleration sensor 761 correspond to X-axis, Y-axis, and Z-axis of a predetermined coordinate system (an advance direction and two directions perpendicular to the advance direction), respectively, is converted into a direction vector in the virtual game space. The direction vector is added as the second direction vector to the first direction vector. The magnitude of the second direction vector may be fixed or may be determined in accordance with the magnitude of the output vector.

In a second example of calculating the movement direction vector of the second character, when an output value of the acceleration sensor 761 in a predetermined direction (e.g. the X-axis direction) is equal to or larger than a predetermined value, the second direction vector having the corresponding direction in the predetermined coordinate system (e.g. the X-axis direction) is added to the first direction vector.

In a third example of calculating the movement direction vector of the second character, the second direction vector having the corresponding direction in the predetermined coordinate system (e.g. the X-axis direction) and a magnitude in accordance with an output value of the acceleration sensor 761 in a predetermined direction (e.g. the X-axis direction) is added to the first direction vector.

It is noted that the second and third examples of calculating the movement direction vector of the second character may be performed for a plurality of directions. In other words, for example, in the third example, the second direction vector having the X-axis direction in the predetermined coordinate system and a magnitude in accordance with the output value of the acceleration sensor 761 in the X-axis direction may be added to the first direction vector, and further the second direction vector having the Y-axis direction in the predetermined coordinate system and a magnitude in accordance with the output value of the acceleration sensor 761 in the Y-axis direction may be added to the first direction vector.

It is noted that the predetermined coordinate system may be the local coordinate system of the player character PC, the coordinate system of the virtual game space (in this case, the second direction vector is typically a virtual vertical direction or a virtual horizontal direction), the camera coordinate system, the coordinate system which is obtained by projecting the camera coordinate system on the virtual horizontal plane, or the coordinate system based on the movement direction which is determined by means of the direction instruction section (e.g. a direction in which the second direction vector is perpendicular to the movement direction).

Thus, while the movement direction of the character is controlled by the pointed coordinates by the core unit 70, an operation for correcting its direction can be realized by inclining or moving the subunit.

With reference to FIG. 21, the following will describe in detail an operation of the first shot processing at the step 17.

As shown in FIG. 21, the CPU 30 refers to the latest core key data, which is included in the operation information transmitted from the core unit for the player mode of the team X, from the operation information Da (a step 101). Next, based on the core key data which is referred to at the step 101, the CPU 30 determines whether or not the player concurrently presses the operation section 72d (the A button) and the operation section 72i (the B button) of the core unit 70 (a step 102). When the player concurrently presses the A and B buttons, the CPU 30 advances the processing to the next step 103. On the other hand, when the player does not concurrently presses the A and B buttons, the CPU 30 terminates the processing of this subroutine, and advances the processing to the step 18.

At the step 103, the CPU 30 refers to the latest core acceleration data, which is included in the operation information transmitted from the core unit for the player mode of the team X, from the operation information Da. Then, the CPU 30 calculates the ball movement vector in accordance with the core acceleration data, updates the movement vector data Dc (a step 104), and advances the processing to the next step. For example, the CPU 30 calculates the ball movement vector having the forward direction of the player character PC keeping the ball object B (e.g. the movement direction, namely, the direction of the movement direction vector of the player character PC) and a magnitude in accordance with the magnitude of the acceleration in the Z-axis direction, which is included in the referred core acceleration data.

Thus, the movement velocity of the ball object B is determined in accordance with the acceleration data which is outputted from the acceleration sensor 701 provided in the core unit 70 while the movement direction of the ball object B is controlled by means of the direction instruction section (the stick 78a) provided in the subunit 76. In other words, the player can efficiently, and intuitively, and individually input the movement direction control and movement velocity control of the ball object B. Further, while the movement velocity of the ball object B is controlled in accordance with the inclination amount of the direction instruction section (the stick 78a) provided in the subunit 76, the movement velocity of the ball object B may be corrected in accordance with the acceleration data (or a component of the acceleration data in a predetermined axis direction) which is outputted from the acceleration sensor 701 provided in the core unit 70 (e.g. when there is acceleration in the Z-axis direction, a predetermined value may be added the movement velocity, the movement velocity may be multiplied by n (n>1), or a multiple number may be determined in accordance with the magnitude of the acceleration in the Z-axis direction). In other words, the player can efficiently, intuitively, and individually input the movement direction control and the movement velocity control (or movement velocity correction control) of the ball object B.

Next, the CPU 30 refers to the latest sub acceleration data, which is included in the operation information transmitted from the subunit for the player mode of the team X, from the operation information Da (a step 105). Then, the CPU 30 determines whether or not the acceleration in the Z-axis direction which is indicated by the sub acceleration data is negative (namely, detects the acceleration in the Z-axis negative direction) (a step 106). When the acceleration in the Z-axis direction is negative, the CPU 30 adds a vector having the vertically upward direction in the virtual game space to the ball movement vector, updates the movement vector data Dc (a step 107), and advances the processing to the next step 108. It is noted that the added vector having the vertically upward direction may have a magnitude in accordance with the magnitude of the acceleration in the Z-axis direction. On the other hand, when the acceleration in the Z-axis direction is not negative, the CPU 30 advances the processing to the step 108.

At the step 108, the CPU 30 changes the ball movement vector in accordance with the acceleration data in the X-axis direction which is indicated by the sub acceleration data which is referred to at the step 105, and advances the processing to the next step. For example, the CPU 30 adds to the current ball movement vector a vector having a direction parallel to the virtual horizontal plane and perpendicular to the ball movement vector (the direction is determined by a positive or negative sign of the acceleration data in the X-axis direction) and a magnitude in accordance with the magnitude of the acceleration in the X-axis direction, and update the movement vector data Dc.

Thus, the movement direction of the ball object B is corrected in accordance with the acceleration data which is outputted from the acceleration sensor 761 provided in the subunit 76 while being controlled by means of the direction instruction section (the stick 78a) provided in the subunit 76. In other words, the player can input the movement direction control and movement direction correction control of the ball object B with one hand efficiently and intuitively. The direction of the correction vector may be a fixed direction in the virtual game space (the virtual vertical direction, a virtual horizontal direction, or the like), a direction based on the view line direction of the virtual camera (the view line direction, a direction perpendicular to the view line direction, or the like), a direction based on the movement direction which is determined by the direction instruction section (a direction perpendicular to the movement direction, or the like), a predetermined axis direction in the local coordinate system of the player character PC, or a direction based on the movement direction which is determined by the direction instruction section (a direction perpendicular to the movement direction, or the like).

Next, the CPU 30 refers to a history of the core acceleration data, which is included in the operation information transmitted from the core unit for the player mode of the team X, from the operation information Da, and calculates an average of acceleration which is generated in each of X-axis, Y-axis, and Z-axis directions for a last predetermined time period (a step 109). Then, the CPU 30 determines whether or not the magnitude of the acceleration average in the Z-axis direction which is calculated at the step 109 is equal to or larger than a predetermined value (a step 110). When the magnitude of the acceleration average in the Z-axis direction is equal to or larger than the predetermined value, the CPU 30 advances the processing to a step 111. On the other hand, when the magnitude of the acceleration average in the Z-axis direction is smaller than the predetermined value, the CPU 30 advances the processing to a step 112.

At the step 111, the CPU 30 increases the magnitude of the ball movement vector. For example, the CPU 30 may add a predetermined value to the magnitude of the ball movement vector, may multiply the magnitude of the ball movement vector by n (n>1), or may increases the magnitude of the ball movement vector in accordance with the magnitude of the acceleration average in the Z-axis direction which is calculated at the step 109.

At the step 112, the CPU 30 determines whether or not the magnitude of the acceleration average in the Y-axis direction which is calculated at the step 109 is equal to or larger than a predetermined value. As being clear from FIG. 5 and the like, when the core unit 70 is held horizontally, since the gravitational acceleration is constantly applied in the Y-axis negative direction, a predetermined value which takes into account the gravitational acceleration is preferably set as a criterion at the step 112. When the magnitude of the acceleration average in the Y-axis direction is equal to or larger than the predetermined value, the CPU 30 advances the processing to a step 113. On the other hand, when the magnitude of the acceleration average in the Y-axis direction is smaller than the predetermined value, the CPU 30 advances the processing to a step 114.

At the step 113, the CPU 30 adds a vector having the vertically upward direction to the ball movement vector, updates the movement vector data Dc, and advances the processing to the next step 114. The magnitude of the vector having the vertically upward direction may be a fixed magnitude or may be a magnitude in accordance with the magnitude of the acceleration average in the Y-axis direction which is calculated at the step 109.

At the step 114, the CPU 30 determines whether or not the magnitude of the acceleration average in the X-axis direction which is calculated at the step 109 is equal to or larger than a predetermined value. When the magnitude of the acceleration average in the X-axis direction is equal to or larger than the predetermined value, the CPU 30 advances the processing to a step 115. On the other hand, when the magnitude of the acceleration average in the X-axis direction is smaller than the predetermined value, the CPU 30 terminates the processing of this subroutine, and advances the processing to the step 18.

At the step 115, the CPU 30 adds to the current ball movement vector a vector having a direction parallel to the virtual horizontal plane and perpendicular to the ball movement vector (the direction is determined by a positive or negative sign of the acceleration average in the X-axis direction), and updates the movement vector data Dc. Then, the CPU 30 terminates the processing of this subroutine, and advances the processing to the step 18. It is noted that the magnitude of the vector having the perpendicular direction may be a magnitude in accordance with the magnitude of the acceleration average in the X-axis direction which is calculated at the step 109.

Thus, when a predetermined operation button (it is the operation button of the core unit 70 in the above example, but may be the operation button of the subunit 76) is operated, a character (the ball object B) starts to move, and its movement direction is determined based on a direction instructed by the direction instruction section of the subunit 76. Further, the movement direction is corrected in accordance with the output of the acceleration sensor 701 of the core unit 70 prior to operation of the predetermined operation button (typically, the outputs of the acceleration sensor 701 for a last predetermined time period prior to operating the predetermined operation button are used). Thus, the player can efficiently, intuitively, and individually input the movement direction control and the movement direction correction control of the ball object B with hands, respectively. It is noted that the movement direction may be corrected in accordance with the output of the acceleration sensor 761 prior to operation of the predetermined operation button. Also, the direction of the correction vector may be a predetermined direction in the coordinate system of the virtual game space (typically, a Y-axis direction), a predetermined direction in the camera coordinate system, a predetermined direction in the local coordinate system, a predetermined direction in a coordinate system which is obtained by projecting the camera coordinate system on the virtual horizontal plane, or a direction based on the movement direction which is determined by the direction instruction section (a direction perpendicular to the movement direction, or the like). Thus, the player can efficiently and intuitively input the movement direction control and the movement direction correction control of the ball object B.

In the first shot processing at the step 17, an operation for the player character PC keeping the ball object B to take a shot is performed by the player concurrently pressing the A and B buttons. The initial velocity and the initial direction of the shot taken by the player character PC are determined by the facing direction of the player character PC, the magnitude of the acceleration which is indicated by the core acceleration data obtained from the core unit 70, and the magnitude of the acceleration which is indicated by the sub acceleration data obtained from the subunit 76. In other words, the initial path of the shot taken by the player character PC is not determined by a simple button operation but determined in accordance with the movement of the core unit 70 and the subunit 76 when the player performs a shot operation. Therefore, the player can take a shot with a high degree of freedom while moving the core unit 70 and the subunit 76, and thus a realistic soccer game can be realized.

With reference to FIG. 22, the following will describe in detail an operation of the second shot processing at the step 18.

As shown in FIG. 22, the CPU 30 refers to a history of the core key data, which is included in the operation information transmitted from the core unit for the player mode of the team X, from the operation information Da (a step 121). Then, based on the core key data which is referred to at the step 121, the CPU 30 determines whether or not it is within a predetermined time period after the player concurrently presses the operation section 72*d* (the A button) and the operation section 72*i* (the B button) of the core unit 70 (a step 122). When it is within the predetermined time period after the player concurrently presses the A and B buttons, the CPU 30 advances the processing to the next step 123. On the other hand, when it is not within the predetermined time period after the player concurrently presses the A and B buttons, the CPU 30 terminates the processing of this subroutine, and advances the processing to the step 19.

At the step 123, the CPU 30 refers to the latest core acceleration data, which is included in the operation information transmitted from the core unit for the player mode of the team X, from the operation information Da. Then, the CPU 30 determines whether or not the magnitude of the acceleration in the Z-axis direction which is indicated by the core acceleration data which is referred to at the step 123 is equal to or larger than a predetermined value (a step 124). When the magnitude of the acceleration in the Z-axis direction is equal to or larger than the predetermined value, the CPU 30 advances the processing to a step 125. On the other hand, when the magnitude of the acceleration in the Z-axis direction is smaller than the predetermined value, the CPU 30 advances the processing to a step 126.

At the step 125, the CPU 30 increases the magnitude of the ball movement vector. For example, the CPU 30 may add a predetermined value to the magnitude of the ball movement vector, may multiply the magnitude of the ball movement vector by n (n>1), or may increase the magnitude of the ball movement vector in accordance with the magnitude of the acceleration in the Z-axis direction which is indicated by the core acceleration data which is referred to at the step 123.

At the step 126, the CPU 30 determines whether or not the magnitude of the acceleration in the Y-axis direction which is indicated by the core acceleration data which is referred to at the step 123 is equal to or larger than a predetermined value. As being clear from FIG. 5 and the like, when the core unit 70 is held horizontally, since the gravitational acceleration is constantly applied in the Y-axis negative direction, a predetermined value which takes into account the gravitational acceleration is preferably set as a criterion at the step 126. When the magnitude of the acceleration average in the Y-axis direction is equal to or larger than the predetermined value, the CPU 30 advances the processing to a step 127. On the other hand, when the magnitude of the acceleration average in the Y-axis direction is smaller than the predetermined value, the CPU 30 advances the processing to a step 128.

At the step 127, the CPU 30 adds a vector having the vertically upward direction in the virtual game space to the ball movement vector, updates the movement vector data Dc, and the advances the processing to the next step 128. The magnitude of the vector having the vertically upward direction may be a fixed magnitude or may be a magnitude in accordance with the magnitude of the acceleration in the Y-axis direction which is indicated by the core acceleration data which is referred to at the step 123.

At the step 128, the CPU 30 determines whether or not the magnitude of the acceleration in the X-axis direction which is indicated by the core acceleration data which is referred to at the step 123 is equal to or larger than a predetermined value. When the magnitude of the acceleration in the X-axis direction is equal to or larger than the predetermined value, the CPU 30 advances the processing to a step 129. On the other hand, when the magnitude of the acceleration in the X-axis direction is smaller than the predetermined value, the CPU 30 terminates the processing of this subroutine, and advances the processing to the step 19.

At the step 129, the CPU 30 adds to the current ball movement vector a vector having a direction parallel to the virtual horizontal plane and perpendicular to the ball movement vector (the direction is determined by a positive or negative sign of the acceleration in the X-axis direction), and updates the movement vector data Dc. The magnitude of the vector having the perpendicular direction may be a fixed magnitude or may be a magnitude in accordance with the magnitude of the acceleration in the X-axis direction which is indicated by the core acceleration data which is referred to at the step 123. Then, the CPU 30 terminates the processing of this subroutine, and advances the processing to the step 19.

Thus, when a predetermined operation button (it is the operation button of the core unit 70 in the above example, but may be the operation button of the subunit 76) is operated, a character (the ball object B) starts to move, and its movement direction is determined based on a direction instructed by the direction instruction section of the subunit 76. Further, the movement direction is corrected in accordance with the output of the acceleration sensor 701 of the core unit 70 after the operation of the predetermined operation button (typically, the outputs of the acceleration sensor 701 for a predetermined time period immediately after the operation of the predetermined operation button are used). Thus, the player can efficiently, intuitively, and individually input the movement direction control and the movement direction correction control of the ball object B with hands, respectively. It is noted that the movement direction may be corrected in accordance with the output of the acceleration sensor 761 after the operation of the predetermined operation button. Also, the movement direction may be a predetermined direction in the coordinate system of the virtual game space (typically, a Y-axis direction), a predetermined direction in the camera coordinate system, a predetermined direction in the local coordinate system, a predetermined direction in a coordinate system which is obtained by projecting the camera coordinate system on the virtual horizontal plane, or a direction based on the movement direction which is determined by the direction instruction section (a direction perpendicular to the movement direction, or the like). Thus, the player can efficiently and intuitively input the movement direction control and the movement direction correction control of the ball object B.

Thus, in the second shot processing at the step 18, concerning a path of the ball after the player performs the shot operation by concurrently pressing the A and B buttons, a movement velocity, a movement direction, a movement distance, and the like of the ball are determined in accordance with the core acceleration data obtained from the core unit 70. For example, as shown in FIG. 28, a path a which is determined by a ball movement vector Vmb of the ball object B can be changed into a path b or a path c in accordance with the core acceleration data obtained from the core unit 70. In other words, while the movement of the player character PC is controlled by a direction input, a path after a shot is taken is determined not only by a simple button operation but also in accordance with the movement of the core unit 70 after the player performs the shot operation. Therefore, the player can intuitively change the shot path by moving the core unit 70 while controlling the movement direction of the player character PC, and thus a realistic soccer game can be realized.

With reference to FIG. 23, the following will describe in detail an operation of the temporary coach mode processing at the step 19.

As shown in FIG. 23, the CPU 30 refers to the latest core key data, which is included in the operation information transmitted from the core unit for the player mode of the team X, from the operation information Da (a step 131). Next, based on the core key data which is referred to at the step 13, the CPU 30 determines whether or not the player presses the upward portion of the operation section 72 (the cross key) of the core unit 70 (a step 132). When the player presses the upward portion of the cross key, the CPU 30 advances the processing to the next step 133. On the other hand, when the player does not press the upward portion of the cross key, the CPU 30 advances the processing to the next step 136.

At the step 133, the CPU 30 refers to the latest core acceleration data, which is included in the operation information transmitted from the core unit of the player mode of the team X, from the operation information Da. Then, the CPU 30 determines whether or not the magnitude of the acceleration in the X-axis direction which is indicated by the core acceleration data is equal to or larger than a predetermined value (a step 134). When the magnitude of the acceleration in the X-axis direction is equal to or larger than the predetermined value, the CPU 30 advances the processing to the next step 135. On the other hand, when the magnitude of the acceleration in the X-axis direction is smaller than the predetermined value, the CPU 30 advances the processing to the next step 136.

At the step 135, based on the magnitude of the acceleration in the X-axis direction which is indicated by the core acceleration data which is referred to at the step 133, the CPU 30 updates the movement vectors of all of the non-player characters NPC of the team X, updates the movement vector data Dc, and advances the processing to the next step 136. For example, as shown in FIG. 29, the CPU 30 adds to the movement vectors of all of the non-player characters NPC of the team X a correction vector having a direction parallel to the touchline of the soccer field which is set in the virtual game space, thereby calculating new movement vectors Vmnpc. The correction vector may have a fixed magnitude or may have a magnitude in accordance with the magnitude of the acceleration in the X-axis direction. It is noted that the direction of the correction vector may be determined in accordance with the direction of the acceleration which is indicated by the core acceleration data. In this case, the following examples are considered.

In a first example of determining the direction of the correction vector, an output vector of the core acceleration data is converted into a direction vector in the virtual game space so that the axes of the core acceleration data correspond to the three mutually-perpendicular directions of the virtual game space coordinate, respectively (typically, so that the axes of the core acceleration data correspond to the axes of the virtual space coordinate, respectively).

In a second example of determining the direction of the correction vector, the output vector of the core acceleration data is converted into a direction vector in the virtual game space so that each axis of the core acceleration data corresponds to each axis of the local coordinate system of a predetermined character (the player character PC, or the like).

In a third example of determining the direction of the correction vector, the output vector of the core acceleration data is converted into a direction vector in the virtual space so that each axis of the core acceleration data corresponds to each axis of the camera coordinate system (or axes which are obtained by projecting X-axis and Z-axis of the camera coordinate system on the virtual horizontal plane).

In a fourth example of determining the direction of the correction vector, the output vector of the core acceleration data is converted into a direction vector in the virtual game space so that the axes of the core acceleration data correspond to the movement direction vector (or the facing direction vector) of a predetermined character, and two directions perpendicular to the movement direction vector, respectively.

It is noted that in the processing at the step 135, the output of the sub acceleration data may be used instead of the core acceleration data.

In the processing at the step 135, the movement vector of the player character PC of the team X may be processed by the same vector addition, and updated. Alternatively, any one of the non-player characters NPC of the team X (e.g. a goalkeeper of the team X) may be excluded from objects to be processed by the vector addition. Although the vector having the direction parallel to the touchline and the magnitude in accordance with the magnitude of the acceleration in the X-axis direction is added in the above-described processing, this vector may be set as the movement vectors of all of the non-player characters NPC of the team X. Further, the direction of the added vector may be set to be a horizontal direction perpendicular to a direction in which the view line direction vector of the virtual camera is projected on the virtual horizontal plane in the virtual game space, or another direction based on the view line direction of the virtual camera. Since the direction of an acceleration vector detected by the acceleration sensor 701 at the beginning of movement of the core unit 70 in a direction is generally opposite to the direction of the movement, the acceleration vector detected at that time may be reversed in direction and used. The direction of an acceleration vector detected by the acceleration sensor 701 when its movement is stopped after the core unit 70 is moved in a direction is the same as the direction of the movement, and thus this detected acceleration vector may be used. In this respect, the same is true of the similar processing which is described in other portions of the present specification.

As described above, the movement direction of the player character PC is controlled by means of the stick 78a of the subunit 76, and the movement directions of a plurality of the non-player characters NPC (may include the player character PC) are controlled in accordance with the core acceleration data (or the sub acceleration data) obtained from the core unit 70. In other words, the player can control the movement directions of a plurality of characters by moving the core unit 70 (or the subunit 76) while controlling a specific character by means of the direction instruction means. Therefore, the player can intuitively control the movement directions of the plurality of characters while controlling the movement direction of the specific character by means of the direction instruction means.

At the step 136, based on the core key data which is referred to at the step 131, the CPU 30 determines whether or not the player presses the downward portion of the cross key of the core unit 70. When the player presses the downward portion of the cross key, the CPU 30 advances the processing to the next step 137. On the other hand, when the player does not press the downward portion of the cross key, the CPU 30 terminates the processing of this subroutine, and advances the processing to the next step 20.

At the step 137, the CPU 30 refers to the latest first coordinate data Da1 and the latest second coordinate data Da2, which are included in the operation information transmitted from the core unit for the player mode of the team X, from the operation information Da. Then, the CPU 30 calculates pointed coordinates which correspond to the first coordinate data Da1 and the second coordinate data Da2 which are referred to at the step 137, and a virtual space position which corresponds to the pointed coordinates, and updates the pointed coordinate data De and the virtual space position coordinate data Df which correspond to the core unit for the player mode of the team X (a step 138). The CPU 30 advances the processing to the next step. It is noted that a method of calculating the pointed coordinates and the virtual space position at the step 138 is the same as that the step 84, and thus the detailed description will be omitted.

Next, the CPU 30 refers to the instruction target player data Dg, and determines whether or not an instruction target player for the controller 7 for the player mode of the team X is set (a step 139). When the instruction target player has not been set, the CPU 30 advances the processing to the next step 141. On the other hand, when the instruction target player is set, the CPU 30 advances the processing to the next step 143.

At the step 141, the CPU 30 determines whether or not any of the player characters of the team X is located within a region A (see FIG. 27) having a center at the virtual space position which is calculated at the step 138. Next, when the player character of the team X is located within the region A, the CPU 30 sets the player character to be the instruction target player for the controller 7 for the player mode of the team X, and describes its character identification number and the like in the instruction target player data Dg (a step 142). It is noted that when there are a plurality of the player characters of the team X within the region A, the player character nearest to the virtual space position which is calculated at the step 138 is set to be the instruction target player. Then, the CPU 30 terminates the processing of this subroutine, and advances the processing to the next step 20. On the other hand, when no player character of the team X is located within the region A, the CPU 30 terminates the processing of this subroutine, and advances the processing to the next step 20.

At the step 143, the CPU 30 determines whether or not the calculated virtual space coordinate is within the soccer field which is set in the virtual game space. Next, when the virtual space coordinate is within the soccer field, the CPU 30 sets the movement vector of the instruction target player in accordance with the virtual space position, and updates the movement vector data Dc (a step 144). For example, the CPU 30 sets the direction of the movement vector of the instruction target player to be a direction which is directed from the current position of the instruction target player to the virtual space position TP (see FIG. 27). Further, the CPU 30 may set the magnitude of the movement vector of the instruction target player to be a magnitude in accordance with a virtual distance from the current position of the instruction target player to the virtual space position TP. Then, the CPU 30 clears the instruction target player for the controller for the player mode of the team X which is described in the instruction target player data Dg (a step 145), terminates the processing of this subroutine, and advances the processing to the next step 20. On the other hand, when the virtual space coordinate is out of the soccer field, the CPU 30 terminates the processing of this subroutine, and the advances the processing to the next step 20. It is noted that the instruction target player may not be cleared at the step 145. In this case, after the instruction target player is set, a movement instruction can be given with respect to the instruction target player a plurality of times (in this case, this clearing processing may be performed in accordance with a button operation, a coordinate instruction into a predetermined region, or the like).

With reference to FIG. 24, the following will describe in detail an operation of the coach mode processing at the step 20.

As shown in FIG. 24, the CPU 30 refers to the controller identification number data Db, and determines whether or not an controller identification number for the coach mode of the team X is set (a step 151). When the controller identification number for the coach mode of the team X is set, the CPU 30 advances the processing to the next step 152. On the other hand, when the controller identification number for the coach mode of the team X has not been set, the CPU 30 terminates the processing of this subroutine, and advances the processing to the next step 21.

At the step 152, the CPU 30 refers to the latest core acceleration data, which is included in the operation information transmitted from the core unit for the coach mode of the team X, from the operation information Da. Next, the CPU 30 determines whether or not the magnitude of the acceleration in the X-axis direction which is indicated by the core acceleration data is equal to or larger than a predetermined value (a step 153). When the magnitude of the acceleration in the X-axis direction is equal to or larger than the predetermined value, the CPU 30 advances the processing to the next step 154. On the other hand, when the magnitude of the acceleration in the X-axis direction is smaller than the predetermined value, the CPU 30 advances the processing to the next step 155.

At the step 154, based on the magnitude of the acceleration in the X-axis direction which is indicated by the core acceleration data which is referred to at the step 152, the CPU 30 updates the movement vectors of all of the non-player characters NPC of the team X, updates the movement vector data Dc, and advances the processing to the next step 155. For example, as shown in FIG. 29, the CPU 30 adds to the movement vectors of all of the non-player characters NPC of the team X a correction vector having a direction parallel to the touchline of the soccer field which is set in the virtual game space, thereby calculating new movement vectors Vmnpc. The correction vector may have a fixed magnitude or may have a magnitude in accordance with the magnitude of the acceleration in the X-axis direction. It is noted that the direction of the correction vector may be determined in accordance with the direction of the acceleration which is indicated by the core acceleration data. More specifically, the direction of the correction vector may be determined similarly as in the above first to fourth examples of determining the direction of the correction vector.

It is noted that in the processing at the step 154, similarly as in the processing at the step 135, the movement vector of the player character PC of the team X may be processed by the same vector addition, and updated. Alternatively, any one of the non-player characters NPC of the team X (e.g. the goalkeeper of the team X) may be excluded from objects to be processed by the vector addition. Although the vector having the direction parallel to the touchline and the magnitude in accordance with the magnitude of the acceleration in the X-axis direction is added in the above-described processing, this vector may be set as the movement vectors of all of the non-player characters NPC of the team X. Further, the direction of the added vector may be set to be a horizontal direction perpendicular to a direction in which the view line direction vector of the virtual camera is projected on the virtual horizontal plane in the virtual game space, or another direction based on the view line direction of the virtual camera.

At the step 155, the CPU 30 refers to the latest first coordinate data Da1 and the latest second coordinate data Da2, which are included in the operation information transmitted from the core unit for the coach mode of the team X, from the operation information Da. Next, the CPU 30 calculates pointed coordinates which correspond to the first coordinate data Da1 and the second coordinate data Da2 which are referred to at the step 155, and a virtual space position which corresponds to the pointed coordinates, and updates the pointed coordinate data De and the virtual space position coordinate data Df which correspond to the core unit for the coach mode of the team X (a step 156). The CPU 30 advances the processing to the next step. It is noted that a method of calculating the pointed coordinates and the virtual space position at the step 156 is the same as that at the step 84, and thus the detailed description will be omitted.

Next, the CPU 30 refers to the instruction target player data Dg, and determines whether or not an instruction target player for the controller 7 for the coach mode of the team X is set (a step 157). When the instruction target player has not been set, the CPU 30 advances the processing to the next step 158. On the other hand, when the instruction target player is set, the CPU 30 advances the processing to the next step 160.

At the step 158, the CPU 30 determines whether or not any player character of the team X is located within a region A (see FIG. 27) having a center at the virtual space position which is calculated at the step 156. When the player character of the team X is located within the region A, the CPU 30 sets the player character to be the instruction target player for the controller for the coach mode of the team X, and describes its character identification number and the like in the instruction target player data Dg (a step 159). It is noted that when there are a plurality of the player characters of the team X within the region A, the player character nearest to the virtual space position which is calculated at the step 138 is set to be the instruction target player. Then, the CPU 30 terminates the processing of this subroutine, and advances the processing to the next step 21. On the other hand, when no player character of the team X is located within the region A, the CPU 30 terminates the processing of this subroutine, and advances the processing to the next step 21.

At the step 160, the CPU 30 determines whether or not the calculated virtual space coordinates are within the soccer field which is set in the virtual game space. When the virtual space coordinates are within the soccer field, the CPU 30 sets the movement vector of the instruction target player in accordance with the virtual space position, and updates the movement vector data Dc (a step 161). For example, the CPU 30 sets the direction of the movement vector of the instruction target player to be a direction which is directed from the current position of the instruction target player to the virtual space position TP (see FIG. 27). Further, the CPU 30 may set the magnitude of the movement vector of the instruction target player to be a magnitude in accordance with a virtual distance from the current position of the instruction target player to the virtual space position TP. Then, the CPU 30 clears the instruction target player for the controller for the coach mode of the team X which is described in the instruction target player data Dg (a step 162), terminates the processing of this subroutine, and advances the processing to the next step 21. On the other hand, when the virtual space coordinates are out of the soccer field, the CPU 30 terminates the processing of this subroutine, and advances the processing to the next step 21. It is noted that the instruction target player may not be cleared at the step 162. In this case, after the instruction target player is set, a movement instruction can be given with respect to the instruction target player a plurality of times (in this case, this clearing processing may be performed in accordance with a button operation, a coordinate instruction into a predetermined region, or the like).

As described above, in the coach mode processing at the step 20, comprehensive operation for the whole team can be possible by setting the controller 7 operated by the player to the coach mode. More specifically, the movement directions of a plurality of the non-player characters NPC (may include the player character PC) of the team are controlled in accordance with the core acceleration data (or the sub acceleration data) obtained from the core unit 70. In other words, the player can control the movement directions of a plurality of characters by moving the core unit 70 (or the subunit 76). Therefore, the player can intuitively control the movement directions of the plurality of characters in the coach mode.

As being clear from the processing of the flow charts described above, in the temporary coach mode processing at the step 19, steps for operating the cross key are different from those in the coach mode processing at the step 20 but the other processing are similar to those in the coach mode. More specifically, even if the controller 7 operated by the player is set to the player mode, the same operations as those in the above coach mode are possible by operating the upward or downward portion of the cross key.

In the processing at the step 22, each movement vector data described in the movement vector data Dc is decreased by a predetermined amount. However, when the non-player character NPC is desired to move until it reaches a predetermined point, the movement vector of the non-player character NPC may not be decreased. For example, when the instruction target player is desired to move to the virtual space position TP at which the core unit 70 is pointed, the magnitude and the direction of the movement vector of the instruction target player may be maintained until the instruction target player reaches the virtual space position TP.

In the above description, data of the image of a target which is taken by the image pickup element 743 of the core unit 70 is analyzed for remotely designating coordinates with respect to the display screen of the monitor 2. In this manner, two markers are provided near the display screen as targets whose images are to be taken, a device which includes imaging means and a housing capable of changing the imaging direction thereof detects the two markers in a taken image, and the coordinate position designated by the device is obtained based on the positions of the markers in the taken image. However, the coordinate designation may be performed in other manners.

For example, a target whose image is to be taken and which is provided near the display screen may be a member which reflects light or a physical marker having a specific color or a specific shape as well as the above electric markers (the LED module). Alternatively, a target whose image is to be taken may be displayed on the display screen of the monitor 2. Still, alternatively, the image object may be a raster scan type monitor having scan lines which are read by the imaging means of the core unit 70. Still, alternatively, a magnetic field generating apparatus may be provided, and magnetic field generated by the magnetic field generating apparatus may be used for remotely designating coordinates. In this case, the core unit 70 is provided with a magnetic sensor for detecting the magnetic field.

In the above description, the infrared lights from the two markers 8L and 8R are targets whose images are to be taken by the imaging information calculation section 74 of the core unit 70, but other elements may be targets whose images are to be taken. For example, one marker or three or more markers may be provided near the monitor 2, and infrared lights from these markers may be targets whose images are to be taken by the imaging information calculation section 74. For example, if a single marker having a predetermined length is provided near the monitor 2, the present invention can be similarly achieved. Alternatively, the display screen itself of the monitor 2 or another light emitter (an interior light) may be a target whose image is to be taken by the imaging information calculation section 74. If a position of the core unit 70 with respect to the display screen is calculated based on an arrangement relation between a target whose image is to be taken and the display screen of the monitor 2, various light emitters can be used as targets whose images are to be taken by the imaging information calculation section 74.

A target whose image is to be taken, such as a marker, may be provided on the core unit 70, and an image-taking means may be provided on the monitor 2. In a still another example, a mechanism for emitting light from the front surface of the core unit 70 may be provided. In this case, an image-taking device for taking an image of the display screen of the monitor 2 is provided at a place different from those of the core unit 70 and the monitor 2. By analyzing a position at which light emitted from the core unit 70 toward the display screen of the monitor 2 is reflected, based on an image taken by the imaging device, it is similarly possible to form a pointing device which is capable of outputting data for remotely designating coordinates with respect to the display screen.

In the above description, the controller 7 and the game apparatus main body 5 are connected to each other by radio communication. However, the controller 7 and the game apparatus main body 5 may be connected to each other by a cable. In this case, the core unit 70 and the subunit 76 are connected to each other by the connection cable 79, and the core unit 70 and the game apparatus main body 5 are connected to each other by another cable.

The shape of the controller 7, and the shapes, numbers, and installed positions of the operation sections 72 and 78 provided therein as described above are merely an example, and the present invention can be achieved with other shapes, numbers and installed positions.

The game program of the present invention may be supplied to the game apparatus main body 5 via a wired or wireless communication line, in addition to from an external storage medium such as the optical disc 4, or the like. Alternatively, the game program may be in advance stored in a nonvolatile storage unit within the game apparatus main body 5. It is noted that an information storage medium for storing the game program may be a nonvolatile semiconductor memory in addition to an optical disc-shaped storage medium such as CD-ROM, DVD, and the like.

Since the game controller is capable of being operated while the housing thereof is held with one hand of the player, the input device is small enough in size to be easy to handle. Thus, the game system and the storage medium storing the game program according to the present invention are useful as a game system including a game apparatus main body and a game controller, or the like which are provided independently of each other, and a game program executed by the game apparatus main body.

While the invention has been described in detail, the foregoing description is in all aspects illustrative and not restrictive. It is understood that numerous other modifications and variations can be devised without departing from the scope of the invention.

What is claimed is:

1. A game system comprising a game controller including a first housing configured to be holdable with one hand of a player, a game apparatus, and a first movement detector for generating data indicative of aspects of movement of the first housing, the game controller including a direction instruction section, and the game apparatus including:
  a processor; and
  a memory coupled to the processor, the memory storing instructions that, when executed by the processor, cause the game apparatus to perform operations comprising:
    receiving, from the game controller, transmissions of operation data, each of one or more of the transmissions of operation data including both direction instruction input data corresponding to a direction instruction input supplied to the direction instruction section of the game controller and first movement detector data generated by the first movement detector;
    determining a movement direction of a first object, which appears in a virtual three-dimensional game world, in accordance with the direction instruction input data; and
    determining a posture of the first object in the virtual three-dimensional game world in accordance with the first movement detector data, wherein the game controller further includes a second housing independent of the first housing and configured to be holdable with another hand of the player, the game system further comprises a second movement detector for generating second movement detector data indicative of aspects of a pointing direction of the second housing, and each of the one or more of the transmissions of operation data further includes the second movement detector data, and the processor performs further operations including determining a movement direction of a second object, which appears in the virtual three-dimensional game world and is different from the first object, in accordance with the second movement detector data.

2. The game system according to claim 1, wherein the first housing is configured to be holdable at a side circumference thereof with the one hand of the player.

3. The game system according to claim 2, wherein the direction instruction section is disposed so that, when the first housing is held at the side circumference thereof with the one hand of the player, the direction instruction section is operable with a thumb of the one hand.

4. The game system according to claim 1, wherein an inclination of the first housing is determined based on the first movement detector data, thereby determining inclination of the first object in the virtual three-dimensional game world.

5. The game system according to claim 1, wherein
rotation of the first housing about a predetermined axis is determined based on the first movement detector data, thereby determining rotation of the first object about a predetermined axis in the virtual three-dimensional game world.

6. The game system according to claim 1, wherein inclination of the first housing in a predetermined direction and inclination of the first housing in another direction, which is different from the predetermined direction, are determined based on the first movement detector data, thereby determining inclination of the first object in two directions in the virtual three-dimensional game world.

7. The game system according to claim 1, wherein rotation of the first housing about a predetermined axis and rotation of the first housing about another axis, which is different from the predetermined axis, are determined based on the first movement detector data, thereby determining rotation of the first object about two axes in the virtual three-dimensional game world.

8. The game system according to claim 1, wherein
the first movement detector data includes acceleration data corresponding to acceleration in three mutually-perpendicular directions relative to the first housing, and
a three-dimensional posture vector, which indicates the posture of the first object in the virtual three-dimensional game world, is determined in accordance with the acceleration data.

9. The game system according to claim 1, wherein
the first movement detector data includes rotation data corresponding to rotation of the first housing about three mutually-perpendicular axes, and
a three dimensional posture vector, which indicates the posture of the first object in the virtual three-dimensional game world, is determined in accordance with the rotation data.

10. The game system according to claim 1, wherein
the first movement detector data includes acceleration data corresponding to acceleration generated in three mutually-perpendicular directions relative to the first housing, and
each component of a three-dimensional posture vector, which indicates the posture of the first object in the virtual three-dimensional game world, is respectively determined in accordance with the acceleration data for a corresponding one of the directions.

11. The game system according to claim 1, wherein
the first movement detector data includes acceleration data corresponding to acceleration generated in two mutually-perpendicular directions relative to the first housing, and
each of two components of a three-dimensional posture vector, which indicates the posture of the first object in the virtual three-dimensional game world, is respectively determined in accordance with the acceleration data for a corresponding one of the directions.

12. The game system according to claim 4, wherein, with a first direction in the virtual three-dimensional game world as a reference,
the inclination of the first housing is determined based on the first movement detector data, thereby determining the inclination of the first object in a direction relative to the first direction in the virtual three-dimensional game world.

13. The game system according to claim 5, wherein, with a first direction in the virtual three-dimensional game world as a reference,
the rotation of the first housing is determined based on the first movement detector data, thereby determining rotation of the first object about an axis extending in the first direction in the virtual three-dimensional game world.

14. The game system according to claim 12, wherein
the direction instruction section includes at least a stick which is inclinable in a forward direction relative to the first housing to provide a direction instruction input for a forward direction,
the first object is moved in the first direction when the stick is inclined to provide a direction instruction input for the forward direction, and
an inclination of the first housing in the forward direction is determined based on the first movement detector data, and the first object is inclined in the first direction when the first movement detector data corresponds to inclination of the first housing in the forward direction.

15. The game system according to claim 12, wherein
the direction instruction section includes at least a stick which is inclined in a leftward or rightward direction relative to the first housing to provide a direction instruction input for a leftward or rightward direction,
the first object is moved in a leftward or rightward direction relative to the first direction when the stick is inclined to provide a direction instruction input for the leftward or rightward direction, and
an inclination of the first housing in the leftward or rightward direction is determined based on the first movement detector data, and the first object is inclined in the leftward or rightward direction relative to the first direction when the first movement detector data corresponds to inclination of the first housing in the leftward or rightward direction.

16. The game system according to claim 12, wherein
the direction instruction section is operable to provide direction instruction inputs for at least one or more of forward, backward, leftward, and rightward directions,
a current movement direction of the first object is set to be the first direction, and, with the first direction as a reference, a direction in accordance with the direction instruction input data is updated and set as the movement direction, and
an inclination of the first housing is determined based on the first movement detector data, thereby determining inclination of the first object in a direction based on the updated and set movement direction.

17. A game system comprising a game controller including a first housing configured to be holdable with one hand of a player, a game apparatus, and a first movement detector for generating data indicative of aspects of movement of the first housing,
the game controller including a direction instruction section, and
the game apparatus including:
a processor, and
a memory coupled to the processor, the memory storing instructions that, when executed by the processor, cause the game apparatus to perform operations comprising:
receiving, from the game controller, transmissions of operation data, each of one or more of the transmissions of operation data including both direction instruction input data corresponding to a direction instruction input supplied to the direction instruction section of the game controller and first movement detector data generated by the first movement detector;
determining a movement direction of a first object, which appears in a virtual three-dimensional game world, in accordance with the direction instruction input data; and
determining a posture of the first object in the virtual three-dimensional game world in accordance with the first movement detector data, wherein
the game controller further includes a second housing independent of the first housing and configured to be holdable with another hand of the player,
the game system further comprises a second movement detector for generating second movement detector data indicative of aspects of movement of the second housing, and each of the one or more of the transmissions of operation data further includes the second movement detector data, and
the processor performs further operations comprising determining a movement direction of a second object, which appears in the virtual three-dimensional game world and is different from the first object, in accordance with the second movement detector data.

18. The game system according to claim 1, wherein
the movement direction of the first object, which is selected from a plurality of objects which appear in the virtual three-dimensional game world, is determined, and
movement directions of at least two of the plurality of objects are determined in accordance with the second movement detector data.

19. The game system according to claim 1, wherein
the first movement detector is provided in the first housing,
the second movement detector is provided in the second housing,
the game controller further includes:
connection circuitry for providing a wired or wireless connection between the first housing and the second housing, and for outputting data generated in one of the first and second housings to the other of the first and second housings, and
a transmission section provided in the other of the first and second housings for transmitting to the game apparatus the direction instruction input data, the first movement detector data, and the second movement detector data.

20. The game system according to claim 1, wherein the second object is controlled to move in the determined movement direction from a position based on a position of the first object in the virtual three-dimensional game world as a movement start point.

21. The game system according to claim 1, wherein the movement direction of the second object is controlled in accordance with the first movement detector data and the second movement detector data.

22. The game system according to claim 1, wherein the movement direction of the second object is controlled in accordance with the determined posture of the first object and the second movement detector data.

23. The game system according to claim 1, wherein the first movement detector is provided in the first housing.

24. The game system according to claim 1, wherein the second movement detector is provided in the second housing.

25. A game system comprising a game controller, and a game apparatus,
the game controller including:
a first housing configured to be holdable with one hand of a player;
a direction instruction section provided in the first housing for receiving a direction instruction input;
a second housing provided independently of the first housing and configured to be holdable with another hand of the player; and
a movement detector for generating data indicative of aspects of movement of the second housing, and
the game apparatus including:
a processor; and a memory coupled to the processor, the memory storing instructions that, when executed by the processor, cause the game apparatus to perform operations comprising:

receiving transmissions of operation data, each of one or more of the transmissions of operation data including both direction instruction input data corresponding to a direction instruction input supplied to the direction instruction section of the game controller and movement detector data generated by the movement detector;

determining a movement direction of an object, which appears in a virtual three-dimensional game world, in accordance with the direction instruction input data; and determining a posture of the object in the virtual three-dimensional game world in accordance with the movement detector data.

26. A game system comprising a game controller including a housing configured to be holdable with one hand of a player, a game apparatus, and a movement detector for generating data indicative of aspects of movement of the housing, the game controller including a direction instruction section for receiving a direction instruction input, and
the game apparatus including:
a processor; and
a memory coupled to the processor, the memory storing instructions that, when executed by the processor, cause the game apparatus to perform operations comprising:

receiving, from the game controller, transmissions of operation data, each of one or more of the transmissions of operation data including both direction instruction input data corresponding to a direction instruction input supplied to the direction instruction section of the game controller and movement detector data generated by the movement detector;

controlling movement of an object, which appears in a virtual three-dimensional game world, in accordance with the direction instruction input data; and causing the object in the virtual game world to perform a predetermined motion in accordance with the movement detector data, wherein the movement detector data includes acceleration data corresponding to acceleration generated relative to the housing, and acceleration generated in a predetermined direction of the housing is determined based on the movement detector data, and the object is caused to perform the predetermined motion when the determined acceleration satisfies a predetermined condition.

27. The game system according to claim 26, wherein the housing is configured to be holdable at a side circumference thereof with the one hand of the player.

28. The game system according to claim 27, wherein the direction instruction section is disposed so that, when the housing is held at the side circumference thereof with one hand of the player, the direction instruction section is operable with a thumb of the one hand.

29. The game system according to claim 26, wherein a history of the acceleration generated in the predetermined direction of the housing is determined based the movement detector data, and the object is caused to perform the predetermined motion when the history satisfies a predetermined condition.

30. A game system comprising a game controller including a housing configured to be holdable with one hand of a player, a game apparatus, and a movement detector for generating data indicative of aspects of movement of the housing, the game controller including a direction instruction section for receiving a direction instruction input, and
the game apparatus including:
a processor; and
a memory coupled to the processor, the memory storing instructions that, when executed by the processor, cause the game apparatus to perform operations comprising:

receiving, from the game controller, transmissions of operation data, each of one or more of the transmissions of operation data including both direction instruction input data corresponding to a direction instruction input supplied to the direction instruction section of the game controller and movement detector data generated by the movement detector;

controlling movement of an object, which appears in a virtual three-dimensional game world, in accordance with the direction instruction input data; and causing the object in the virtual game world to perform a predetermined motion in accordance with the movement detector data, wherein the movement detector data includes rotation data corresponding to at least rotation of the housing about a predetermined axis, and rotation of the housing about the predetermined axis is determined based on the movement detector data, and the object is caused to perform the predetermined motion when the determined rotation satisfies a predetermined condition.

31. The game system according to claim 26, wherein
the direction instruction section includes an operation section movable in a predetermined direction to provide an input, the object being moved in the virtual three-dimensional game world based on the direction instruction input data corresponding to the input.

32. The game system according to claim 26, wherein
the direction instruction section includes an operation section movable in a predetermined direction to provide an input,
the object is moved in a first direction in the virtual three-dimensional game world when the operation section is moved in the predetermined direction.

33. The game system according to claim 31, wherein
the direction instruction section includes an operation section movable in one or both of a predetermined direction and a direction perpendicular to the predetermined direction to provide an input,
the object is moved in a first direction in the virtual three-dimensional game world when the operation section is moved in the predetermined direction, and the object is moved in a second direction perpendicular to the first direction in the virtual three-dimensional game world when the operation section is moved in the perpendicular direction.

34. The game system according to claim 26, wherein
the direction instruction section includes an operation section movable in a predetermined direction to provide an input,
the object is moved in a forward direction in the virtual three-dimensional game world when the operation section is moved in the predetermined direction, and a movement amount of the object is changed in accordance with an amount of moving of the operation section.

35. The game system according to claim 26, wherein
the direction instruction section includes an operation section movable in a predetermined direction to provide an input,
when the operation section is moved in the predetermined direction, the object is moved in a direction in the virtual three-dimensional game world that corresponds to the predetermined direction.

36. The game system according to claim 26, wherein
the direction instruction section includes an operation section movable in a predetermined direction to provide an input,
when the operation section is moved in the predetermined direction of the housing, the object is moved in a direction in the virtual three-dimensional game world that corresponds to the predetermined direction.

37. The game system according to claim 26, wherein
the direction instruction section includes an operation section movable in a predetermined direction thereby to provide an input,
when the operation section is moved in the predetermined direction, the object is moved in a direction in the virtual three-dimensional game world that corresponds to the predetermined direction.

38. The game system according to claim 26, wherein
the direction instruction section includes an operation section movable in one or both of a predetermined direction a direction perpendicular to the predetermined direction to provide an input,
the object is moved in a first direction in the virtual three-dimensional game world when the operation section is moved in the predetermined direction, and the object is moved in a second direction perpendicular to the first direction in the virtual three-dimensional game world when the operation section is moved in the perpendicular direction.

39. The game system according to claim 26, wherein
the direction instruction section includes an operation section movable in a predetermined direction to provide an input,
the object is moved in a forward direction in the virtual three-dimensional game world when the operation section is moved in the predetermined direction, and a movement amount of the object is changed in accordance with an amount of moving of the operation section.

40. The game system according to claim 26, wherein
the direction instruction section includes an operation section movable in a predetermined direction to provide an input,
when the operation section is moved in the predetermined direction of the housing, the object is moved in a direction in the virtual three-dimensional game world that corresponds to the predetermined direction.

41. The game system according to claim 26, wherein
the direction instruction section includes an operation section movable in a predetermined direction thereby to provide an input,
the object is moved in a forward direction in the virtual three-dimensional game world when the operation section is moved in the predetermined direction, and a movement amount of the object is changed in accordance with an amount of movement of the operation section.

42. The game system according to claim 26, wherein
the direction instruction section includes an operation section movable in a predetermined direction to provide an input,
the object is moved in a forward direction in the virtual game world when the operation section is moved in the predetermined direction, and a movement amount of the object is changed in accordance with an amount of movement of the operation section.

* * * * *